INVENTORS
H.C. Kendall and
L.H. Orpin
THEIR ATTORNEY

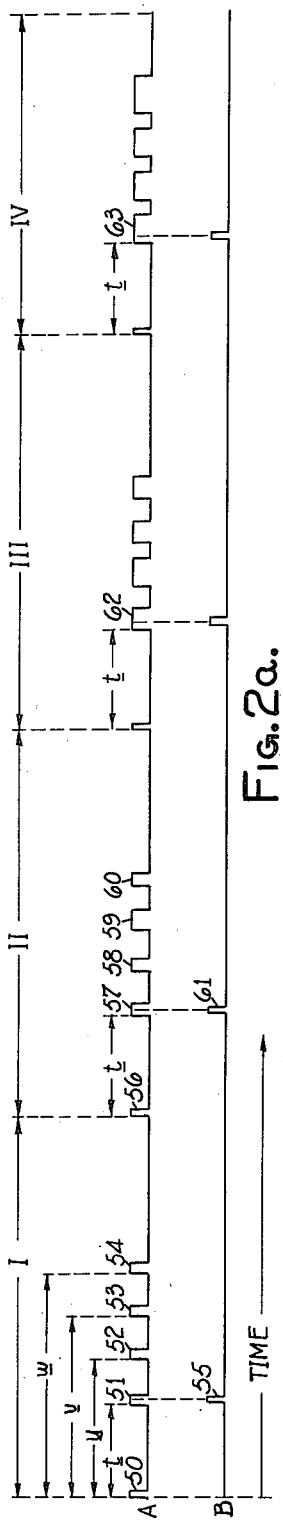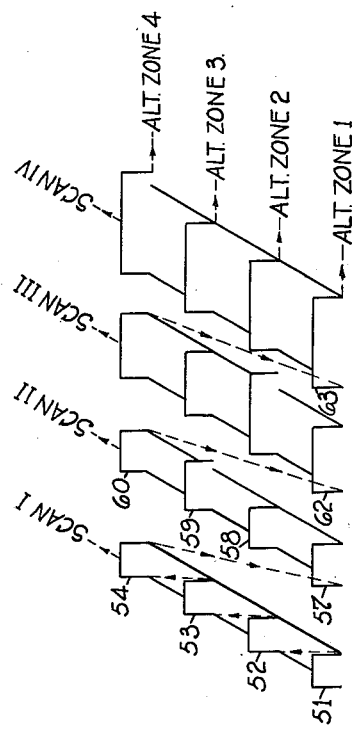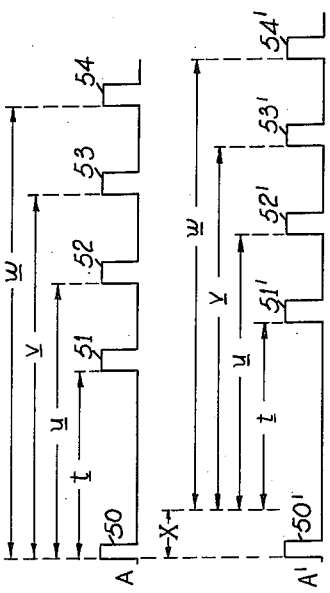

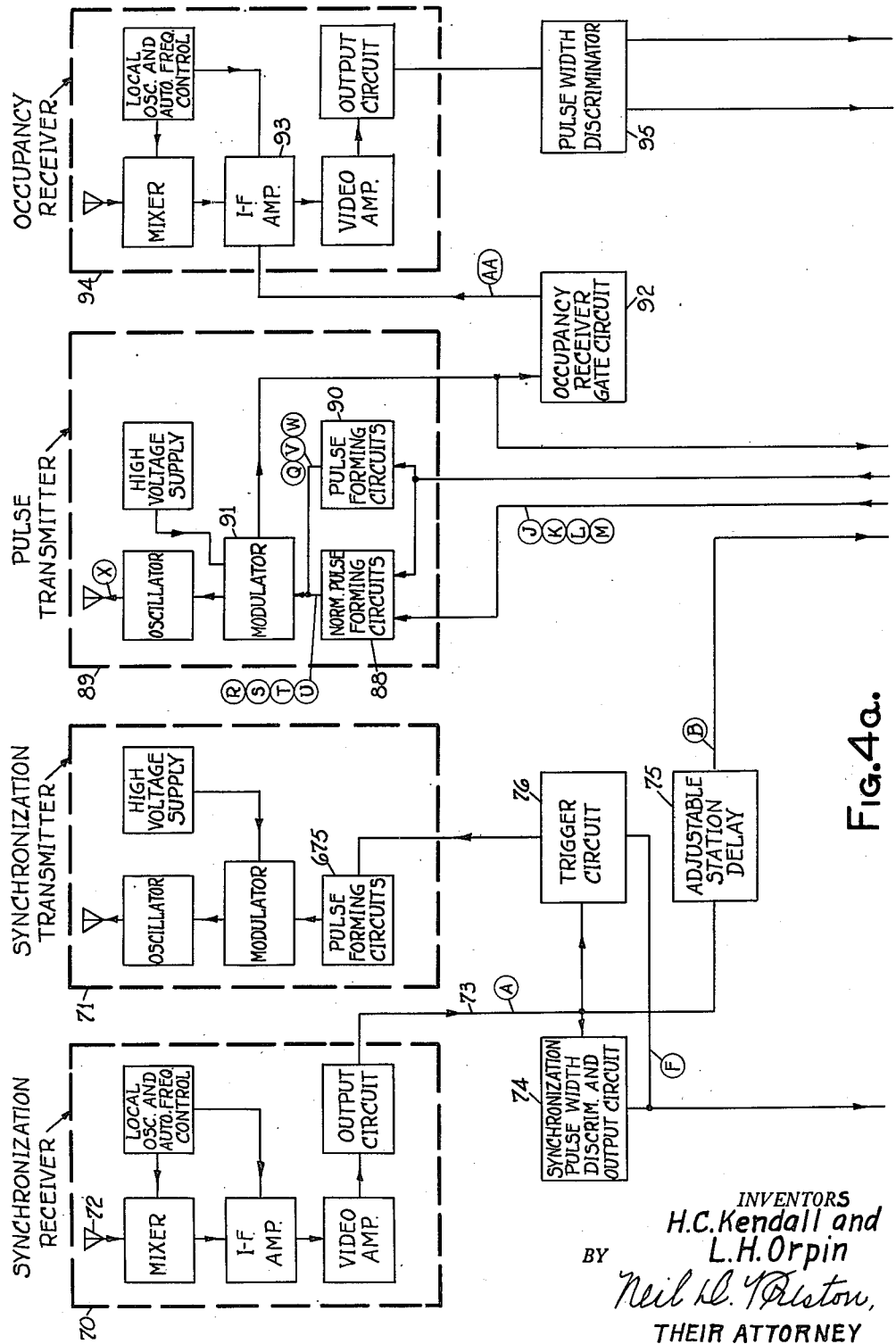

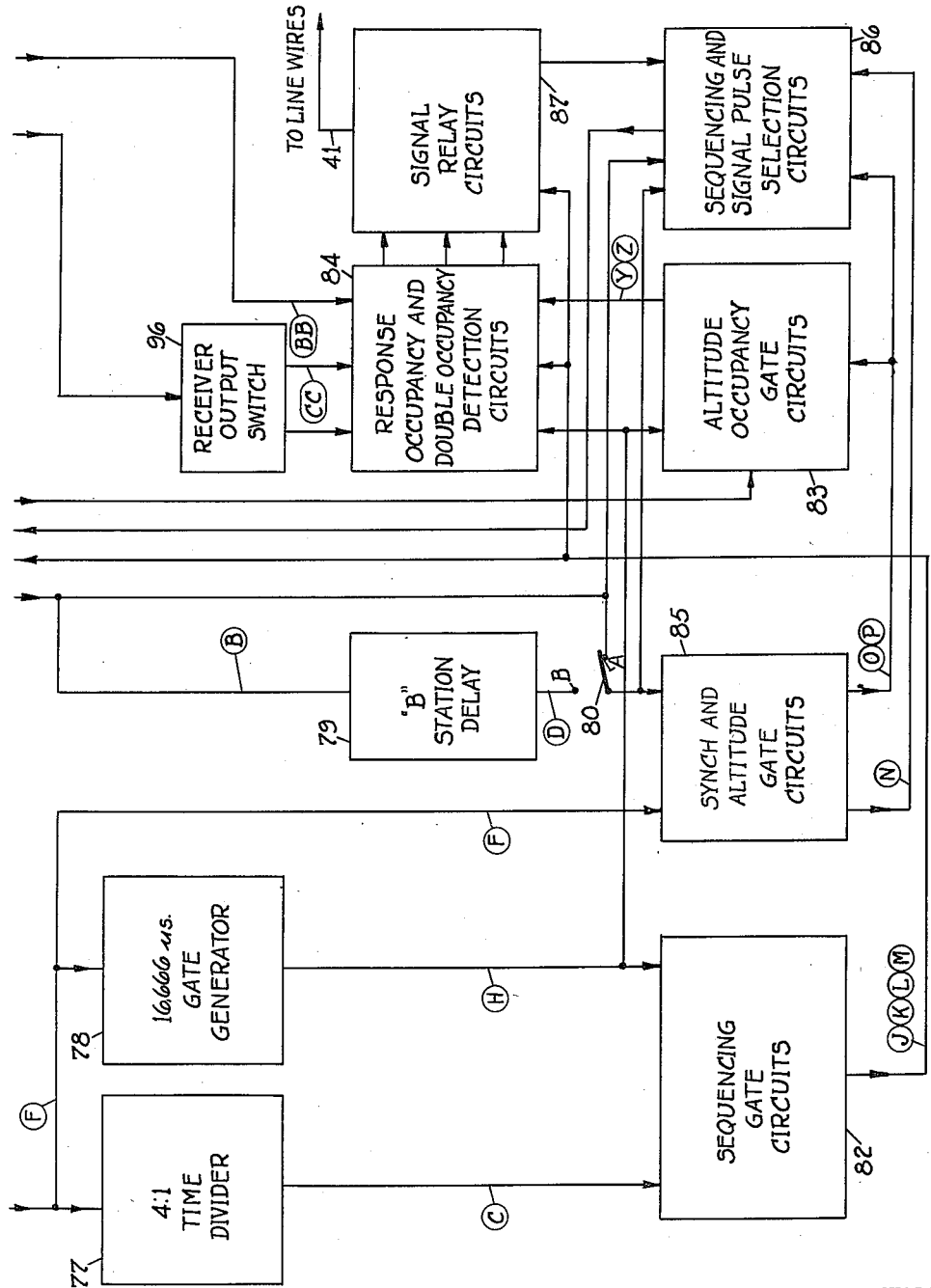

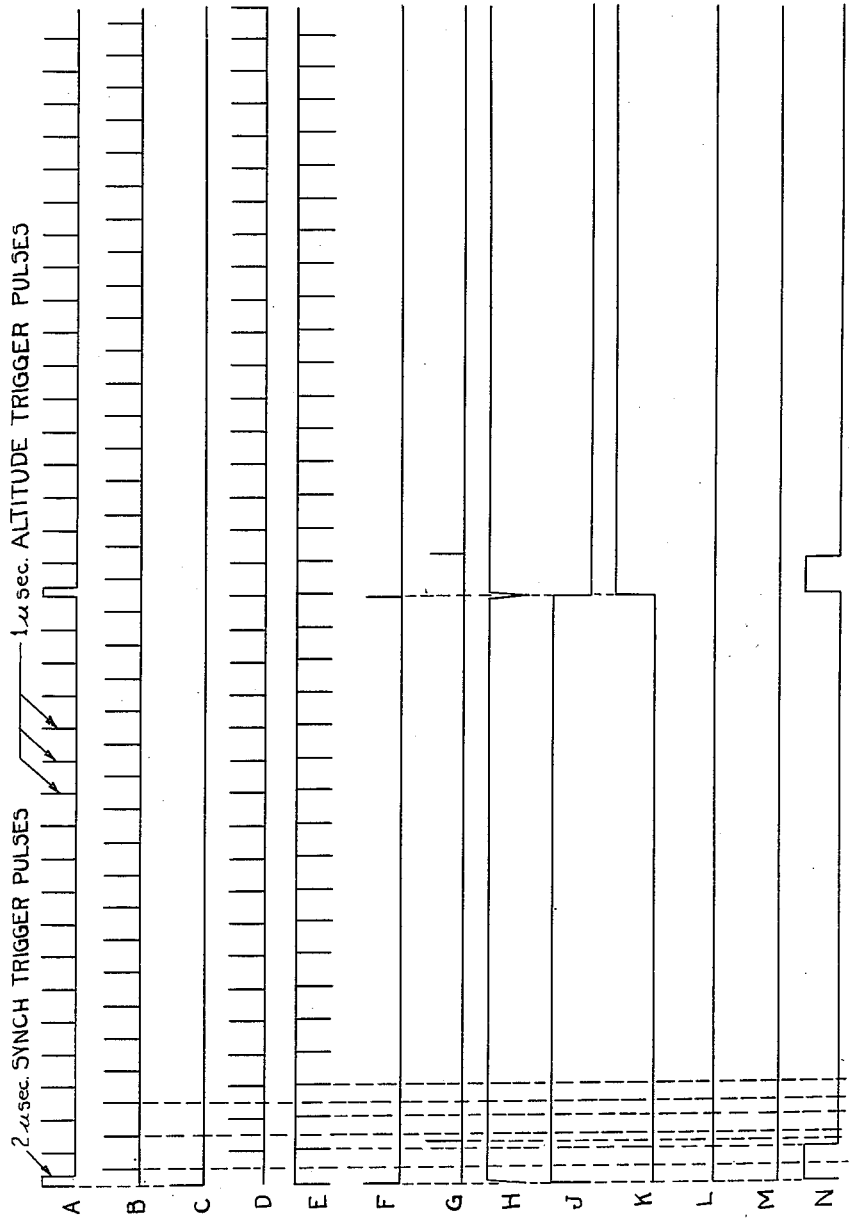

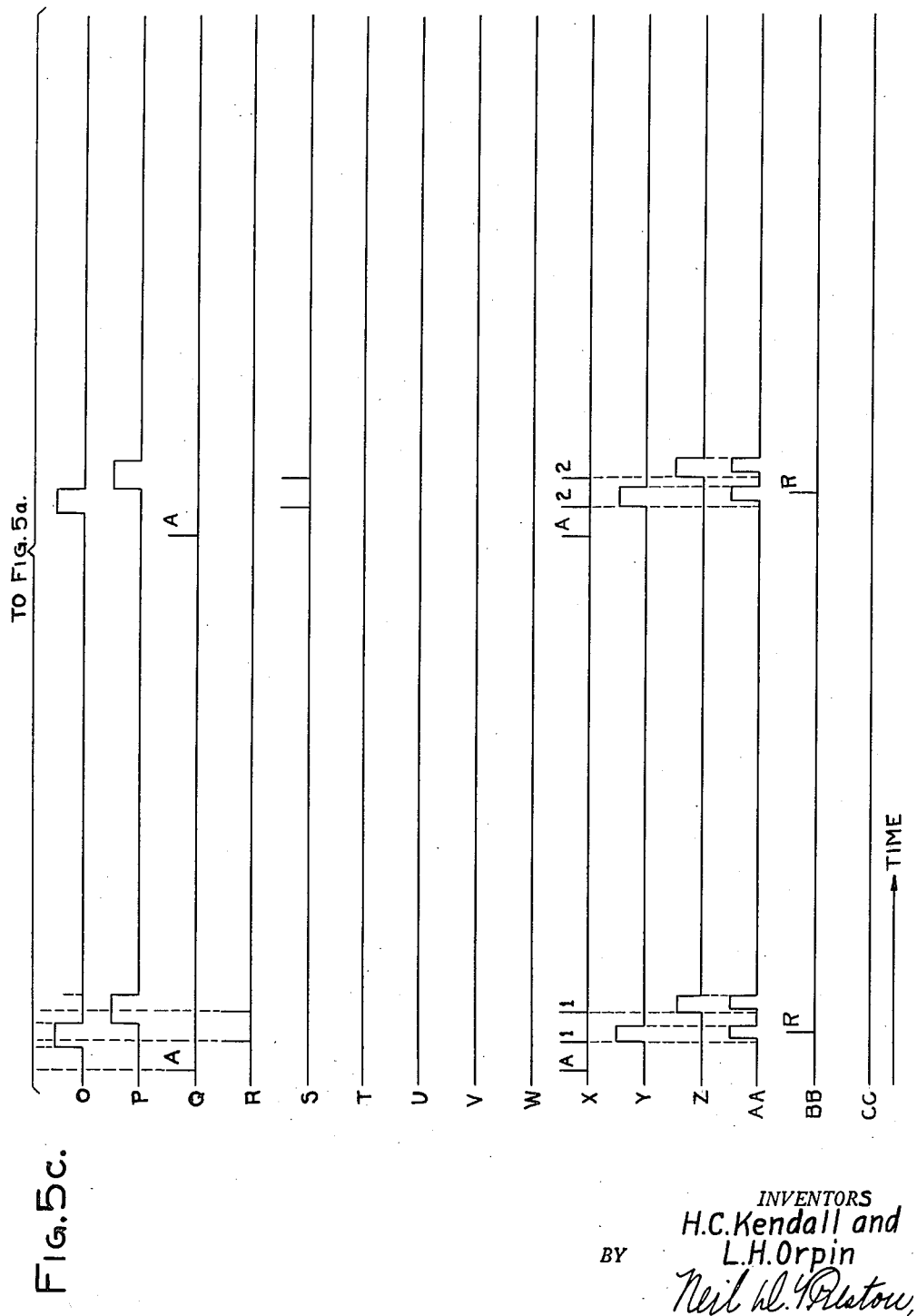

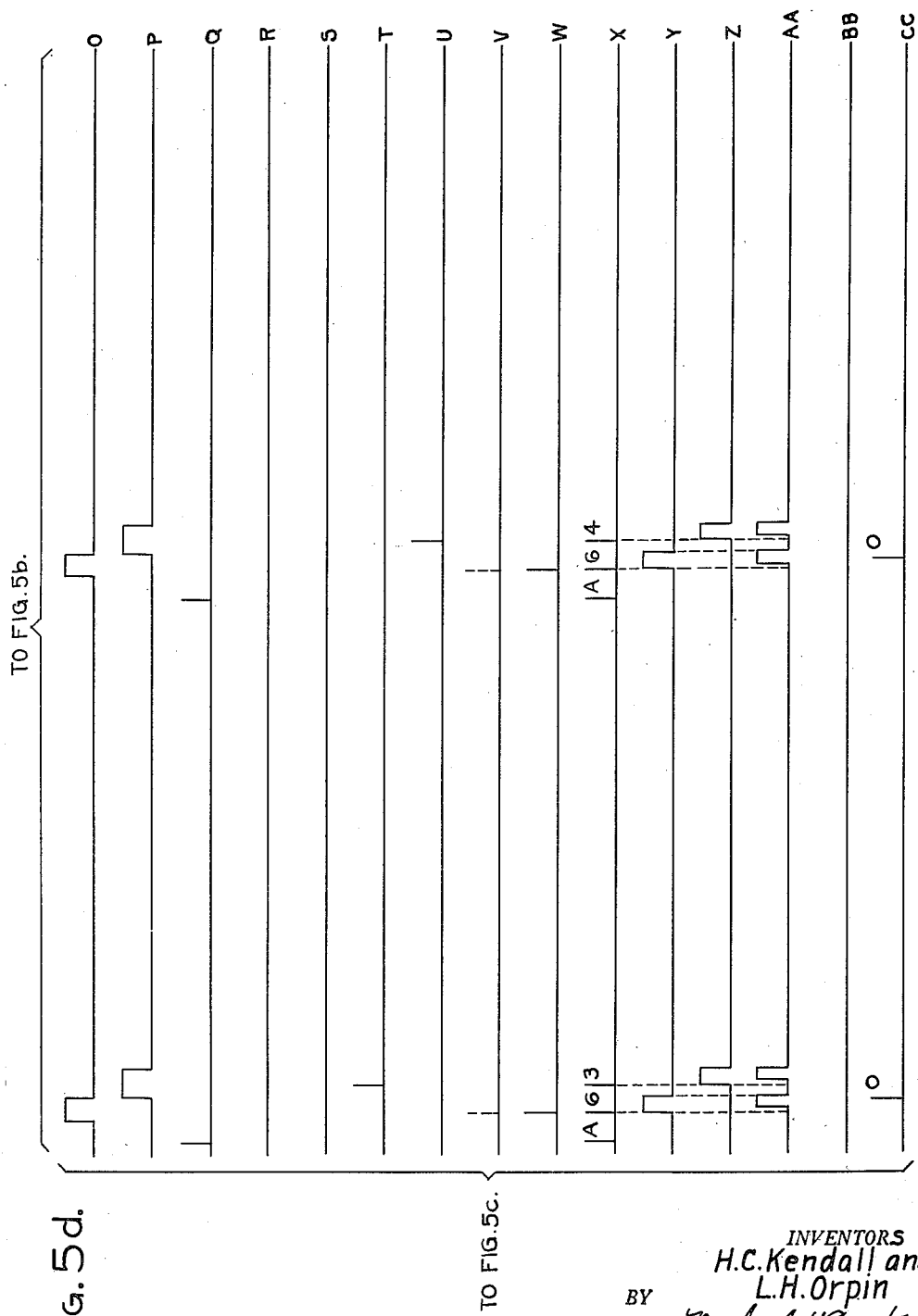

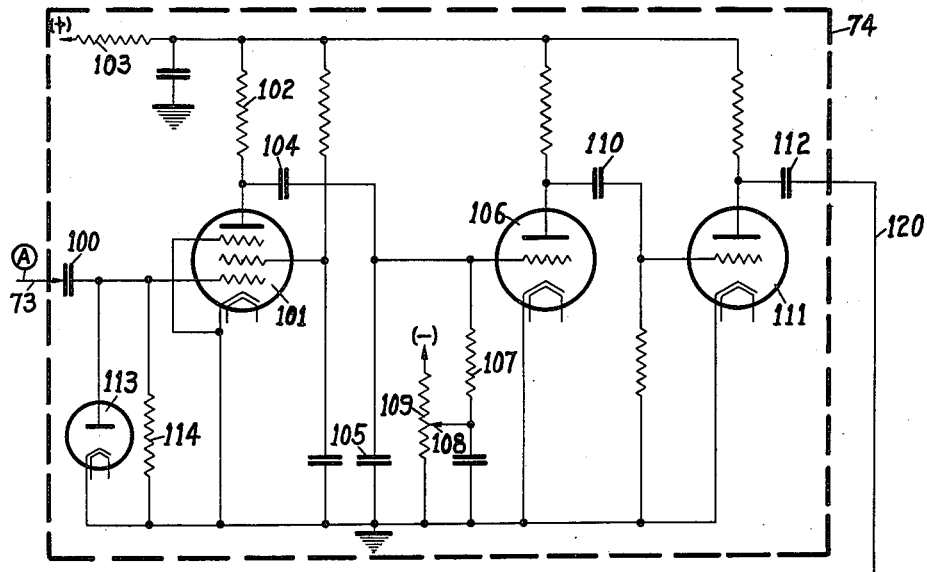
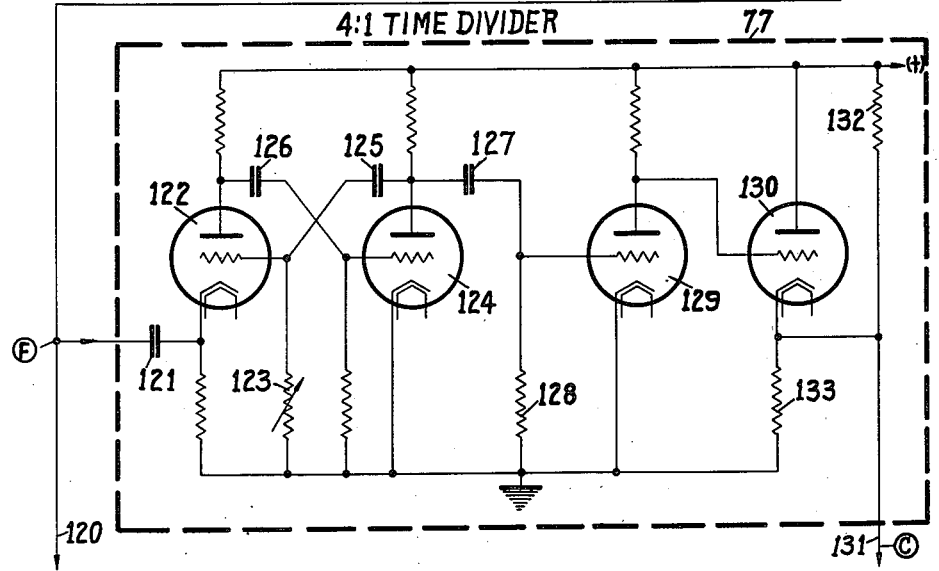
FIG. 6a.

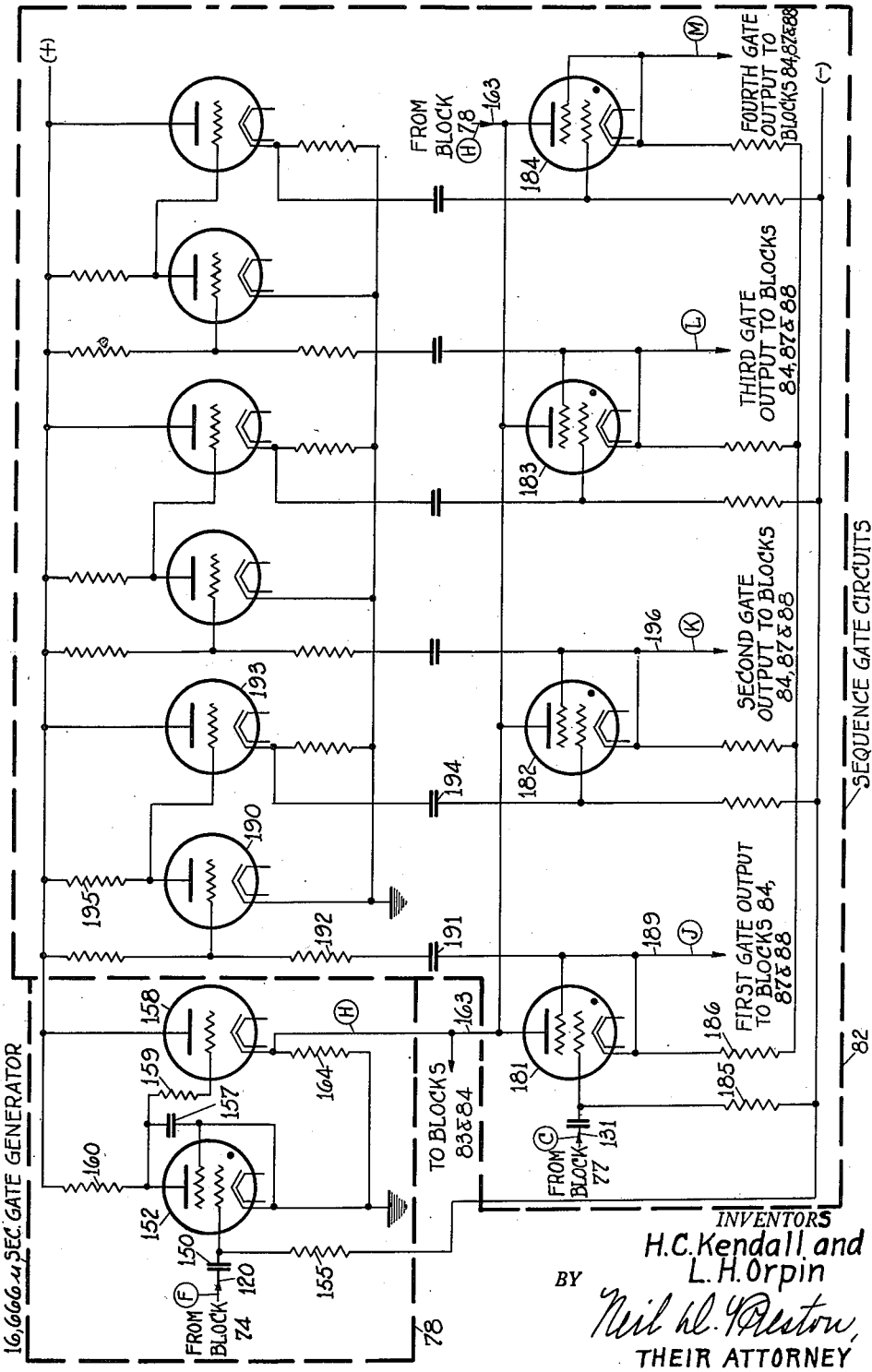

March 11, 1952  H. C. KENDALL ET AL  2,588,931
AIRWAY TRAFFIC CONTROL SYSTEM
Filed April 30, 1949  43 Sheets-Sheet 11

INVENTORS
H.C. Kendall and
L.H. Orpin
BY
THEIR ATTORNEY

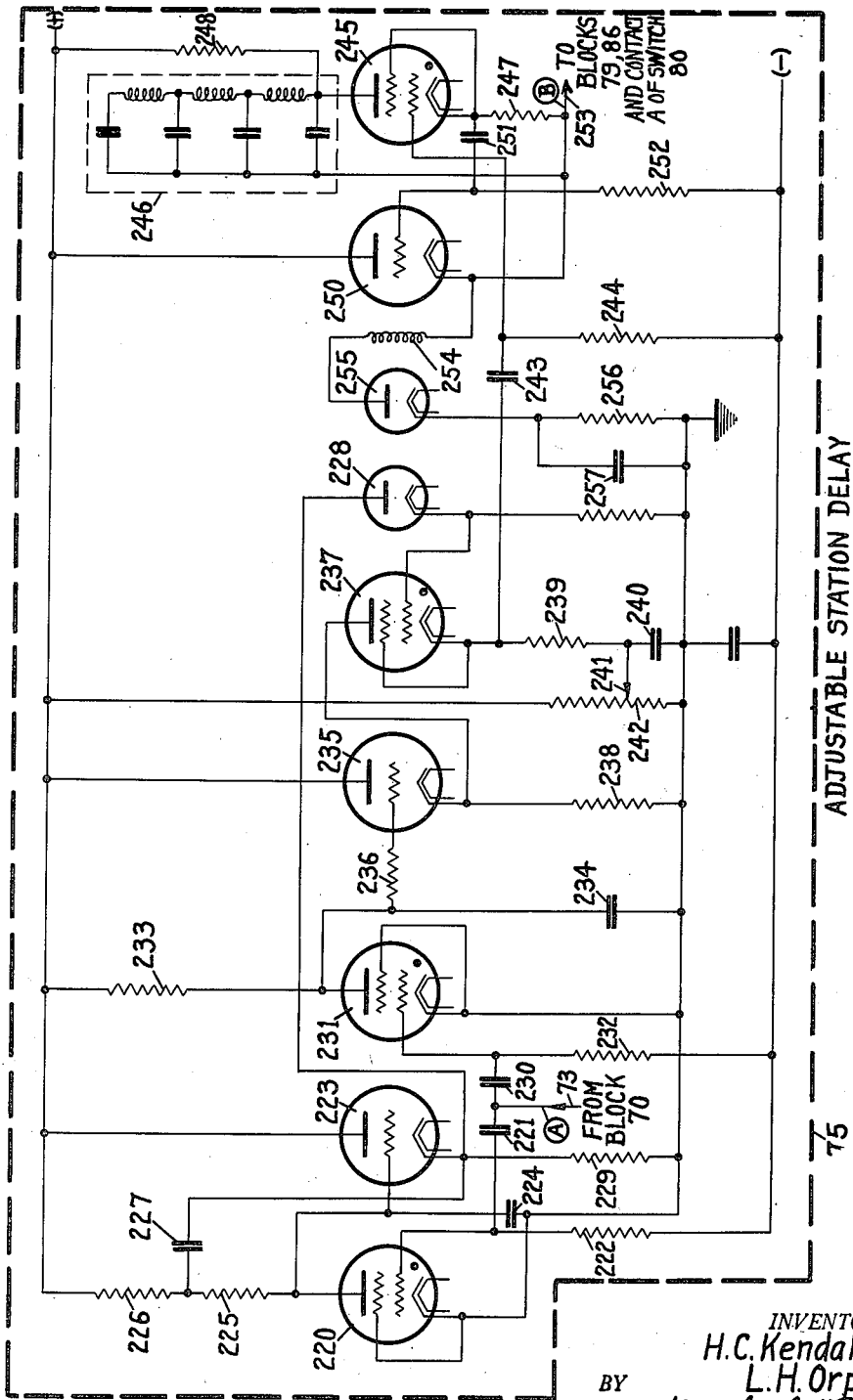

March 11, 1952　　　H. C. KENDALL ET AL　　　2,588,931
AIRWAY TRAFFIC CONTROL SYSTEM
Filed April 30, 1949　　　　　　　　　　　　　　43 Sheets-Sheet 14

INVENTORS
H.C. Kendall and
L.H. Orpin
BY
Neil W. Preston,
THEIR ATTORNEY

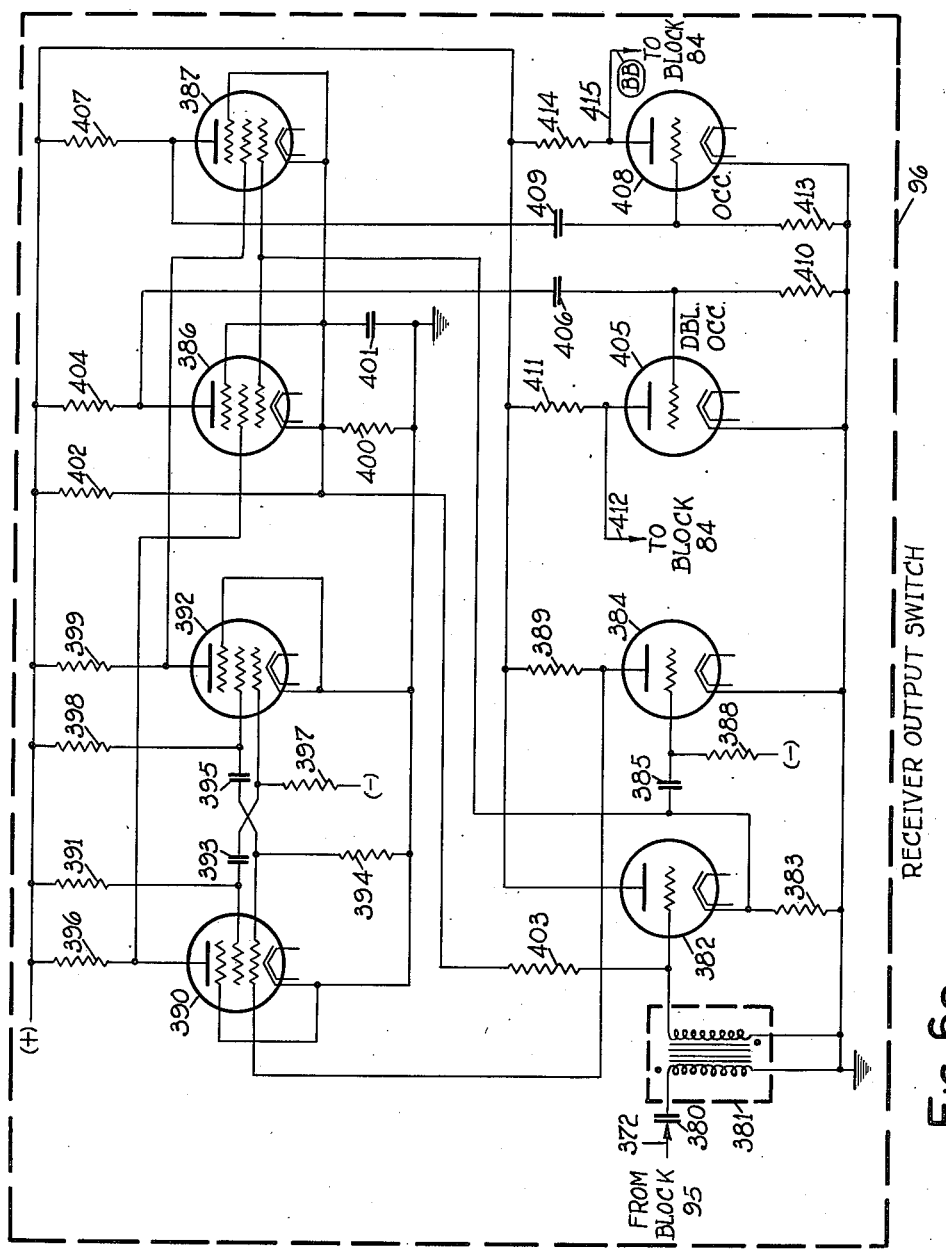

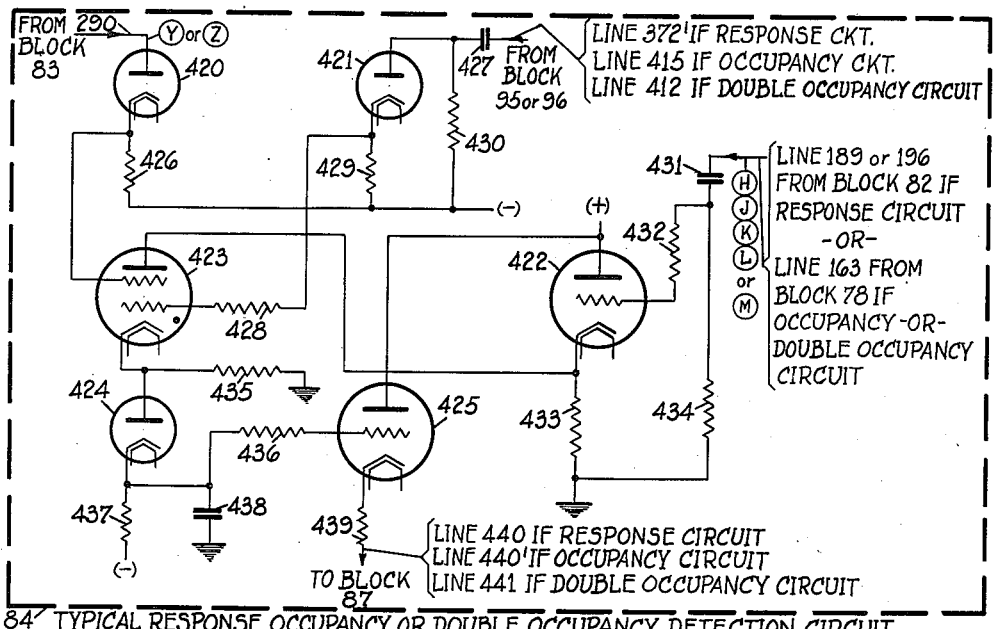
FIG.6h. 84' TYPICAL RESPONSE, OCCUPANCY OR DOUBLE OCCUPANCY DETECTION CIRCUIT
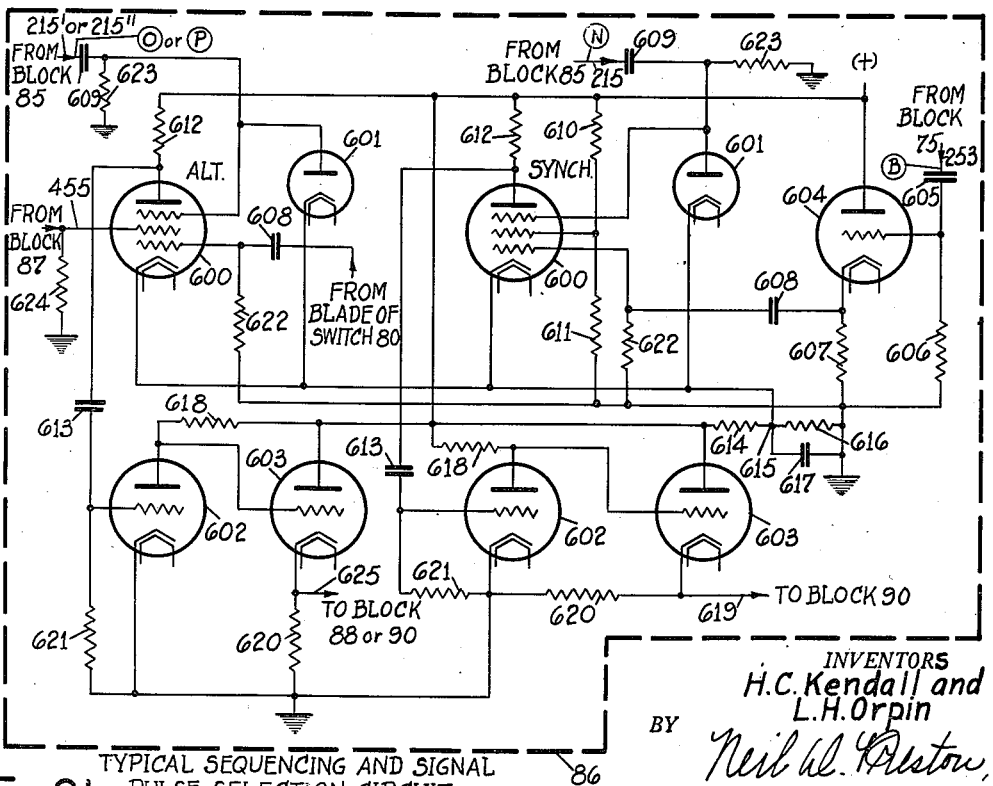
FIG.6k. TYPICAL SEQUENCING AND SIGNAL PULSE SELECTION CIRCUIT
INVENTORS
H.C. Kendall and
L.H. Orpin
BY Neil W. Keston
THEIR ATTORNEY

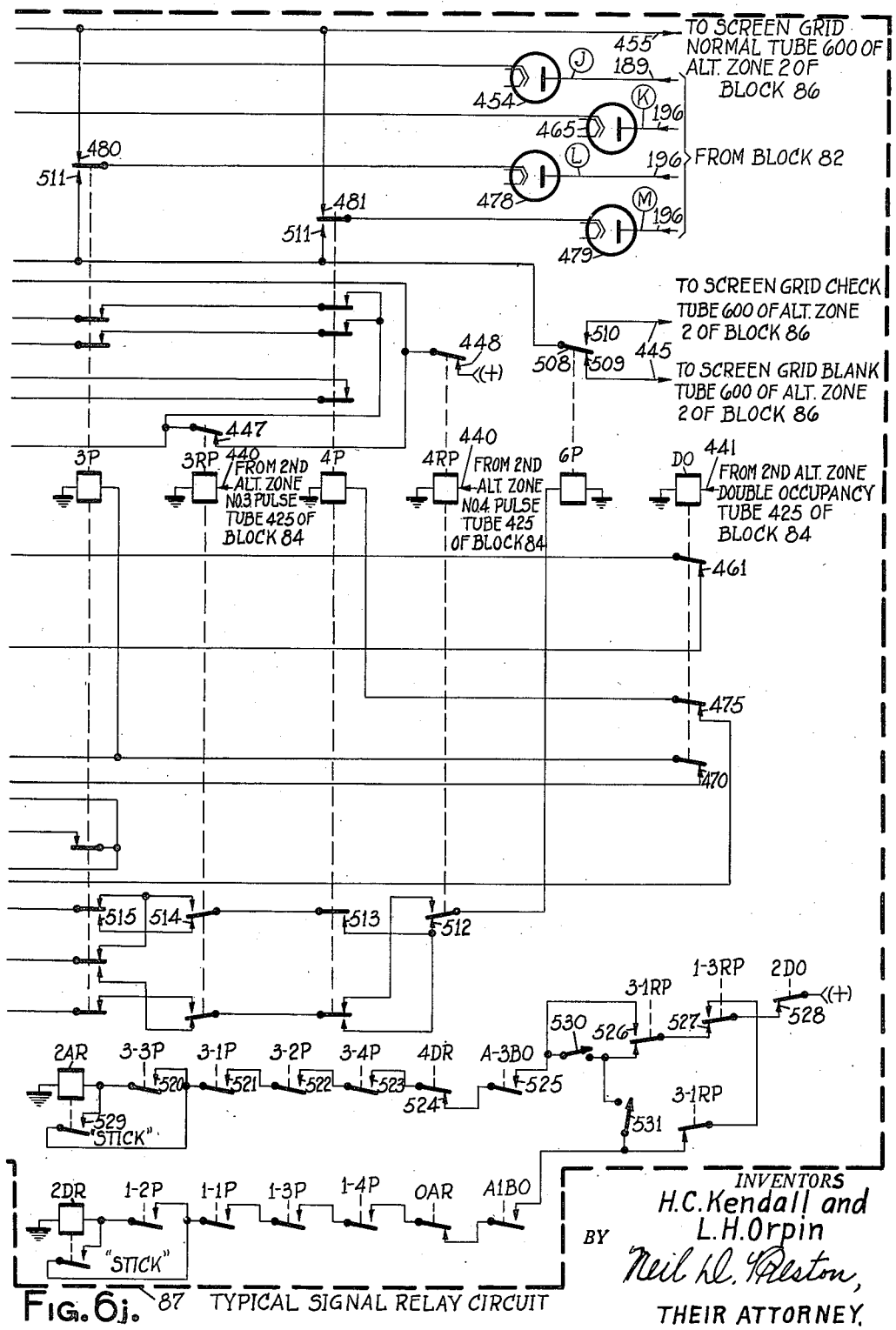
FIG. 6j. 87 TYPICAL SIGNAL RELAY CIRCUIT

March 11, 1952    H. C. KENDALL ET AL    2,588,931
AIRWAY TRAFFIC CONTROL SYSTEM
Filed April 30, 1949      43 Sheets—Sheet 20
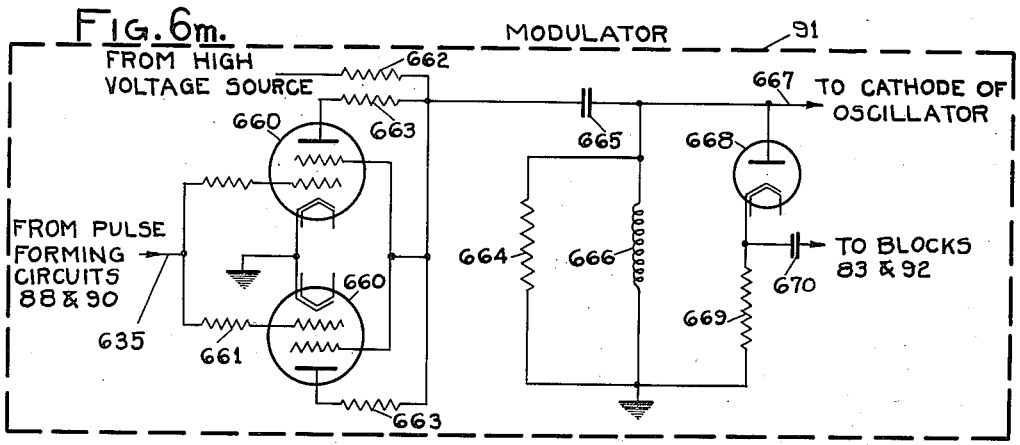
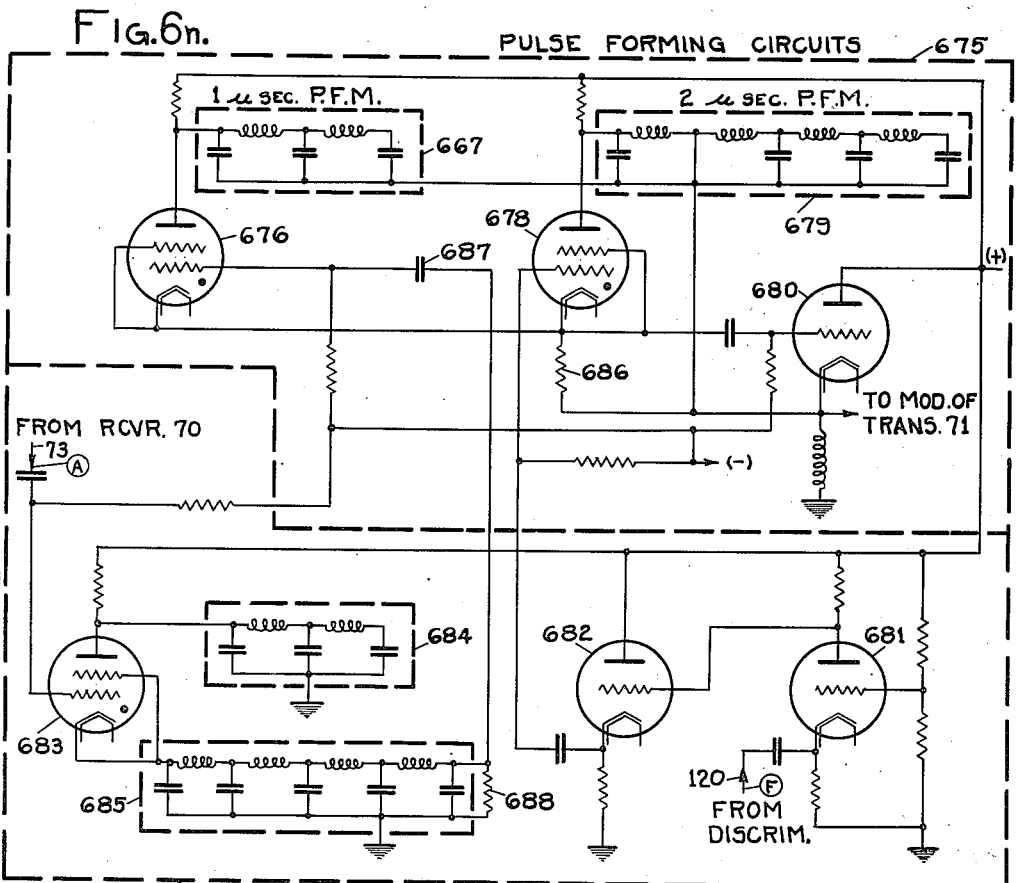
INVENTORS
H. C. Kendall and
L. H. Orpin
BY
THEIR ATTORNEY March 11, 1952 H. C. KENDALL ET AL 2,588,931
AIRWAY TRAFFIC CONTROL SYSTEM
Filed April 30, 1949 43 Sheets-Sheet 21

INVENTORS
H.C. Kendall and
L.H. Orpin
BY
Neil D. Preston,
THEIR ATTORNEY

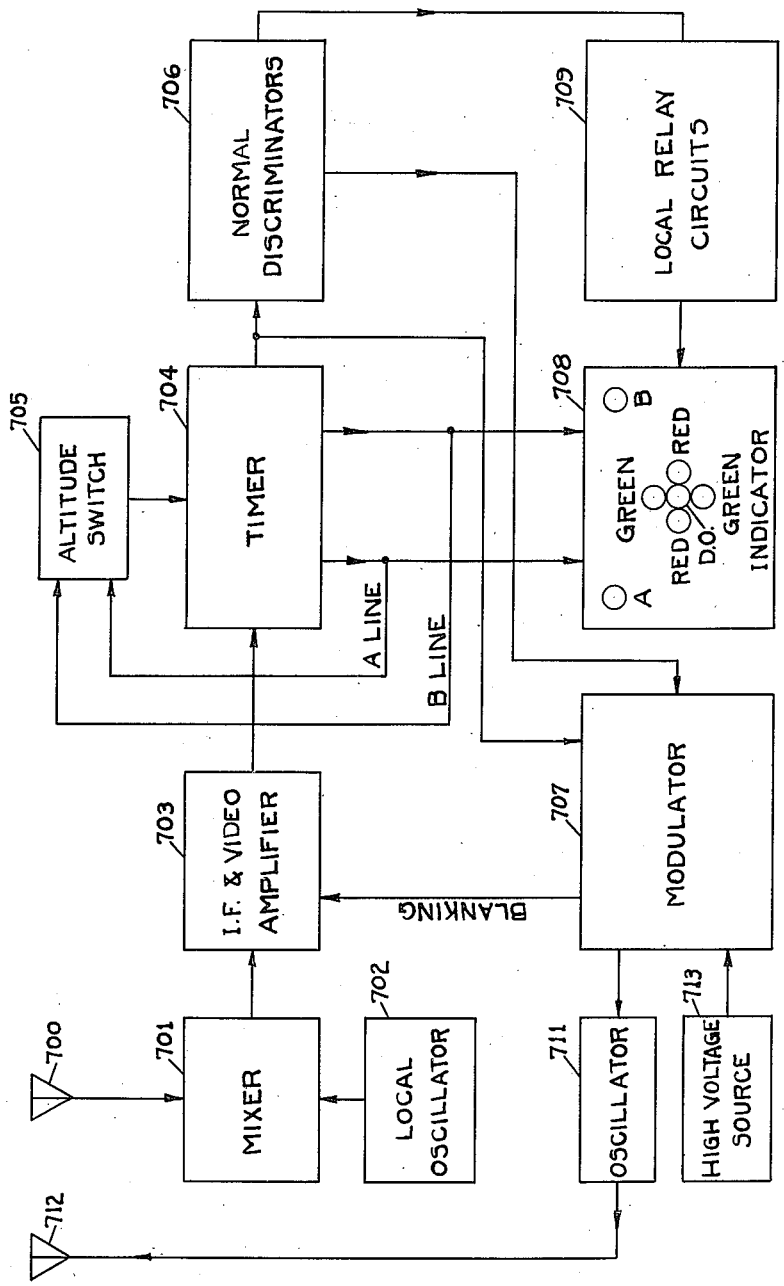

March 11, 1952     H. C. KENDALL ET AL     2,588,931
AIRWAY TRAFFIC CONTROL SYSTEM
Filed April 30, 1949     43 Sheets-Sheet 23

INVENTORS
H.C. Kendall and
L.H. Orpin
BY
THEIR ATTORNEY

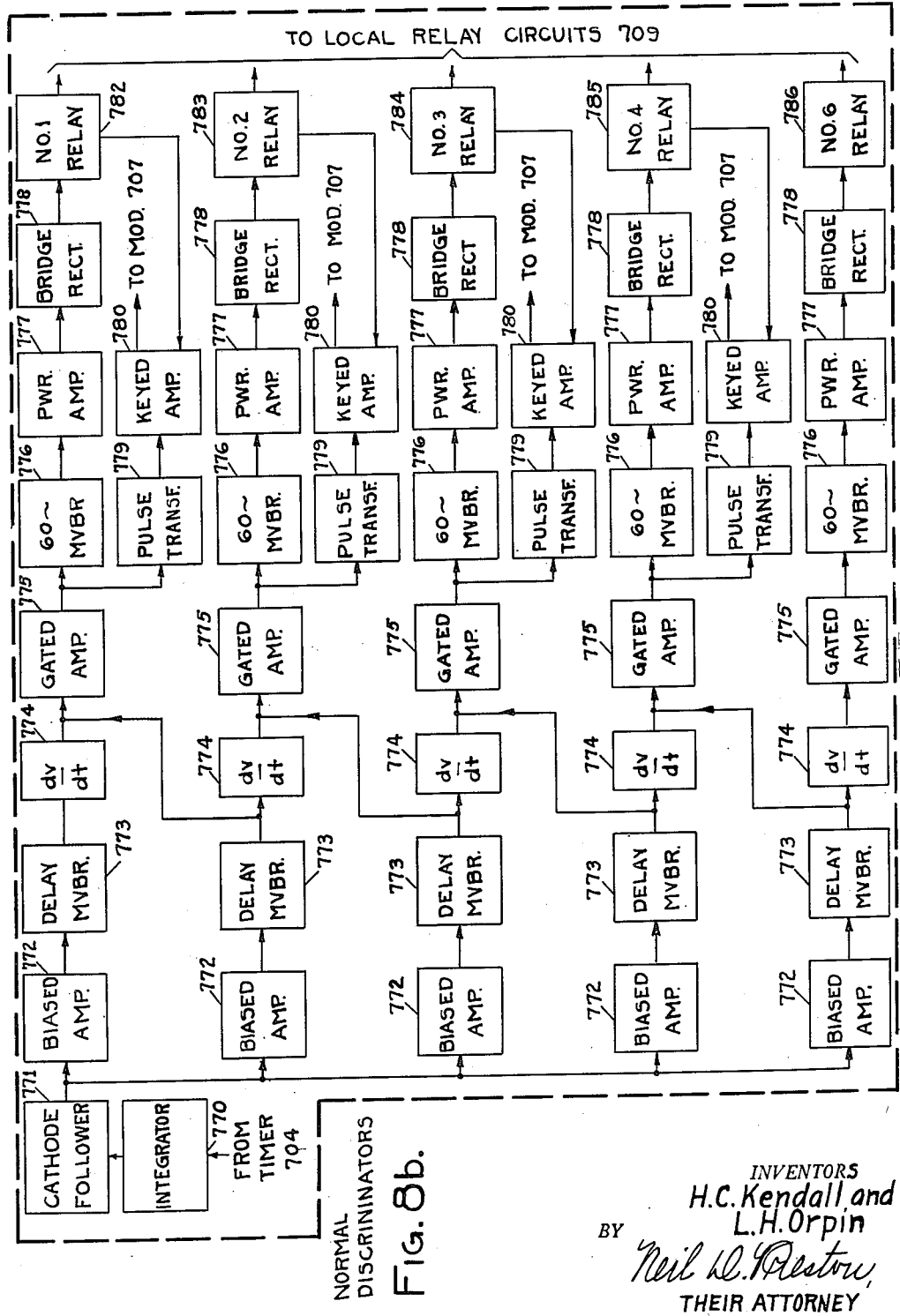

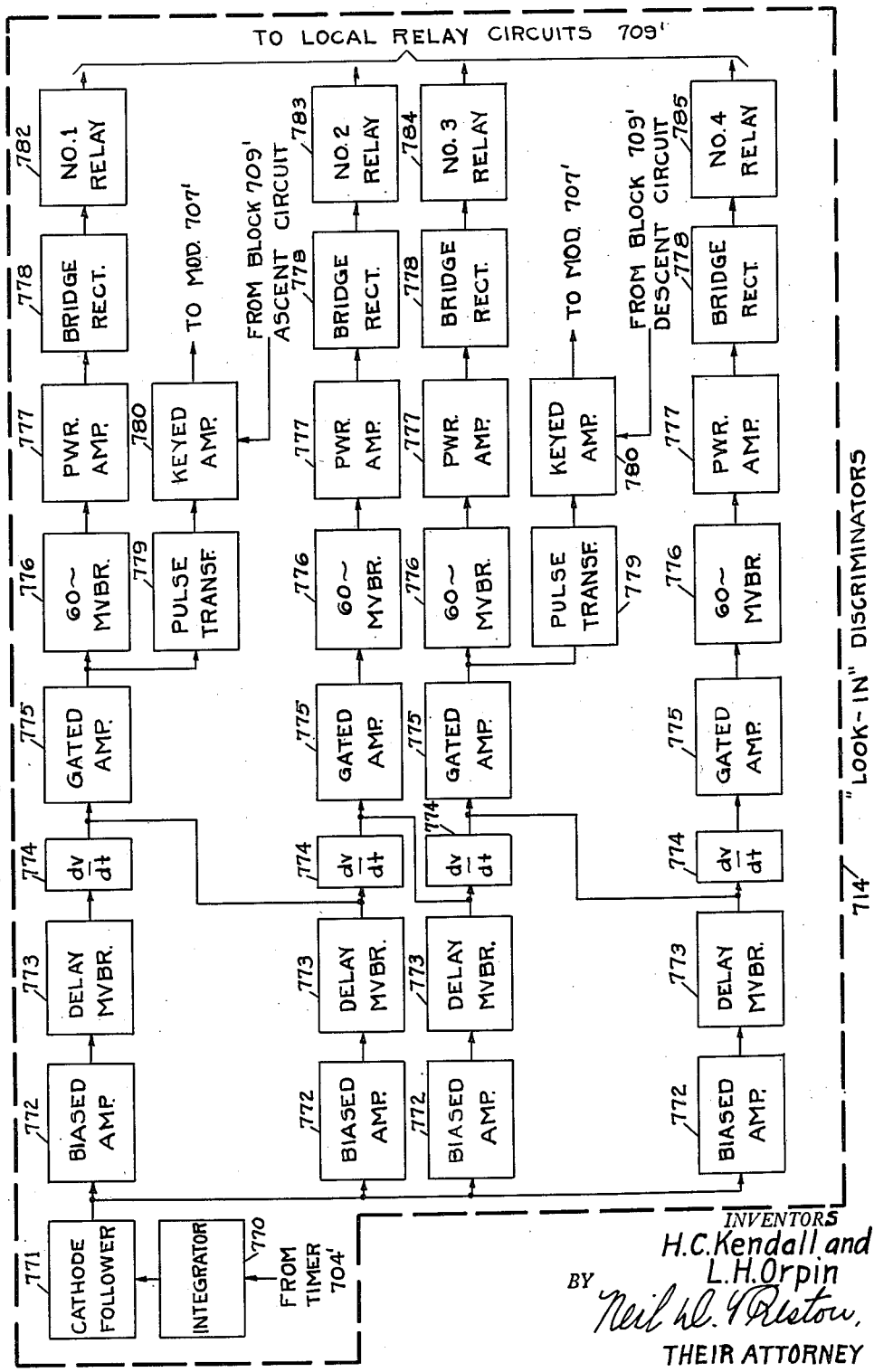

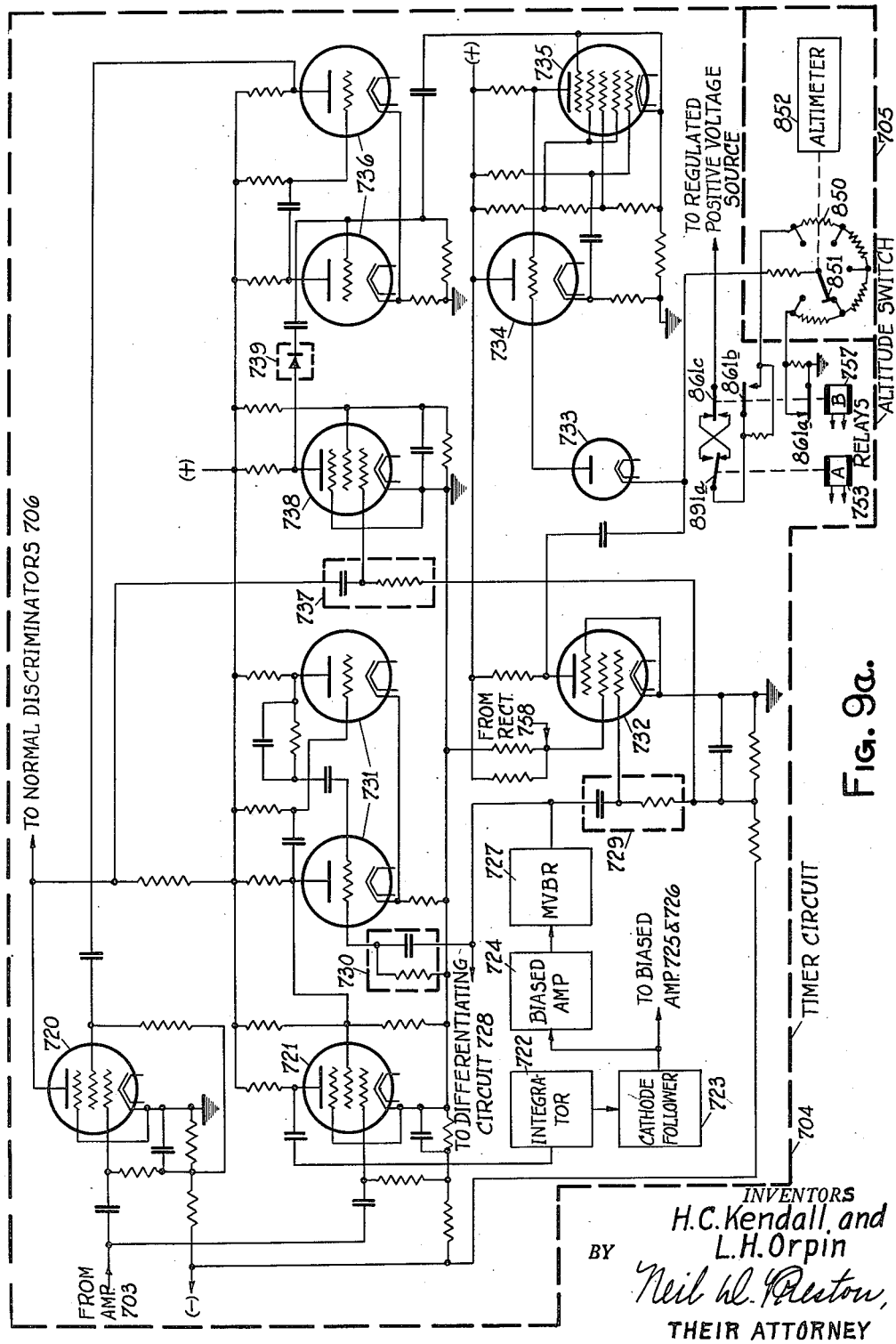

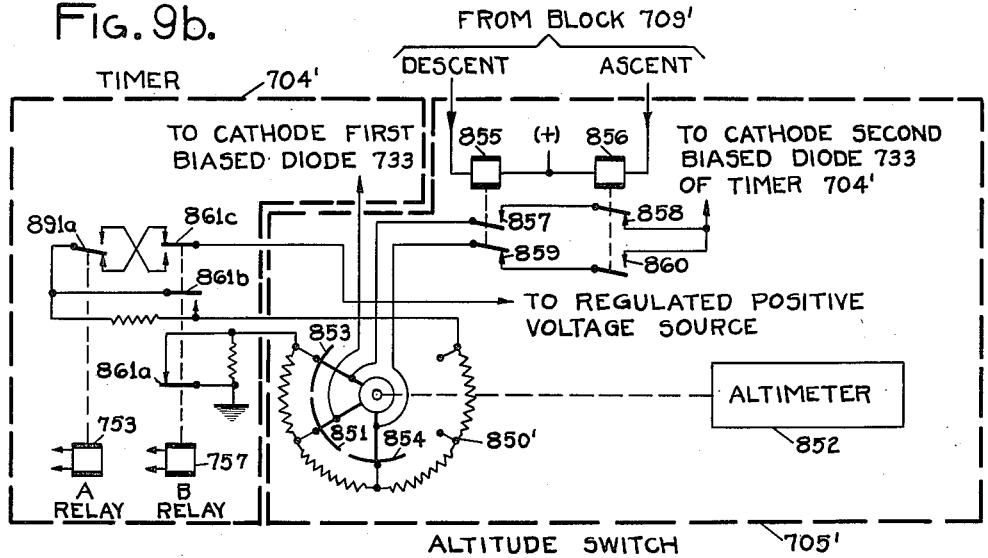
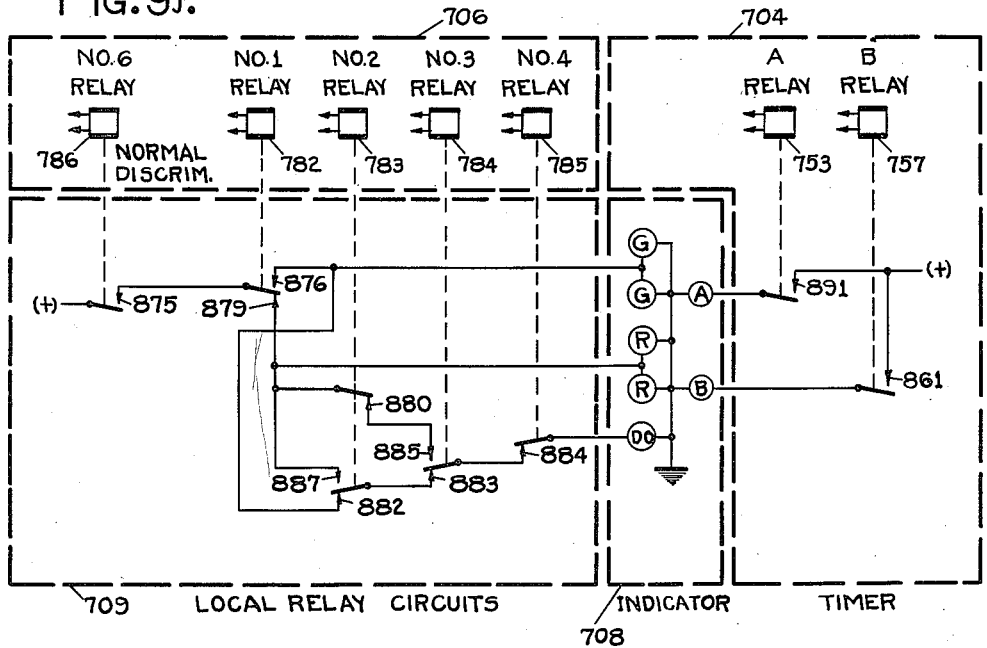

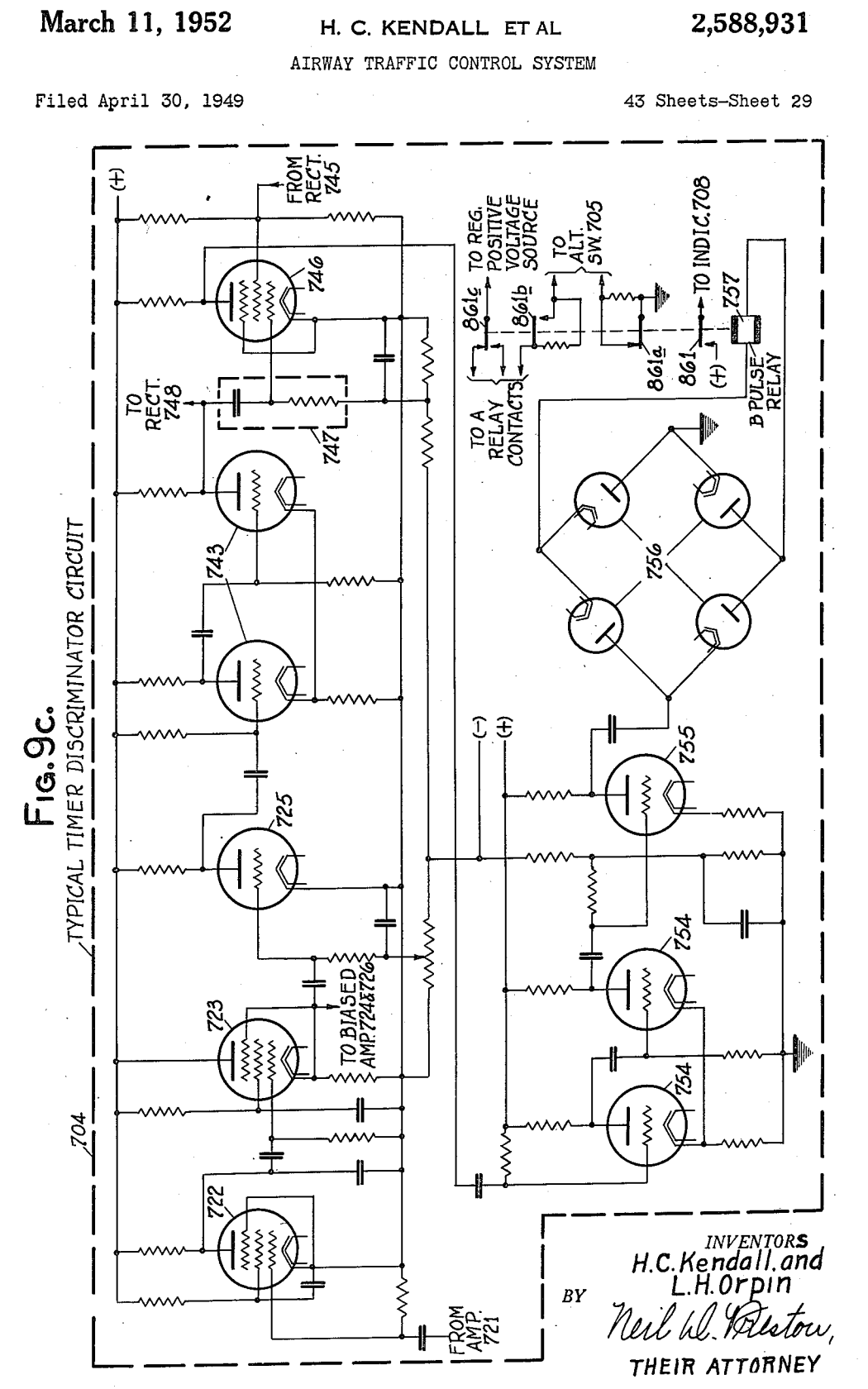

March 11, 1952  H. C. KENDALL ET AL  2,588,931
AIRWAY TRAFFIC CONTROL SYSTEM
Filed April 30, 1949  43 Sheets-Sheet 29

FIG. 9c.

INVENTORS
H. C. Kendall and
L. H. Orpin
BY Neil W. Preston,
THEIR ATTORNEY

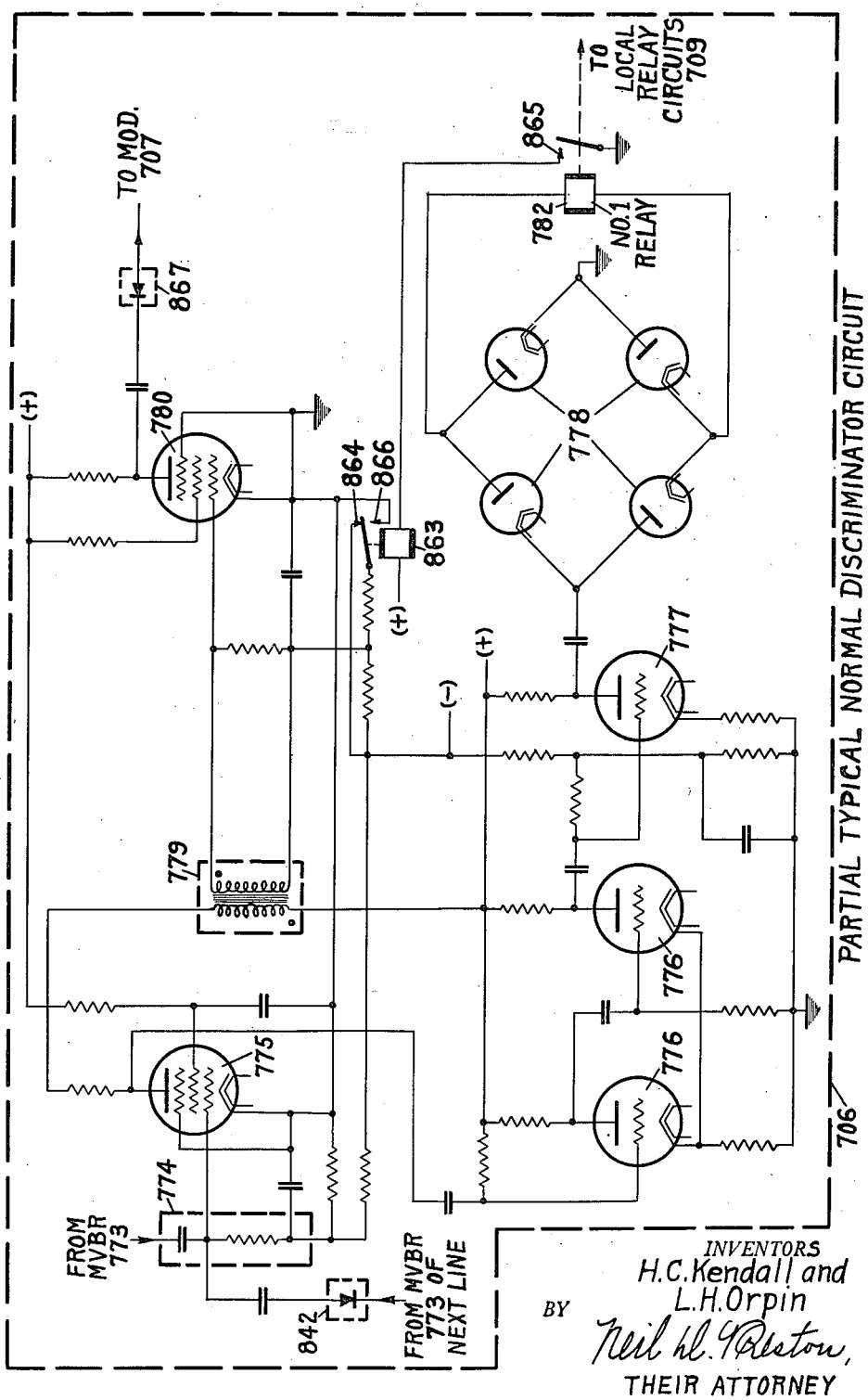

March 11, 1952

H. C. KENDALL ET AL 2,588,931

AIRWAY TRAFFIC CONTROL SYSTEM

Filed April 30, 1949

INVENTORS
H.C. Kendall and
L.H. Orpin
BY
Neil W. Preston,
THEIR ATTORNEY

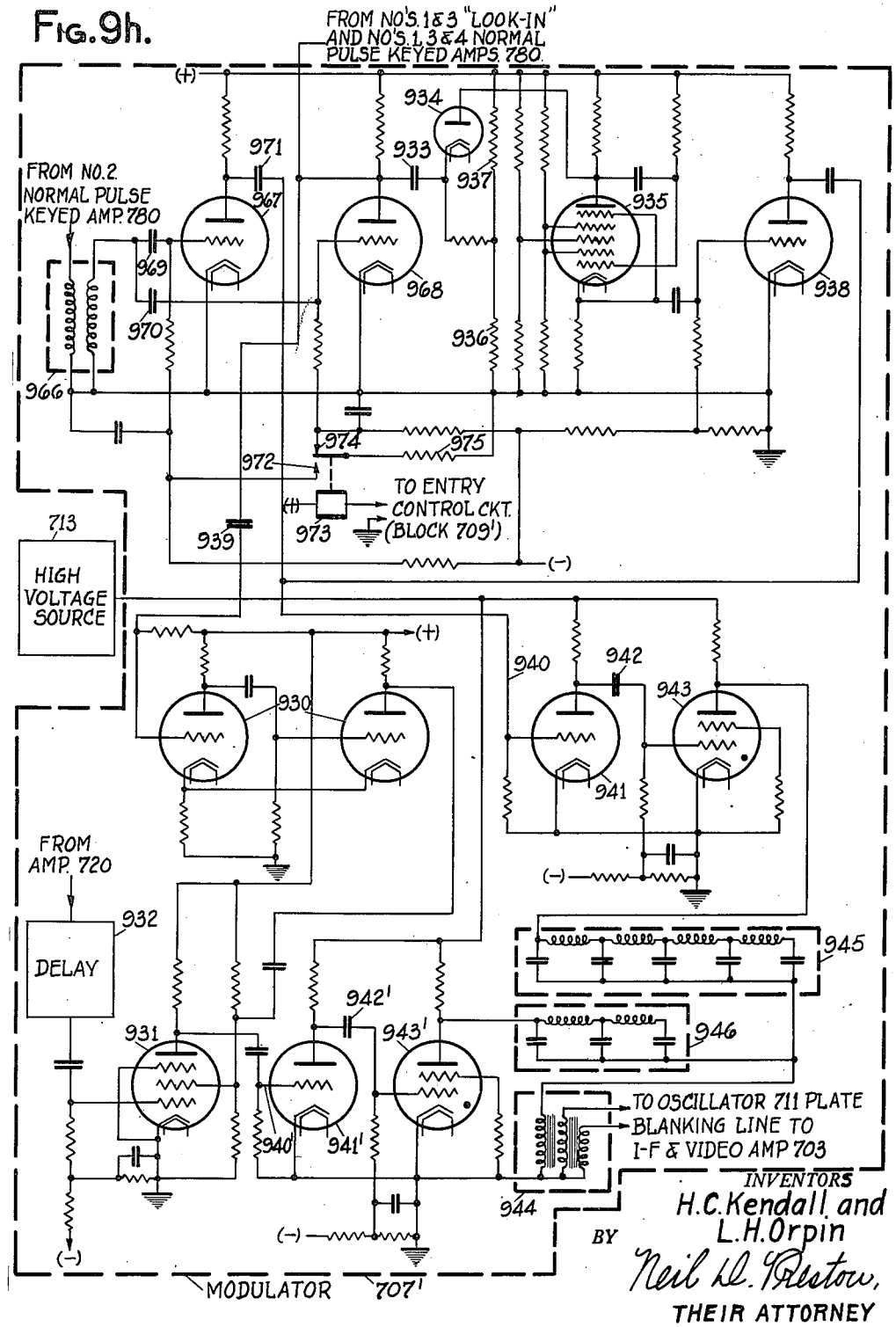

March 11, 1952   H. C. KENDALL ET AL   2,588,931
AIRWAY TRAFFIC CONTROL SYSTEM
Filed April 30, 1949   43 Sheets-Sheet 34
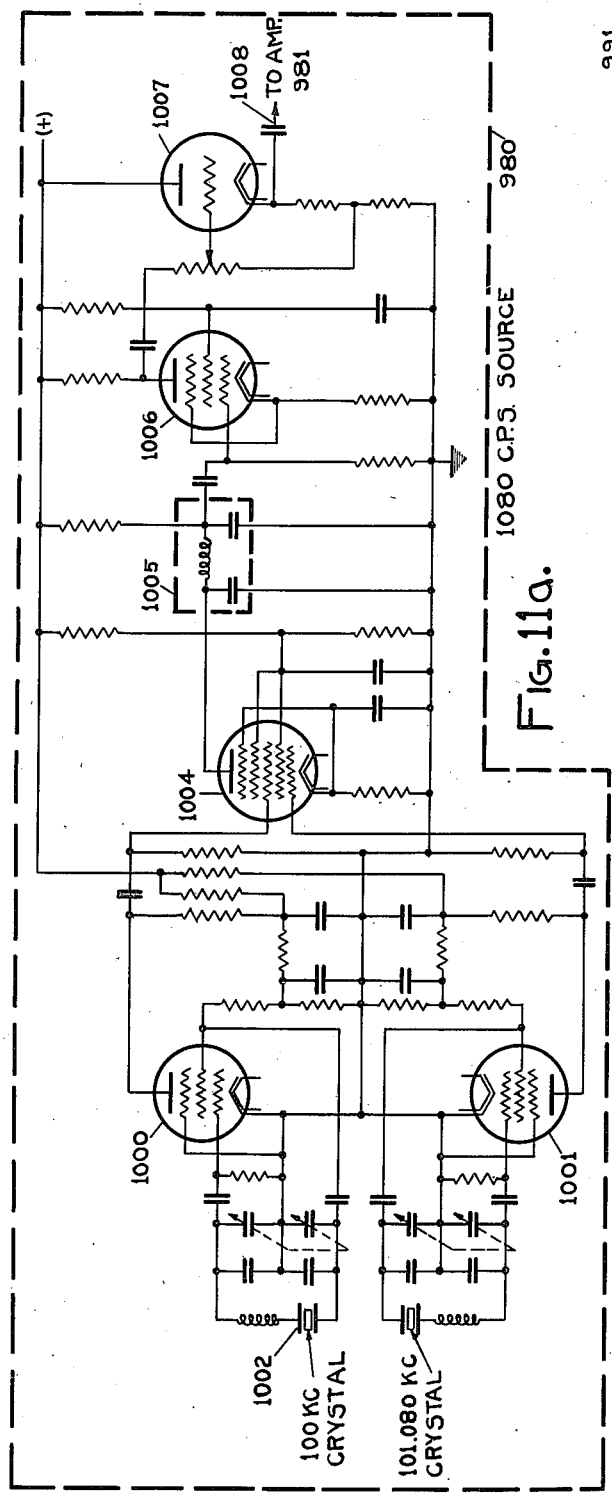
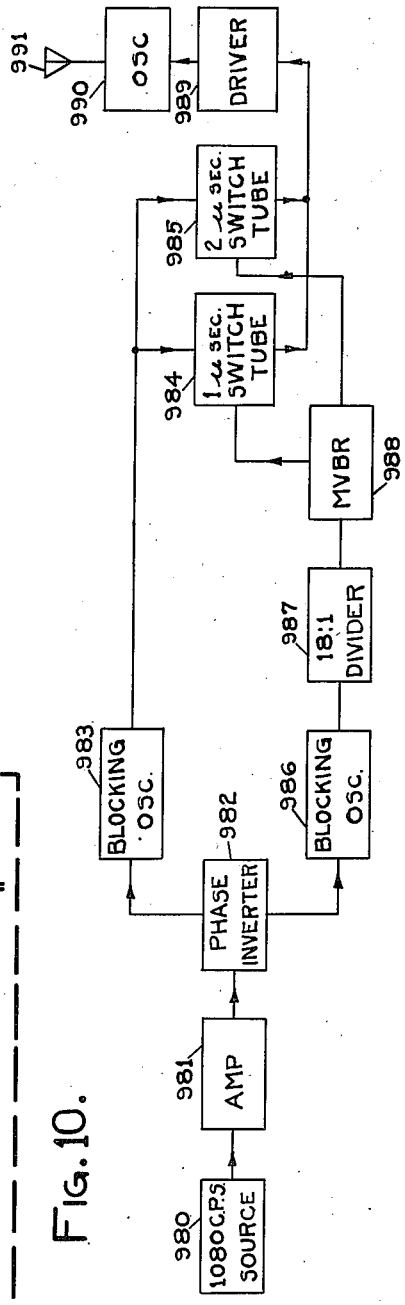
INVENTORS
H.C. Kendall and
L.H. Orpin
BY
THEIR ATTORNEY

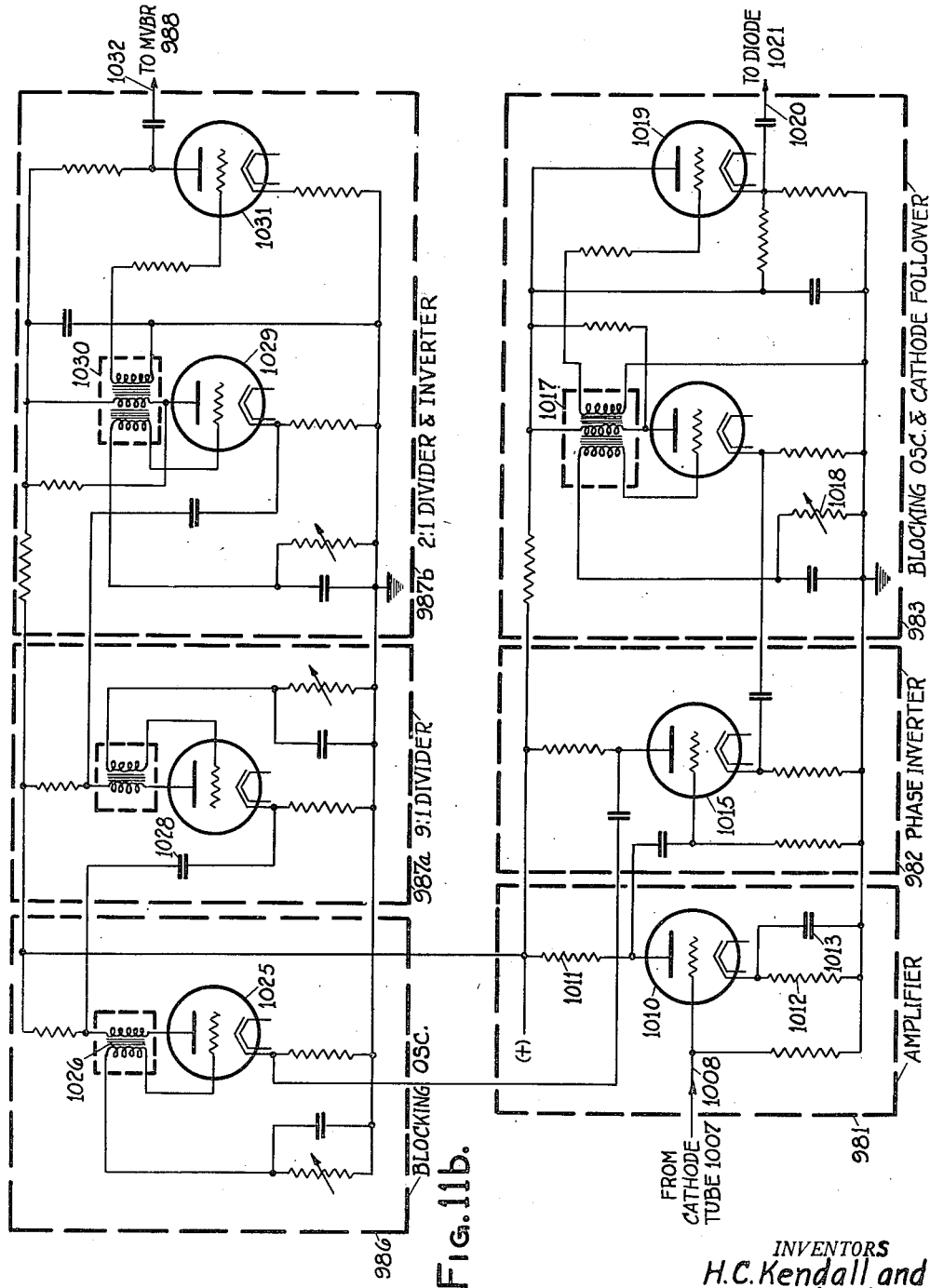

March 11, 1952

H. C. KENDALL ET AL 2,588,931

AIRWAY TRAFFIC CONTROL SYSTEM

Filed April 30, 1949

INVENTORS
H.C. Kendall and
L.H. Orpin
BY
Neil W. Bristow,
THEIR ATTORNEY

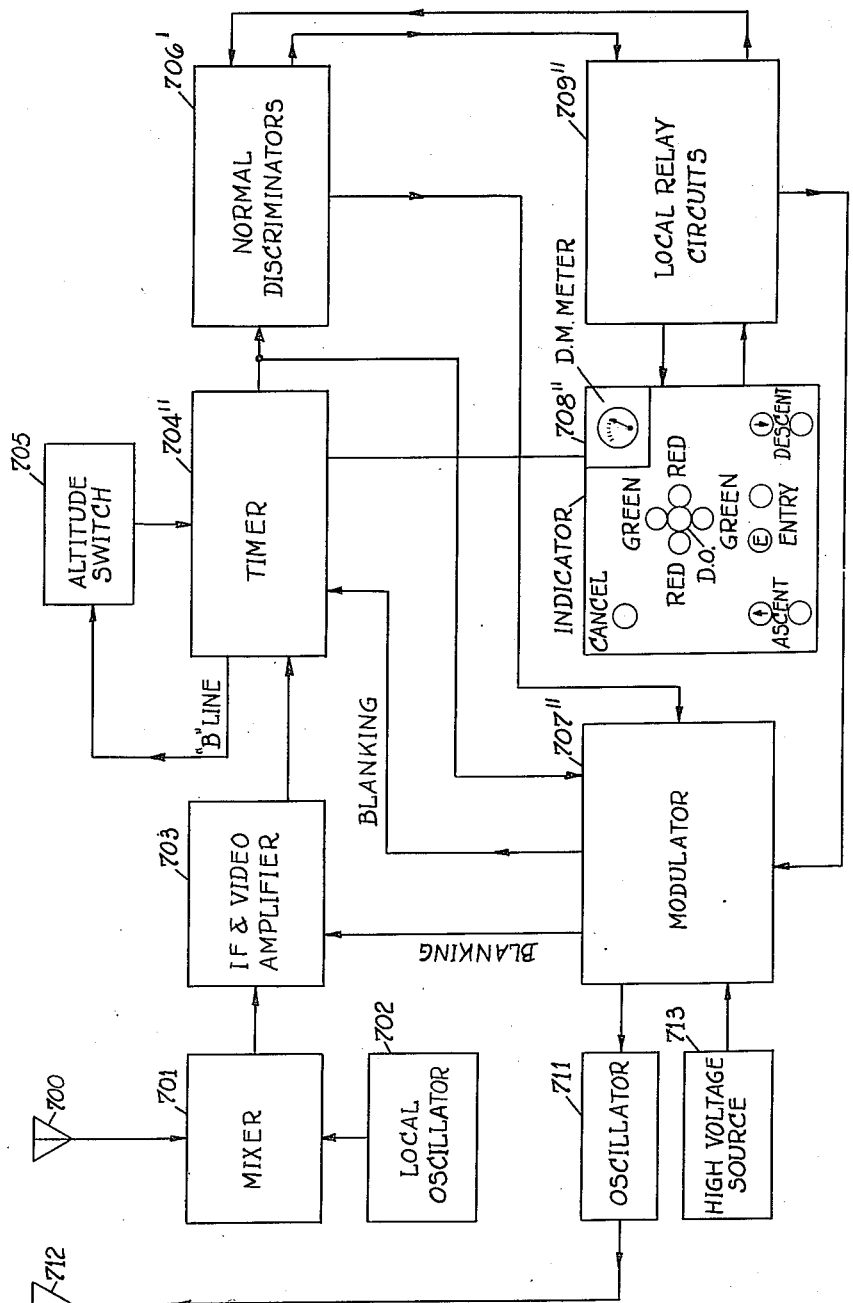

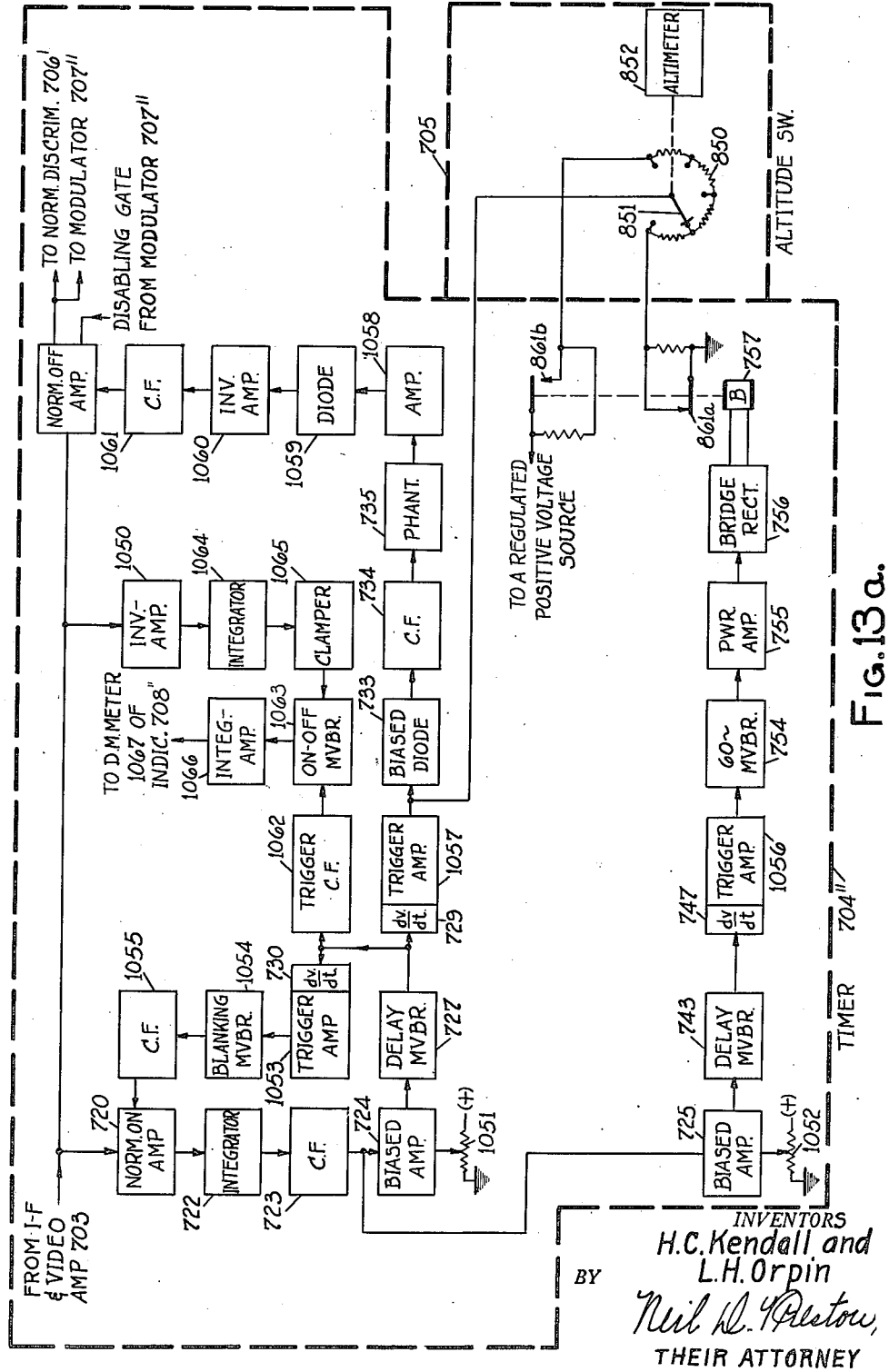

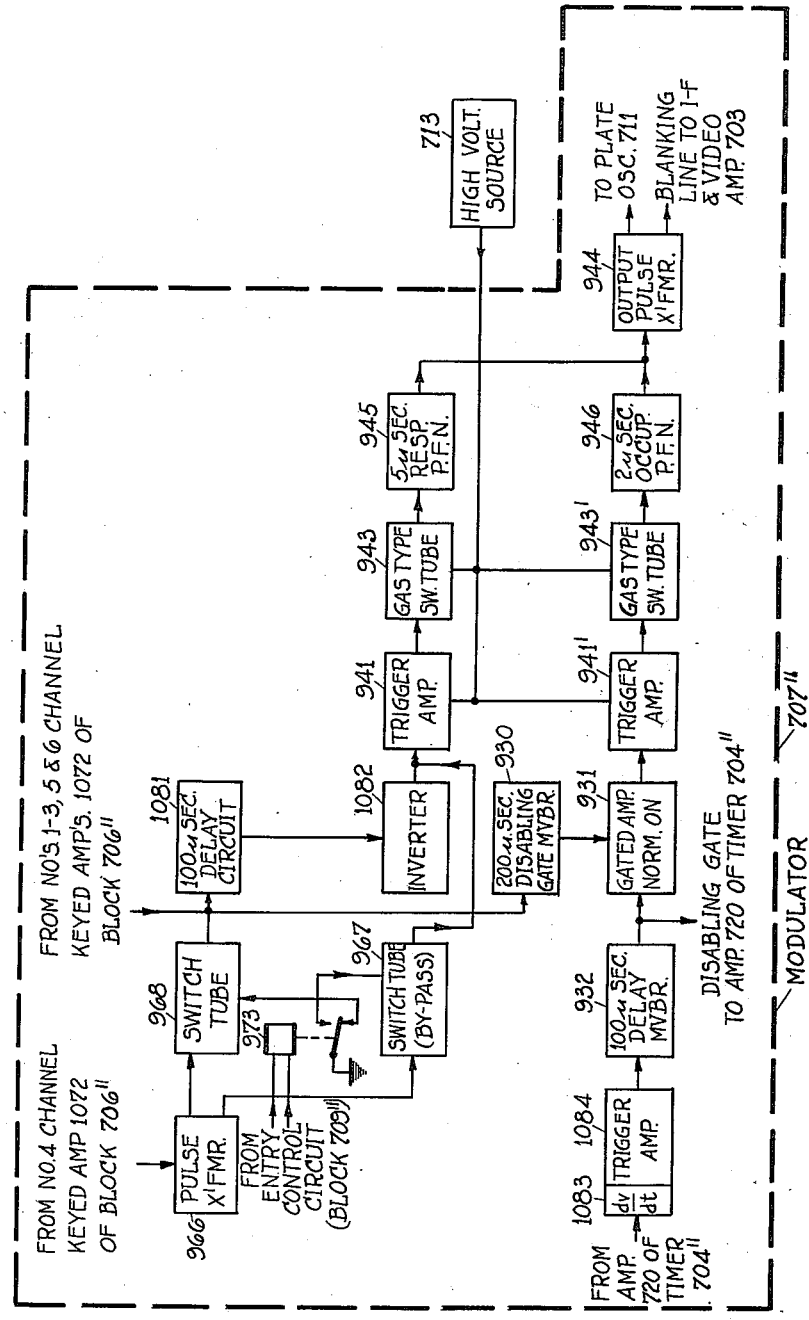

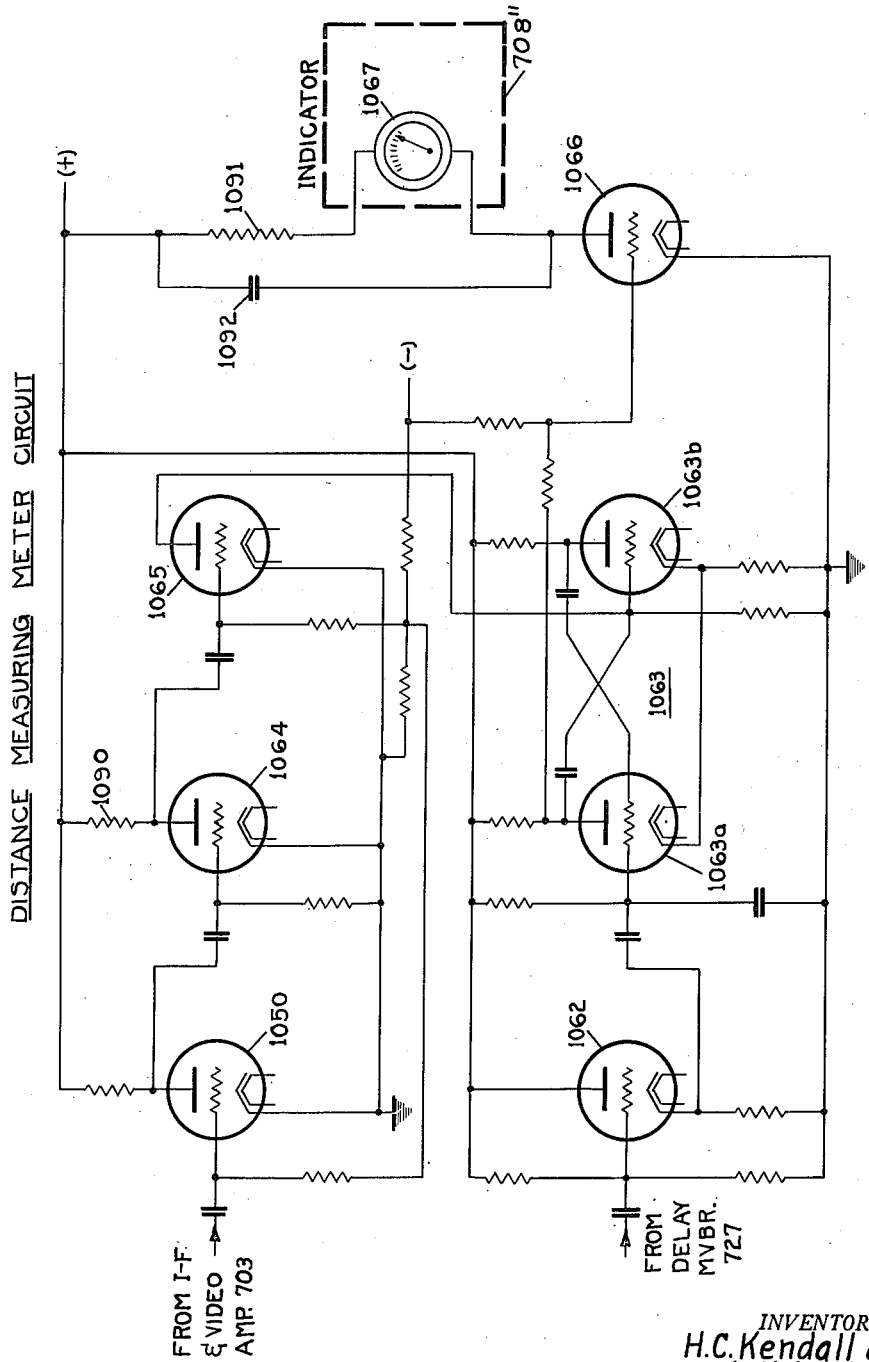

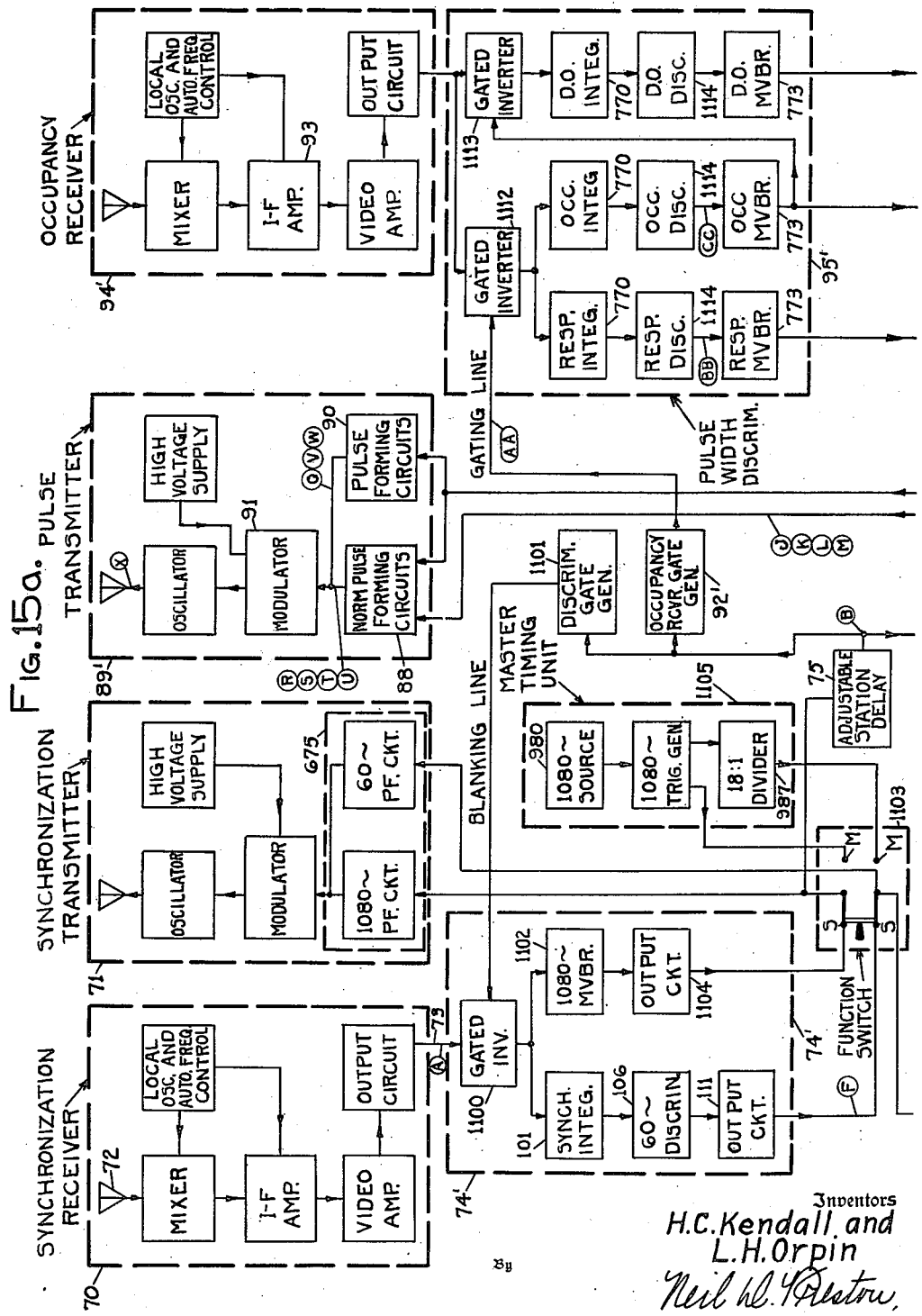

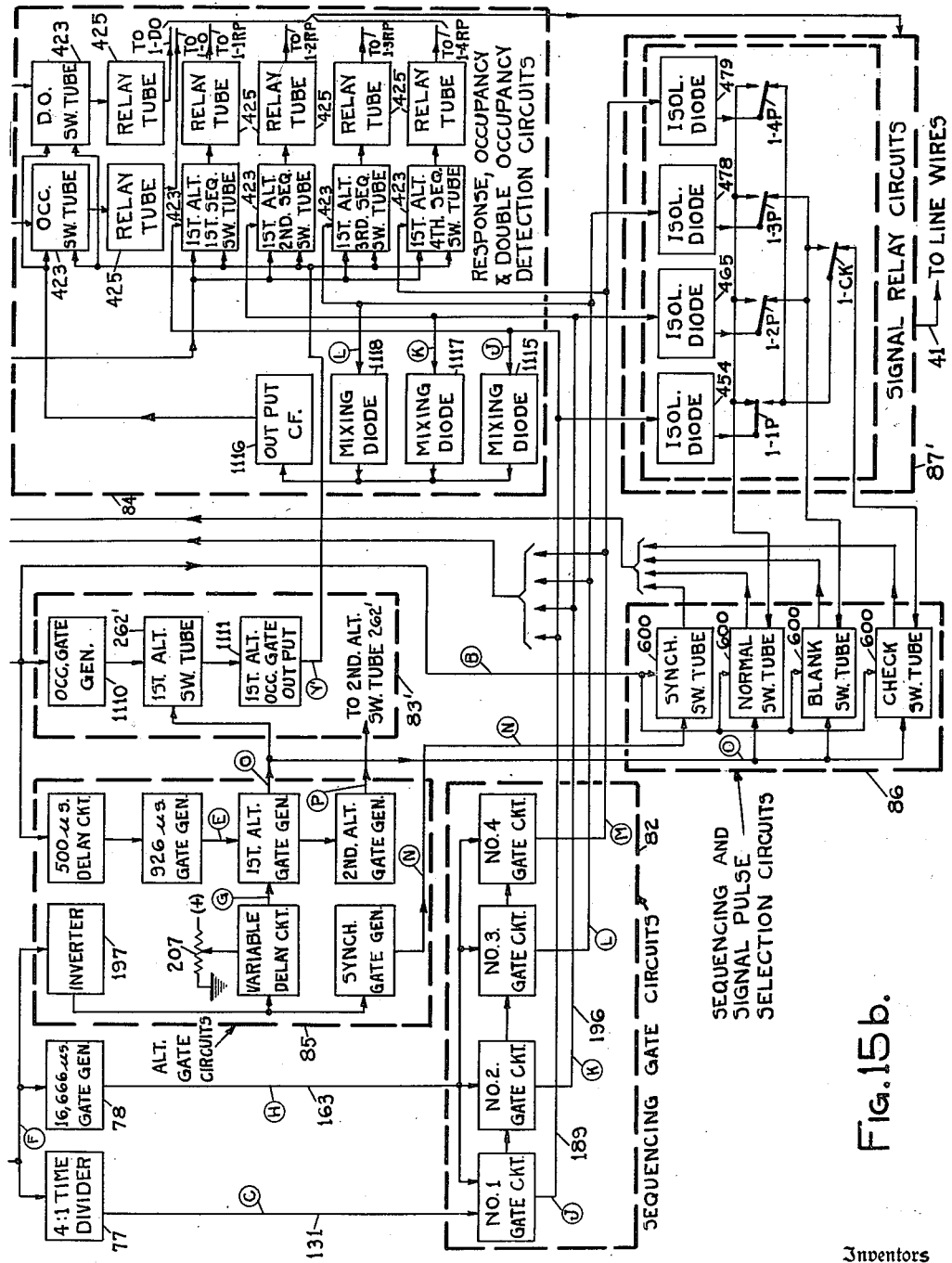

UNITED STATES PATENT OFFICE 2,588,931

AIRWAY TRAFFIC CONTROL SYSTEM

Hugh C. Kendall, Rochester, and Lionel H. Orpin, Greece, N. Y., assignors to General Railway Signal Company, Rochester, N. Y.

Application April 30, 1949, Serial No. 90,742

31 Claims. (Cl. 343—6)

This invention relates to control system particularly adapted to airway traffic control for detecting the presence of and communicating with aircraft at distinctive altitude zones within predetermined boundaries, wherein signals in the cabin of the aircraft indicate information and distinctive traffic conditions at one or more altitudes.

This application is a continuation-in-part of application Serial No. 743,046 filed April 22, 1947, for an Airway Traffic Control System, and which in turn is a continuation-in-part of application Serial No. 672,750 filed May 28, 1946, and also for an Airway Traffic Control System, now abandoned.

The rapid increase over the past decade in the number of commercial air lines and the consequent increase in the number of aircraft now flying along the air lanes has demonstrated that some means must be provided for a regular, regulated control of aircraft traffic along the air lanes during every sort of weather condition which must work as well at night as by day. The present invention divides each air lane up into separate and distinct "blocks." Each "block" is further horizontally divided by horizontal boundaries into strata or altitude zones. Associated with each "block" is a control ground station, and each aircraft carries associated equipment so that communication may be had by radiant energy means between each aircraft and the nearest ground station. Further, visual and/or audible signalling is provided within each aircraft for ease in determining air lane traffic conditions for that aircraft. Another problem presented by aircraft traffic is that of congestion at the intersections of various air lanes and at airports at the terminations of the air lanes, and the present invention is adapted to handle aircraft traffic problems in the air space around an airport or other congested area as well as along an air lane.

Briefly, our invention provides a selective detection and communication system particularly adapted for airway traffic control in which a plurality of ground stations transmit pulses of very high-frequency radiant energy omni-directionally into the atmosphere, these pulses being so timed with relation to one another that corresponding pulses from adjacent ground stations in general appear simultaneously at block boundaries defined thereby between adjacent stations. Such timed pulse transmission is obtained by controlling the transmission of the pulses from the ground stations by means of a master station and by providing at each ground station delays generally inversely proportional to the distance from the ground station to the master station. Each aircraft in the vicinity of these ground stations receives the pulses from the nearest station and transmits in response thereto corresponding pulses to the ground to signify the presence of the aircraft, additional pulses then being radiated from this nearest ground station to the aircraft to convey information regarding traffic conditions in the atmosphere adjacent the aircraft and/or travel instructions. The receiver at each ground station for receiving the reply pulses from the aircraft within the block boundary is gated, or turned off, at a predetermined time after the transmission of each pulse from that ground station in order that reply signals only from aircraft within the block boundary, defined as above, of the ground station will be received thereat. The pulses transmitted by each ground station are transmitted in cycles, each cycle comprising a synchronizing or "synch" pulse followed by a plurality of timed information pulses, each information pulse being intended for and characterizing traffic conditions adjacent a particular altitude zone. The variable characteristic of each of these information pulses is continuously controlled not only by the particular ground station from which it is transmitted but also by the adjacent ground stations, which preferably are arranged serially along an air lane, in order to give continuous accurate traffic information along the air lane. Each aircraft within the block boundary of a particular ground station receives all the pulses transmitted from this nearest ground station, but not those transmitted from adjacent ground stations, because of a gating control on its receiver. The aircraft replies automatically to those information pulses intended for its particular altitude zone and characterizing traffic conditions adjacent thereto, but does not reply to synch pulses, and these reply pulses in turn are received by the nearest ground station, thus manifesting occupancy by the aircraft in its particular altitude zone within the ground station block boundary. Preferably, successive pulses intended for a particular altitude zone are transmitted from each ground station in the form of a code, and the reply pulses automatically transmitted by the aircraft in that particular zone are characterized in accordance with the code received. A comparison device is provided at the ground station and, when it has been determined, after receipt at the ground station of these characterized reply pulses, by means of this comparison device, that the pulse code has been received at the aircraft, the code is changed as successively transmitted by the ground station to include a "check" pulse which activates an indicator in the aircraft in accordance with the particular pulse code previously received. Thus, it is insured that an aircraft does not receive faulty indications, due to the checking at the ground station of the receipt at the aircraft of the complete pulse code message before the aircraft indicator can be actuated. In order to adequately identify adjacent ground stations near the block boundaries the widths of synchronizing pulses transmitted by adjacent ground stations is alternated. Thus the first ground station of a series transmit synchronizing pulses all of a first width, the second station synchronizing pulses all of a second width, the third station synchronizing pulses all of the first width again, the fourth station all of the second width again, etc. In order to adequately distinguish between information pulses transmitted from adjacent ground stations when an aircraft is located near the block boundaries an additional fixed delay is provided between the information pulses and the preceding synch pulse transmitted by alternate ground stations, and equipment is provided in the aircraft to gate its receiver on at a correspondingly later time in order to receive these later transmitted information pulses, this additional gating feature being controlled by the reception of the preceding predetermined width synch pulse from the corresponding alternate ground station.

These and other features of our invention will be more apparent from the following description when taken with the accompanying drawings in which:

Fig. 1b is a plan view from above of Fig. 1a;

Fig. 2a is a graphical representation with respect to time of certain pulses associated with the operation of the embodiment of Fig. 1a;

Fig. 2b is a graphical representation in three dimensions of Fig. 2a;

Fig. 3 is a graphical representation with respect to time of certain pulses associated with the operation of alternate ground stations of the embodiment of Fig. 1a.

Figs. 4a and 4b show a block diagram of one ground station equipment;

Figure 7B:
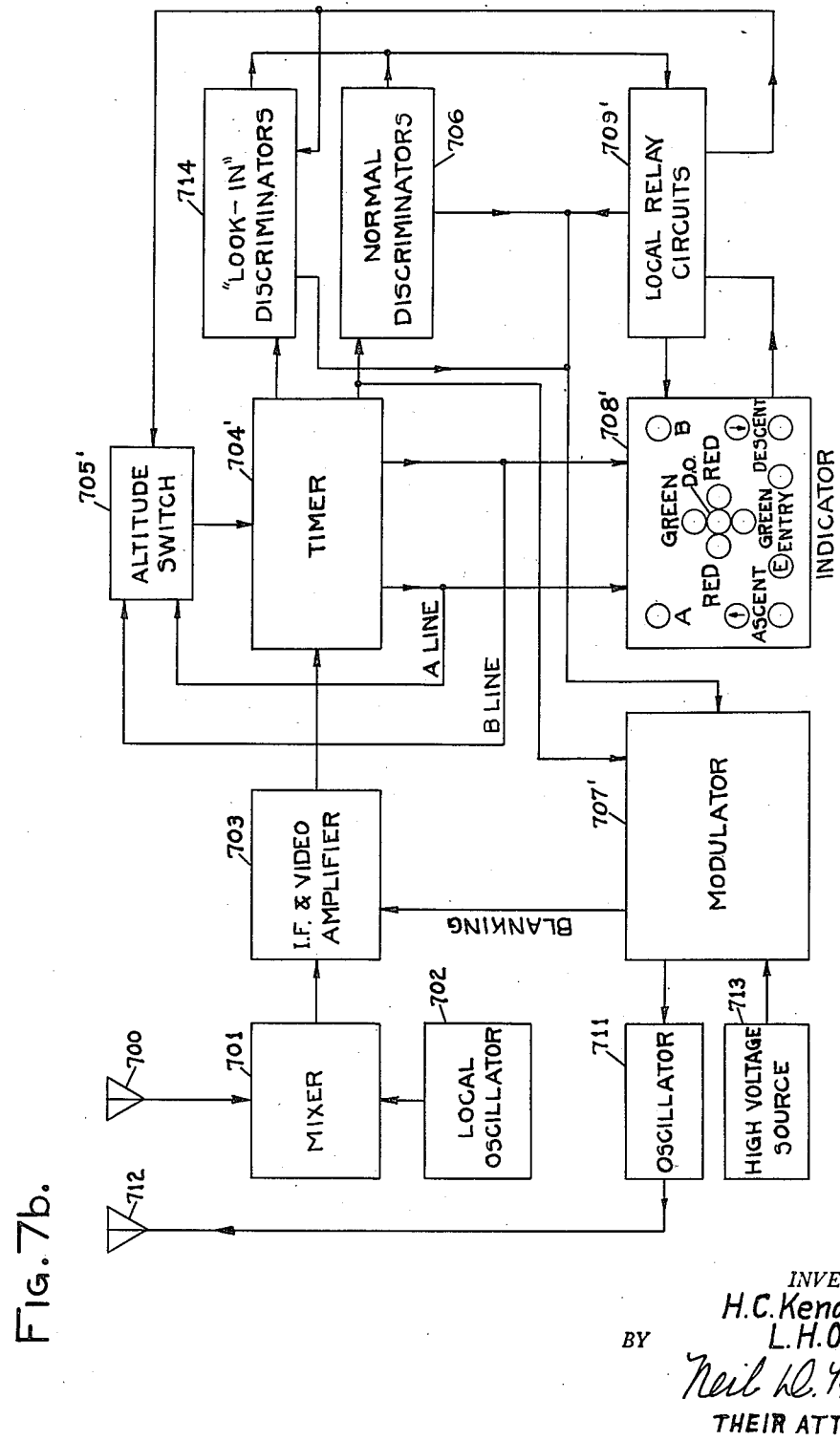
Figure 8A:
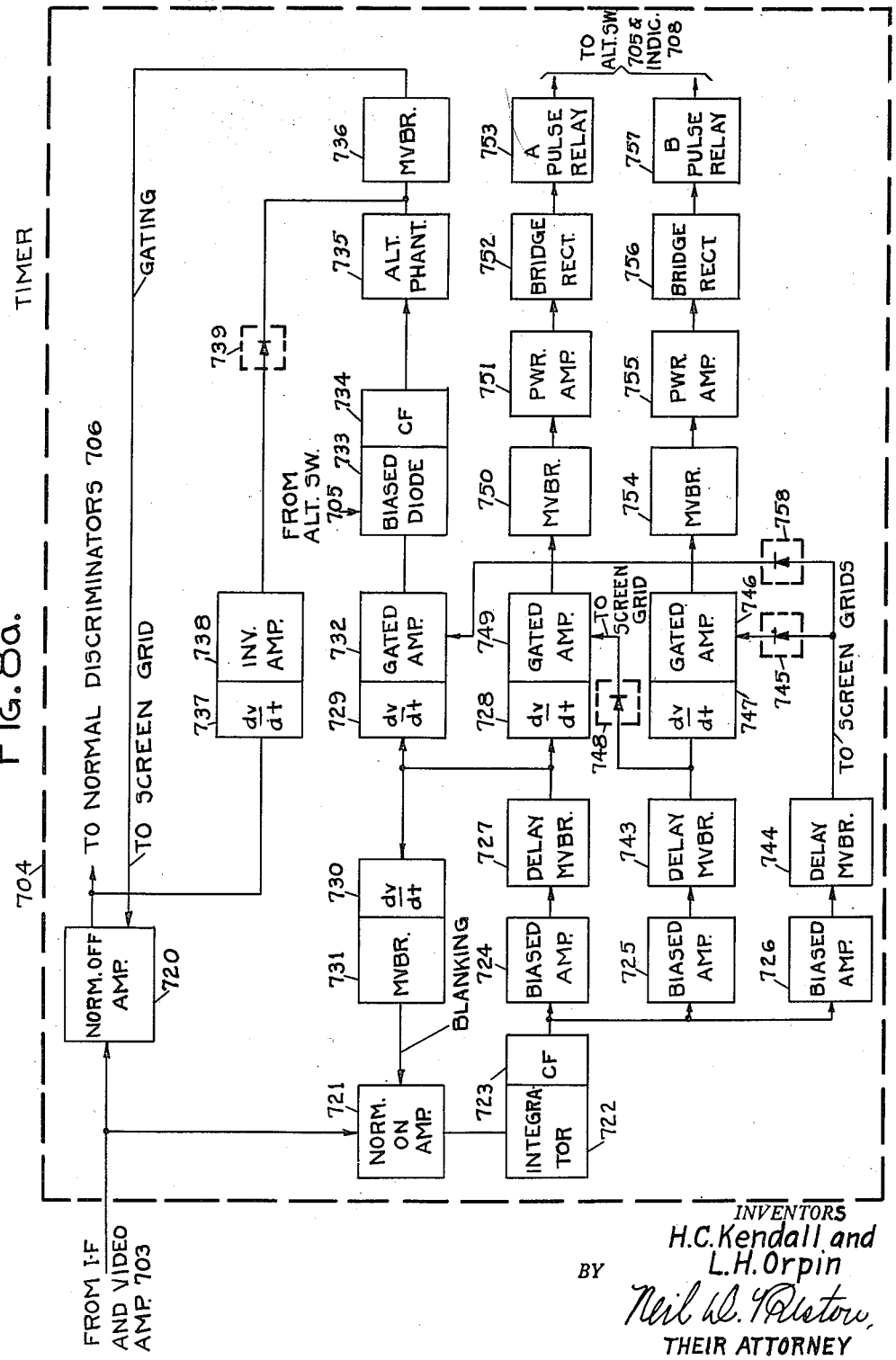
Figure 13B:
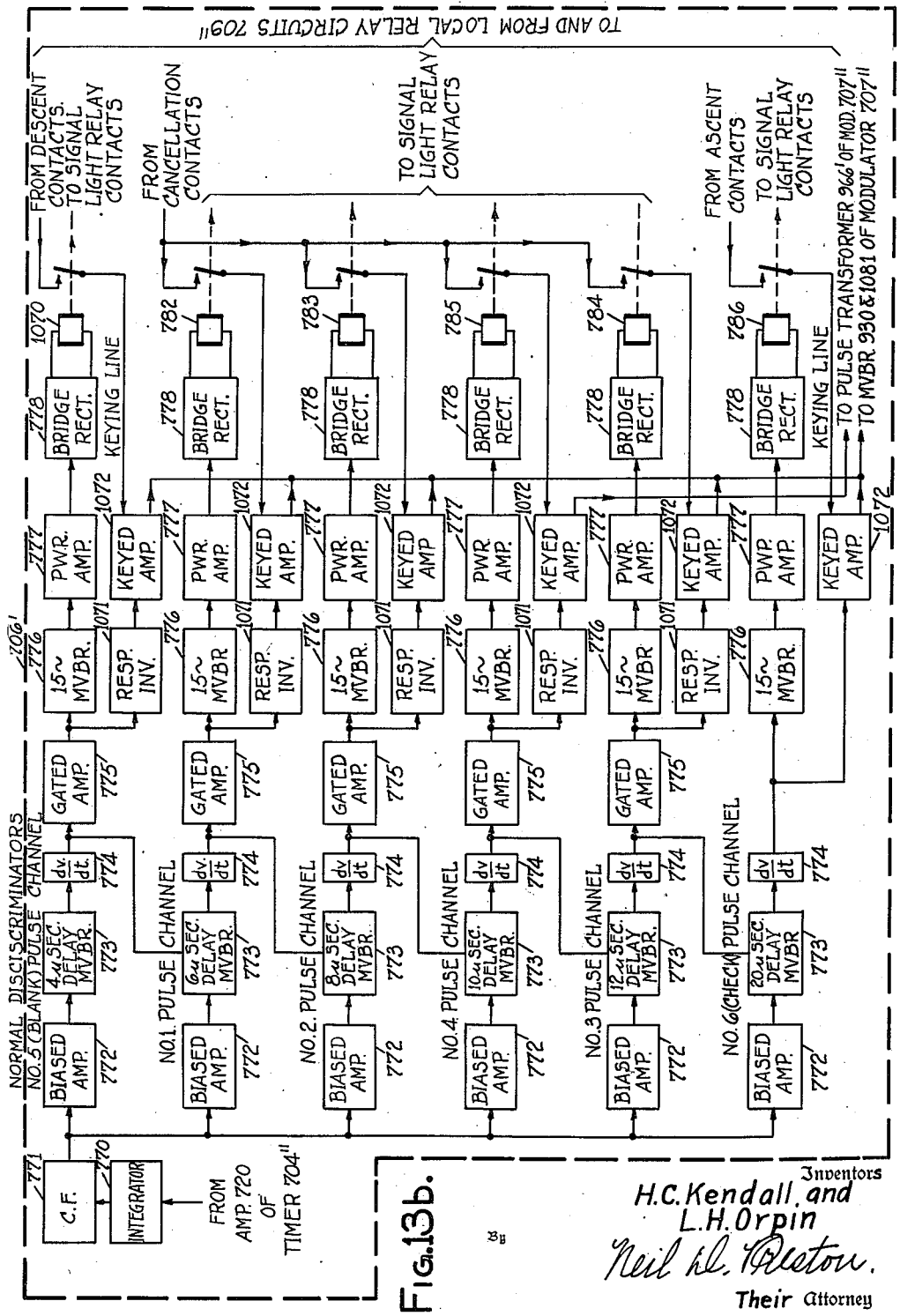

Figs. 5a, 5b, 5c, and 5d are graphical representations with respect to time of the waveforms associated with the operation of the ground station of Figs. 4a and 4b;

Figs. 6a through 6o are detailed circuit diagrams of the embodiment shown in block diagram form in Figs. 4a and 4b;

Figs. 7a and 7b show alternative embodiments of the airborne equipment in block diagram form;

Figs. 8a, 8b, and 8c illustrate in more detailed block diagram form certain of the airborne equipment circuits;

Figs. 9a through 9h are detailed circuit diagrams of the embodiments shown in block diagram form in Figs. 7a and 7b and 8a, 8b, and 8c;

Fig. 10 is a block diagram of a master timer adapted to control the ground stations;

Figs. 11a, 11b, and 11c are detailed circuit diagrams of the embodiment shown in block diagram form in Fig. 10;

Fig. 12 shows an alternative embodiment of the airborne equipment in block diagram form;

Figs. 13a, 13b, and 13c illustrate in more detailed block diagram form certain of these airborne equipment circuits;

Fig. 14 is a detailed circuit diagram of the distance-measuring meter circuit shown in block diagram form in Fig. 13a; and Figs. 15a and 15b show an alternative embodiment of ground station equipment in block diagram form.

Figure 1A:
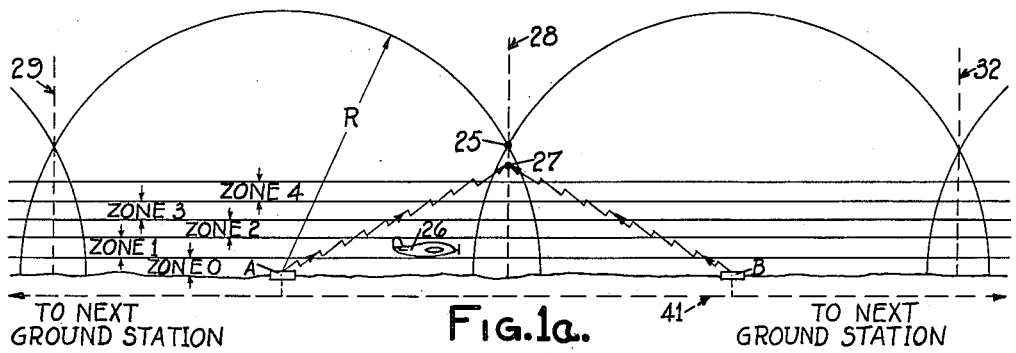
Fig. 1a is an elevation view illustrating one of the principles upon which one embodiment of this invention operates.

Fig. 1a illustrates one of the principles upon which this invention operates. Ground stations A and B located some distance apart are adapted to transmit simultaneously pulses of radiant energy at the same frequency. Since electromagnetic energy is propagated through space at a speed of 186,000 miles per second, it takes a given pulse of energy 5.36 millionths of a second or microseconds ($\mu s$.) to travel one mile. This is a finite and measurable length of time, and, therefore, use can be made of the fact that the range of an object from a given pulse source is directly proportional to the length of time taken by a pulse to traverse the distance to the object and back to the source, assuming that the pulse transmitted to the object is reflected by the object itself in a manner similar to the well-known radar method of detection. An alternative method, used by this invention, is to provide apparatus at the object which transmits a reply pulse back to the pulse source whenever it receives a pulse therefrom, and range is then measured by the time elapsed between the transmission of the outgoing pulse from the pulse source and the reception of the reply pulse at the pulse source less the short inherent delay introduced by the reply apparatus at the object between the time of reception of the pulse and transmission of the reply pulse. By adjusting the receiving apparatus at the pulse source (in the embodiment here described, the ground station) so that reply pulses are received only for a limited time after the transmission of a pulse from the pulse source, each ground station will determine block boundaries in the form of hemispheres of radius R as illustrated, this radius being adjusted to be approximately one-half the distance between the ground station and the next adjacent ground station. As shown, and as will be discussed more fully hereinafter in connection with Fig. 1c, it is desirable to make this radius slightly longer than one-half this distance so that adjacent hemispheres overlap at a point higher than the uppermost altitude with which communication is desired, as at point 25. This will cause some overlap between adjacent blocks, shown greatly exaggerated in Fig. 1a, but as will be pointed out hereinafter, this overlap has no effect in operation. To aid in the explanation of the operation of the system, part of each hemisphere shown has been divided into four distinct altitude zones numbered respectively 1 through 4, the space between zone 1 and ground being designated as zone 0, and an aircraft 26 is shown flying in altitude zone 1 in block A.

One possible path for the pulses radiated simultaneously from ground stations A and B is shown by the zigzag lines ending at point 27 equi-distant between stations A and B as indicated by zone boundary 28. In order to adequately identify adjacent ground stations near the zone boundaries, it is preferable to alternate the widths of synchronizing pulses transmitted by adjacent stations. For instance, station A might transmit a one microsecond pulse, station B a two microsecond pulse, station C a one microsecond pulse, station D a two microsecond pulse, etc. Any aircraft flying slightly to the left in Fig. 1a of zone boundary 28 would then receive a synchronizing pulse from station A slightly before a corresponding pulse from station B, since the two were transmitted simultaneously and each travel with the same speed through space. From this it follows that an aircraft at zone boundary 28 (for instance, at point 27) would receive both pulses simultaneously, and if to the right of zone boundary 28 it would receive the pulse from station B before that from station A. Thus, it is apparent that the overlap of adjacent ground station hemispheres at the lower altitudes is of no importance in operation since the first pulse received by an aircraft defines the block in which the aircraft shows occupancy, and it is only at a boundary line between two adjacent blocks that two pulses are received simultaneously. Indeed, this fact can be used to advantage to indicate to the aircraft the fact that it is leaving one block and entering another.

Figure 1B:
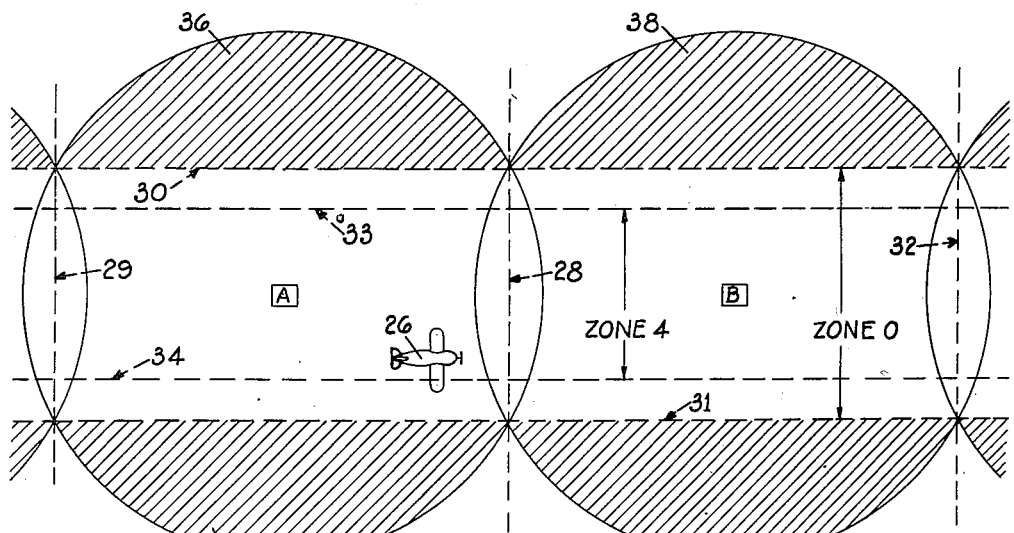
Figure 1C:
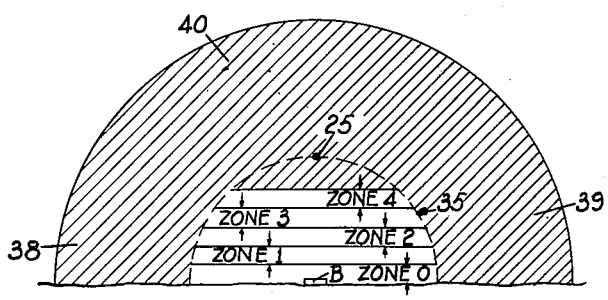
Fig. 1c represents figuratively the view that an operator of the aircraft shown in Fig. 1a has looking toward block B.

By simple geometric analysis it may be shown that an air lane may be divided according to this invention into approximately rectangular polyhedrons for any particular altitude zone. For example, as shown in Fig. 1b, altitude zone 0 is approximately defined by straight lines 28, 29, 30 and 31 for block A and straight lines 28, 30, 31 and 32 for block B, and altitude zone 4 by straight lines 28, 29, 33 and 34 for block A and straight lines 28, 32, 33 and 34 for block B. The difference in width of the altitude zones thus defined at different altitudes can best be explained by reference to Fig. 1c, which is the view that aircraft 26 figuratively has looking toward block B. Although, as above-described, each block is defined as a hemisphere, the continuous air lane available to aircraft is limited by the proximity of the centers of the hemispheres and their respective radii, and if the radii are made greater than half the distance between the centers of the hemispheres (assuming hemispheres of equal size) this continuous air lane thus defined takes the form of a demicylinder, as outlined by dotted line 35 in Fig. 1c. Thus while it is desirable to space the ground stations of the system as far apart as possible in order to reduce the number of ground station equipments required, yet they must be close enough together to give adequate dependable operation and rapid change of intelligence regarding aircraft movement, and the block hemispheres must overlap sufficiently to insure altitude zones of adequate width at the highest altitude at which aircraft normally travel. Since commercial aircraft at present do not normally fly higher than two miles, one ground station arrangement might be with equal hemispheres or blocks of 10-mile radius spaced 19.1 miles apart center-to-center. These hemispheres would then intersect at a point (for example, point 25, Figs. 1a and 1c) three miles (15,840 feet) above the ground, the continuous air lane zone in the form of a demicylinder thus defined being six miles wide at ground level and only diminishing to 4.57 miles wide at an altitude of 10,560 feet (2 miles).

The shaded areas shown at 36, 37, 38, 39 and 40 (Figs. 1b and 1c) defined by the hemispheres of each particular block but lying outside the continuously defined altitude zones will not ordinarily be used by an aircraft flying along a regular air lane, but are useful in various other circumstances—for instance, in the case of an aircraft desiring to enter upon an established air lane.

It is apparent that all blocks need not be of the same length, although for purposes of simplicity of illustration and description the explanation thus far and the one which follows hereinafter will assume blocks of the same length. When the blocks are of less than the maximum length, delays in pulse transmission are created which cause the pulses transmitted from the ground station of the block having the shorter length to be delayed by such a time that the pulses of all the blocks arrive at their respective orbits simultaneously. For example, in Fig. 1a if block B were to be of lesser length than block A, transmission of a pulse from block B instead of occurring simultaneously with that of block A would be delayed after that from A by a length of time such that the pulse transmitted by station B and the corresponding pulse transmitted by station A would arrive at their respective hemispherical orbits simultaneously.

As is shown in Fig. 1a by dotted line 41, a communication system between ground stations is supplied, as for instance by line wires, so that information regarding aircraft within the block serviced by each ground station may be transmitted to any other ground station as desired.

Referring now also to Fig. 2a, operation of the system will be described briefly with respect to one block. As is shown in line A of Fig. 2a, a synchronizing pulse 50 (hereinafter called a synch pulse) is followed by a series of altitude or information pulses 51, 52, 53 and 54 delayed by times $t$, $u$, $v$, and $w$ respectively after synch pulse 50 for interval or scan I. The time interval between each successive altitude or information pulse is preferably made the same. In other words, $u$ minus $t$ equals $v$ minus $u$ equals $w$ minus $v$. Pulse 51 is intended to convey information to aircraft in zone 1, pulse 52 to zone 2, pulse 53 to zone 3, and pulse 54 to zone 4. In the embodiment of the system here explained, a synch pulse may be immediately distinguished by an aircraft from an information pulse because all synch pulses from a particular ground station are of the same width, which width is always different than that of any information pulse. When these pulses are radiated from ground station A (Fig. 1a) they will all eventually arrive at aircraft 26. Apparatus in aircraft 26 will receive synch pulse 50 and then disable itself for a time interval corresponding to the time delay between pulse 50 and the pulse intended to convey information to the particular altitude at which the aircraft is flying. This disabling is governed by a timing device including an altimeter. While in this example information pulse 51 has been chosen as corresponding to zone 1 for purposes of simplicity, it should be obvious that by proper timing methods any pulse could be made to correspond to any particular altitude zone. At time $t$ after synch pulse 50 was received, the apparatus in aircraft 26 is enabled or turned on again in time to receive pulse 51 and immediately thereafter disabled again until it is time for another synch pulse to be received. After receiving pulse 51, supplementary apparatus in the aircraft may transmit a reply pulse 55, shown in line B of Fig. 2a, back to ground station A. Some microseconds later (dependent upon the length of radius R and the circuit constants of the system) scan II starts, and another synch pulse 56 is transmitted from ground station A, followed by altitude pulses 57, 58, 59 and 60, each altitude pulse being delayed by the same amount of time as the corresponding altitude pulse in scan I, but each pulse not necessarily being of the same width as in scan I. Again, pulse 57 is intended to convey information to aircraft in zone 1, pulse 58 to zone 2, pulse 59 to zone 3, and pulse 60 to zone 4. The same process of reception of the synch pulse 56 and only the proper altitude or information pulse 57 by aircraft 26 and transmission of a reply pulse 61 is repeated. Scans III and IV of lines A and B (Fig. 2a) follow, again with each synch pulse being followed by a series of regularly spaced altitude pulses, each altitude pulse for a particular altitude zone being delayed by a predetermined time after its synch pulse, but each altitude pulse of a particular scan not necessarily being of the same pulse width as that of the preceding scan, although it may be. As will be more fully discussed hereinafter, the reply pulses from the aircraft may be coded for various purposes also. Thus the aircraft may reply with pulses of one width to altitude pulses from one ground station and with pulses of another width to altitude pulses from the next station along the air lane, and the coding may be arranged so that the aircraft does not reply to some altitude pulses at all, as was disclosed in the embodiment of our prior application Serial No. 743,046, filed April 22, 1947. Alternatively, as disclosed in the present embodiment, the aircraft may reply with pulses of one width to certain altitude pulses from each ground station and with pulses of another width to certain other altitude pulses from each ground station, relying upon the additional delay feature provided at alternate ground stations to prevent confusion between reply pulses transmitted from aircraft in the same altitude zone but located in adjacent blocks, as will be more fully described hereinafter. In both the prior embodiment and the present embodiment the aircraft do not reply to synchronizing pulses.

The use of these pulses of various widths to convey coded information to an aircraft is graphically represented in three dimensions in Fig. 2b. In order to identify the different scan periods, the system can be arranged so that distinctive widths are used during each scan. For instance, pulse widths 1, 2, or 3 might be transmitted during scan I, pulse widths 4, 5, or 6 during scan II, etc. As shown in scan I of Figs. 2a and 2b, information or altitude pulses 51, 52, 53 and 54 sent successively to altitude zones 1, 2, 3 and 4, respectively, are all of the same width. Scan II then ensues as indicated by following the dashed lines of Fig. 2b, with information pulses 57, 58 and 60 being of the same width and pulse 59 being slightly wider, all the pulse widths of scan II being different from that of scan I. Scan III follows next, starting with pulse 62, and finally scan IV, beginning with pulse 63. By inspection of Figs. 2a and 2b, it is thus seen that distinctive coded information in accordance with this invention may be transmitted to a plurality of altitude zones within a particular block, a single ground station such as is here described thus having great utility for directing air traffic in a congested area such as around an airport. While in the example there has been illustrated a code involving four scans and four altitude zones, it is apparent that the number of scans and/or altitude zones may be increased or decreased at will according to the requirements of the individual system. Also, the pulse widths are shown as being increased for each successive scan, but this is purely arbitrary and can also be changed at will.

As above-indicated, the use of two or more round stations requires some timing means to synchronize the pulsed output of the individual stations. This may be by means of a master timer located at one ground station and connected to other stations by line wires similar to those indicated by dotted line 41 in Fig. 1 for conveying block information from one ground station to another, or may be by means of radio links between ground stations as will be described hereinafter in connection with the detailed circuit explanation of one embodiment of the invention. Since it requires a finite time for timing information to travel from one ground station to another, some means of delay must be provided at each individual ground station except the last of a system between the time of reception of a timing signal and the transmission of a synch or information pulse if all stations are to transmit corresponding pulses simultaneously. For example, if in Fig. 1a the master timer was located at ground station A, it would be necessary to insert a delay in the transmitter at station A equal to the time required for the synchronizing signal to travel from station A to station B. Thus, at one instant the master timer at station A would send out a synchronizing signal which would be immediately received by the transmitter of station A and there delayed by the delay device inserted therein until the instant that the synchronizing signal was received by station B, thereby allowing the synchronizing pulses from stations A and B to be transmitted simultaneously as required by the system operation previously described. In order to define the block boundaries as above it is only necessary that the synchronizing pulses from adjacent stations be transmitted simultaneously if all block are to be of the same length, or that corresponding synch pulses from each two adjacent ground stations reach the block boundaries therebetween simultaneously if the blocks are of unequal lengths. More specifically, it is not necessary that the altitude or information pulses also be transmitted simultaneously by adjacent stations or so as to reach the block boundaries therebetween simultaneously, although this was done in the embodiment of our prior ATC application Serial No. 743,046, filed April 22, 1947.

The fact that the altitude or information pulses transmitted from adjacent ground stations need not be transmitted simultaneously or so as to reach the block boundaries therebetween simultaneously is utilized in the present embodiment in order to prevent confusion when an aircraft is in a particular altitude zone adjacent a block boundary and to distinguish between the corresponding altitude or information pulses transmitted by the ground station of the block in which the air craft is located and those transmitted by the nearest adjacent ground station. The manner in which this is done is illustrated in Fig. 3, which is a graphical representation with respect to time of corresponding synch and altitude or information pulses transmitted during one scan by adjacent ground stations. Line A of Fig. 3 is the same as the first portion of line A of Fig. 2a, in other words, scan I of the latter figure, and represents the pulses transmitted by the ground station of block A of Fig. 1a. Line A' of Fig. 3 represents the corresponding pulses transmitted by the ground station of block B of Fig. 1a. Since it has been assumed for purposes of illustration that blocks A and B are of the same length, synch pulse 50' is transmitted by the ground station of block B at the same time that synch pulse 50 is transmitted by the ground station of block A. However, an additional delay is then provided at the ground station of block B for each successive altitude or information pulse in addition to the normal times $t$, $u$, $v$, and $w$ by which the series of altitude or information pulses 51, 52, 53 and 54 are delayed after their corresponding synch pulse 50 from the ground station of block A, as illustrated in lines A of Figs. 2a and 3. This additional delay time has been indicated as $x$ in line A' of Fig. 3, and this time is preferably made equal to one-half the interval between successive altitude or information pulses.

When an aircraft, such as 26 of Fig. 1a, reaches the block boundary between two adjacent ground stations, such as boundary 28 of Fig. 1a, a crossover point will be reached where the synchronizing pulse 50' from the ground station of block B will be received before the synchronizing pulse 50 from the ground station of block A. When this occurs an additional delay circuit will be actuated in the aircraft so that the aircraft receiver will be gated on or open by a time equal to $x$ later than before for all altitudes. Thus the aircraft receiver will not be gated on or open at the time the altitude or information pulses such as 51, 52, 53 and 54 arrive at the aircraft but only when the altitude or information pulses 51', 52', 53' and 54' arrive thereat.

For the sake of simplicity, it has been assumed heretofore that the block boundaries between adjacent ground stations are as indicated by dotted lines 28, 29 and 32 of Fig. 1a and depend merely upon whether a synchronizing pulse of one width or a second distinctive width is received first at an aircraft. Actually, as will be apparent to those skilled in the art, when an aircraft approaches a block boundary there will be an area where it will be extremely difficult for electronic circuits to determine which pulse of two pulses of different width is received first since if these pulses are received at the aircraft immediately after one another or partially simultaneously they appear to the aircraft as a single pulse of width greater than either individual pulse. However, a relatively sharp boundary can still be obtained easily if instead the boundary is considered as being at the point where the synchronizing pulses from adjacent ground stations are received one immediately after another and begin to merge. If the synchronizing pulses transmitted by the ground station of a B block are of greater length than the synchronizing pulses transmitted by the ground station of an A block, this will result in the B block being of slightly greater length than the A block even though the corresponding synchronizing pulses from the ground stations of the A and B blocks are transmitted simultaneously. However, this difference introduces no difficulty in the operation of the system. This difference in block length comes about, of course, by providing electronic circuits in the aircraft which are actuated whenever a synchronizing pulse of a width greater than that transmitted by the ground station of an A block is received. Thus, the areas at the end of each A block adjacent a B block, where the synch pulses transmitted simultaneously by the ground stations of the A and B block effectively merge to produce a pulse longer than either individual synch pulse, are effectively added to the B block of Fig. 1a and subtracted from the A blocks.

Ground station equipment

In Figs. 4a and 4b is shown in block diagram form a ground station for transmitting and receiving information in a sequence code to a plurality of altitude zones. Block 70 represents the synchronization receiver and block 71 the synchronization transmitter, each being of conventional design. Synchronizing trigger signals from the master timer (not shown here) are received at the individual ground station by antenna 72 of receiver 70 and conveyed along line 73 to pulse width discriminator 74, adjustable station delay 75, and trigger circuit 76. Trigger circuit 76 actuates transmitter 71, which merely repeats each synchronizing signal received for transmission to the next ground station along the air lane. As previously discussed, station delay 75 is adjusted such that synch pulses from this ground station will be transmitted simultaneously with those of every other ground station if all blocks are of the same length, or such that corresponding synch pulses from each two adjacent ground stations will reach the block boundary therebetween simultaneously if the blocks are of unequal lengths. The output from discriminator 74 is fed to another input of trigger circuit 76, a 4:1 time divider 77, a 16,666 microsecond gate generator 78, and one input of synch and altitude gate circuits 85. The output of divider 77 is fed to block 82, which includes the sequence gate circuits. The output of gate generator 78 is fed to another input of block 82 and to blocks 83 and 84, the latter two blocks including the altitude occupancy gate circuits and response, occupancy, and double occupancy detection circuits, respectively. The output of adjustable station delay 75 is fed to the input of B station delay 79, to the A contact of SPDT switch 80, and to one input of block 86, which includes the sequence and signal pulse selection circuits. The other, or B contact, of SPDT switch 80 is connected to the output of B station delay 79, and the common or blade connection of SPDT switch 80 is connected to the second input of synch and altitude gate circuits 85 and another input of block 86. B station delay 79 is utilized only if the ground station is a B station, and in that case the blade of switch 80 is moved so that it engages contact B. If, on the other hand, the ground station equipment is utilized at an A station, the blade of SPDT switch 80 is moved so that it engages contact A, as shown, and B station delay 79 is effectively out of the circuit. The altitude gate output of block 85 is fed to block 86 and to another input of block 83, while the synch gate output is fed only to block 86. The output of block 82 is fed to block 87, which includes the signal relay circuits, to a second input of block 84, and to normal pulse-forming circuits 88 of pulse transmitter 89. The output of block 86 is fed to a second input of normal pulse-forming circuits 88 and to pulse-forming circuits 90 of transmitter 89, and a portional synchronizing output from modulator 91 of pulse transmitter 89 is fed to occupancy receiver gate circuit 92 and to another input of block 83. The output of block 92 is used to gate or control the operativeness of I-F amplifier 93 of occupancy receiver 94, the output of this receiver being fed to the input of pulse width discriminator 95. Pulse transmitter 89 and occupancy receiver 94 are both of conventional design as indicated. Pulse width discriminator 95, which separates the response and occupancy pulses received from the aircraft, has its response pulse output fed directly to a third input of detection circuits 84. The other or occupancy pulse output of discriminator 95 is fed through receiver output switch 96, which separates the occupancy pulses if more than one are received from a single altitude zone in response to a single altitude pulse from the ground station, and its two outputs are fed to fourth and fifth inputs of detection circuits 84. A sixth input to detection circuits 84 is derived from gate circuits 83. The three outputs (response, occupancy, and double occupancy, respectively) of detection circuits 84 are fed to second, third, and fourth inputs of signal relay circuits 87. To complete the connections, block 87 is connected by means of line 41 (see also Fig. 1a) to line wires for the transmittal of information between different ground stations, and a second output of block 87 is connected to another input of block 86.

Figs. 5a through 5d show the waveforms pertinent to the operation of the embodiment shown in Figs. 4a and 4b, assuming a four sequence code being used to receive and convey information to two altitude zones, and the encircled capital letters on Figs. 4a and 4b indicate the points at which the waveforms shown in lines A through CC of Figs. 5a through 5d appear. These waveforms are not drawn to scale, although important relative time relationships are shown, and all waveforms are shown as positive although in actual operation of the embodiment described some are negative. Line A shows a series of 2 microsecond synch trigger pulses $$\frac{10^6}{60}$$

or approximately 16,666 microseconds apart, each separated by seventeen regularly spaced 1 microsecond altitude trigger pulses which are $$\frac{10^6}{1080}$$

or approximately 926 microseconds apart. These trigger pulses are the ones received by synchronization receiver 70, and similar pulses are retransmitted by synchronization transmitter 71. It is obvious that a small delay will be introduced between the time of reception of the triggers by receiver 70 and retransmission by transmitter 71, but this difference is of no importance in the overall operation of the system and can be taken care of by proper adjustment of the adjustable station delays at each ground station. Hence for simplicity in this explanation it is being disregarded. Line B shows these same trigger pulses, all now converted to 1 microsecond pulses and delayed by adjustable station delay 75 by 500 microseconds, which is assumed for this example to be the delay necessary to be introduced at this particular ground station. This delay is adjustable from 100 to 900 microseconds at each ground station and is set when the air lane network is originally established, not being changed thereafter unless the master timer station is relocated. Discriminator 74 rejects the one microsecond trigger pulses of line A, passing only those which are more than one microsecond long, or in other words, passing only the 2 microsecond synch trigger pulses of line A. Line C shows the output of 4:1 time divider 77, the sequence scan triggers, which are respectively coincident with the first of each four successive synch triggers received, these sequence scan triggers being located approximately 66,666 microseconds apart.

In line D is shown the output of B station delay 79, which comprises the trigger pulses of line D, each delayed by the time $x$, or in this particular embodiment, 463 microseconds. These pulses of line D are used only at B ground stations, where they are utilized to delay the transmission of each altitude pulse and the gating of the ground station receiver thereafter by an additional 463 microseconds, as explained above in connection with Fig. 3.

In line E are shown a series of successive voltage gates, each 926 microseconds long, obtained by delaying each trigger pulse of line D by an additional 500 microseconds and then inverting the delayed trigger. This delay and inversion is accomplished by a circuit in block 85, and the voltage whose waveform is shown in line E is utilized in block 85 to assist in the production of the altitude gates shown in lines N, O, and P, as will be described more in detail hereinafter.

The output of discriminator 74 is shown in line F, consisting of a pulse coincident with each two microsecond synch trigger pulses of line A, and in line G is shown a pulse delayed by a variable time after each pulse of line F. This variable delay is also introduced by a circuit in block 85 in order to select the time of occurrence of the first altitude gate of the system and is adjusted by means of an adjustable manual control contained in block 85, as will be described more in detail hereinafter.

In line H is shown the output of block 78, which is in the form of a series of successive voltage gates each of 16,666 microseconds duration. The combination of the waveforms of lines C and H are fed to block 82 and produce four separate outputs, shown in the block diagram of Fig. 4b by a single line for the sake of simplicity, these four outputs being represented by lines J, K, L, and M of Figs. 5a and 5b. As illustrated, each sequence gate output of block 82 is 16,666 microseconds long and the four occur one after another in sequence, the trailing edge of the first occurring coincident with the leading edge of the second, the trailing edge of the second occurring coincident with the leading edge of the third, etc.

Lines N, O, and P show respectively the three voltage gate outputs of altitude gate circuits 85. Line N shows the gates for the synch pulses, line O those for the first altitude zone pulses, and line P those for the second altitude zone pulses, this explanation being limited to two altitude zones for the sake of simplicity. Block 85 can, however, in the embodiment shown, have as many as sixteen voltage gate outputs corresponding to sixteen separate altitude zones, the maximum number being determined by the number of altitude trigger pulses sent out by the master timer between synch pulses. As shown in line A, there are seventeen of these altitude triggers between adjacent synch trigger pulses, but because of circuit considerations, the last altitude trigger pulse of each sequence, just preceding the next synch pulse, is not used, thus reducing the total available number to sixteen as above-stated. The particular altitude gates desired are chosen by means of adjustable manual controls contained in block 85 which bias the above-mentioned variable delay circuit contained therein to provide proper altitude gate outputs at the desired times, as will be more fully described hereinafter in connection with the detailed circuit description. The synch pulse gate circuit of block 85 is triggered on by each pulse of line F of Figs.

5a and 5b, and the waveform of its plate voltage supply corresponds to line E. Therefore, the leading edge of each synch gate of line N is coincident with the corresponding pulse of line F and its trailing edge is coincident with the trailing edge of the corresponding individual voltage gate of line E. The first altitude gate circuit of block 85 is triggered on by each delayed pulse of line G as described above, and its plate is fed from the same plate voltage source, whose waveform is shown in line E. Thus, each altitude gate of line O of Figs. 5c and 5d has its leading edge coincident with the corresponding delayed pulse of line G and its trailing pulse coincident with the trailing edge of the corresponding individual voltage gate of line E. In this particular embodiment, the trailing edge of the first altitude voltage gate is utilized to trigger on the second altitude voltage gate and hence the trailing edge of the waveform of line O is coincident with the leading edge of the waveform of line P. The second altitude gate circuit also has its plate supply derived from the same plate voltage source as that applied to the synch and first altitude gate circuits, and hence its trailing edge is coincident with the trailing edge of its respective individual voltage gate of line E also, as shown in Figs. 5c and 5d.

For purposes of explanation, arbitrary four sequence codes have been chosen for altitude zones 1 and 2, that for zone 1 being normal-normal-6-6 and that for zone 2 normal-normal-normal-normal. By "normal" is meant the particular pulse width corresponding to the particular code sequence. In other words, assume that pulse width No. 1 characterizes the first code sequence, pulse width No. 2 the second, pulse width No. 3 the third, and pulse width No. 4 the fourth. For any code sequence, pulse width No. 5 or pulse width No. 6 may be substituted for the normal pulse, however, thus giving thirty-two possible code combinations if widths No. 5 and No. 6 are not mixed in any code combination. In this explanation it is assumed that the normal-normal-normal-normal code is sent up to any altitude zone which is believed by the ground station to be unoccupied and which has a clear travel course. The code sent to an occupied altitude zone which has a clear travel course will be normal-normal-5-5 until the reception of this code by the aircraft is checked back to the ground station, and then this code will change to normal-normal-6-6 to show the aircraft that the ground station knows of its presence and that the code was properly received and checked by the aircraft. This coding is controlled by block 87, which is actuated by information from line 41 and detection circuits 84. Block 87 controls one input to each coincidence or switch tube in block 86, the other inputs to these tubes comprising a synch or altitude gate and the delayed triggers shown in line B. According to the inputs received by block 87 and 86, the output of block 86 will enable or turn on either normal pulse-forming circuits 88 or pulse-forming circuits 90 of transmitter 89. The output of pulse-forming circuits 90 is either a synchronizing pulse, a No. 5 pulse, or a No. 6 pulse and that of normal pulse-forming circuits 88 the normal pulse corresponding to the proper code sequence. A switch in block 90 controls whether synch pulses of A or B width are sent out, this switch being set at the time the ground station is initially put into operation and not being changed thereafter unless the station is relocated. Preferably this switch in block 90 is ganged with switch 80 so that both are operated simultaneously to prevent synch pulses of B width being sent out by the ground station unless B station delay 79 is also inserted in the circuit. Since this ground station was assumed to be an A station, this pulse-forming circuit 90 will provide only synch pulses of A width, and this output is shown in line Q (Figs. 5c and 5d). Like R shows the output of circuits 88 for the first code sequence, line S that for the second code sequence, line T that for the third code sequence and line U that for the fourth code sequence, these outputs being produced only if a normal pulse is being sent to the particular altitude zone. Line V shows the output of the No. 5 pulse-forming circuit of block 90 and its output is here indicated as dotted for the third and fourth code sequences to indicate the relative time at which these No. 5 pulses have previously been sent, it being assumed that in this example the presence of the aircraft has already been checked by the ground station as indicated in line W, which shows the No. 6 pulses which are sent to the first altitude zone during the third and fourth code sequence to indicate this check. Line X shows the output of transmitter 89, the capital letter A beside each synch pulse indicating that it is of A width and the numeral beside each altitude pulse indicating its particular width. Thus during the first code sequence an A synch pulse is sent out followed by a No. 1 pulse to the first altitude zone and a No. 2 pulse to the second altitude zone, during the second code sequence an A synch pulse followed by a No. 2 pulse to the first altitude zone and a No. 2 pulse to the second altitude zone, during the third code sequence an A synch pulse followed by a No. 6 pulse to the first altitude zone and a No. 3 pulse to the second altitude zone, and during the fourth code sequence an A synch pulse followed by a No. 6 pulse to the first altitude zone and a No. 4 pulse to the second altitude zone. A small trigger is abstracted from modulator 91 coincident with each output pulse from transmitter 89 and fed via the portional synchronizing output line to occupancy receiver gate circuit 92 and block 83 as above-mentioned. In block 83 this trigger is supplied to a coincidence or switch tube along with the 16,666 microsecond gate shown in line H and the particular altitude gate desired to produce an altitude occupancy gate. In this example, because this description is limited to two altitude zones, there are only two such switch tubes, resulting in two outputs from block 83, these being shown in lines Y and Z, Y corresponding to the first altitude zone and Z to the second. As indicated, these gates start coincident with their respective altitude output pulses from transmitter 89. These same small portional synchronizing triggers from modulator 91 when applied to occupancy receiver gate circuit 92 produce similar gates delayed by a fixed time after each altitude output pulse from transmitter 89, which are fed to I-F amplifier 93 to turn it on for a predetermined period of time after each pulse is transmitted, this predetermined period being fixed by radius R as above-described. The fixed time delay is made at least long enough to insure that I-F amplifier 93 will not be turned on until after the longest pulse that transmitter 89 can product has ceased to be transmitted. The output of occupancy receiver gate circuit 92 is shown in line AA.

Pulses transmitted by the aircraft in response to the altitude pulses from transmitter 89 after reception by receiver 94 are channelled by discriminator 95 into one of its two outputs, depending upon whether it is an occupancy or a response pulse. The response pulse channel output is connected directly to detection circuits 84. The occupancy pulse channel output is connected to the input of receiver output switch 96, which in turn channels each pulse received at its input into one of its two outputs, depending upon whether it is the first such pulse received during a particular altitude occupancy gate. The first pulse passed by switch 96 during a particular altitude occupancy gate is channelled into its first or occupancy output, and any subsequent pulse received during the same altitude occupancy gate is channelled into its second or double occupancy output. The response and occupancy pulses received from the aircraft are illustrated in lines B—B and C—C respectively, and it will be noted that in this example the aircraft replies only to altitude pulses and not to synch pulses. As will be explained more in detail hereinafter, the aircraft in general replies to normal pulses with response pulses, which are shown in line B—B and labeled with the letter R, and replies to blank or check pulses with occupancy pulses, shown in line C—C and labeled with the letter O. Had there been a second aircraft in altitude zone 1, a second pulse would have been received by occupancy receiver 94 during the time of the first altitude occupancy gate and this would have been channelled by receiver output switch 96 into its second output to indicate double occupancy of an altitude zone to detection circuits 84 and thereby change the code sent to that altitude zone to warn both aircraft that they were simultaneously occupying the same altitude zone in the same block.

A detailed description of the circuits of the blocks shown in Figs. 4a and 4b and their operation will now be given with reference to Figs. 6a through 6o. Again, the encircled capital letters indicate the points at which the waveforms shown in lines A through CC of Figs. 5a through 5d appear. In Fig. 6a is shown the synchronization pulse width discriminator and output circuit 74 and 4:1 divider 77. The synchronization triggers received from the master timer at this ground station and available at line 73 are negative and are connected through coupling condenser 100 to the control grid of electron tube 101. The plate of this tube is connected to ground through condensers 104 and 105 in series and to a positive source of potential through plate resistor 102 and resistor 103 in series. The junction point of condensers 104 and 105 is connected to the grid of electron tube 106 and through resistor 107 to arm 108 of potentiometer 109, whose end terminals are respectively connected to a negative source of potential and ground. The plate of tube 106 is connected through coupling condenser 110 to the grid of electron tube 111, whose plate in turn is connected through coupling condenser 112 to the inputs of blocks 76, 77, 78 and 79. The control grid of tube 101 is also connected to ground through the parallel combination of diode 113 and resistor 114. The other circuit connections of block 74 are conventional as shown in Fig. 6a. Tube 101 normally is on or conducting due to its cathode being connected directly to ground and a negative input applied to its grid will turn the tube off, allowing condenser 105 to start charging up toward the potential of the positive potential source. By making the capacity of condenser 105 small in relation to that of condenser 104, the time constant for this charging path is controlled mainly by the resistance of resistor 102 and the capacitance of condenser 105. When the negative input to the grid of tube 101 is removed the tube again conducts, with the result that a saw-tooth wave is produced at the junction of condensers 104 and 105 whose peak amplitude is a measure of the length of time that the grid of tube 101 was negative, or in other words, a measure of duration of the negative input pulse applied to this grid. By adjustment of arm 108 of potentiometer 109, amplifier tube 106 can be biased so that it will conduct only for an input saw-tooth whose peak amplitude exceeds a predetermined value. In the operation of the embodiment herein described this adjustment is made so that tube 106 will be turned on only for a saw-tooth whose amplitude corresponds to an input pulse applied at the grid of tube 101 of 1.5 microseconds duration or greater. The output of tube 103 is inverted and amplified by tube 111 and then connected to blocks 76, 77, 78 and 79 as above-described by means of line 120. The purpose of diode 113 is to prevent grid current from flowing in tube 101 and also to prevent positive or negative "overshoots" when the negative impulse is removed from the grid. This pulse width discriminator of block 74 is described more fully and claimed in the application of Lionel H. Orpin for Pulse Duration Discriminator, Serial No. 743,149, filed April 22, 1947, Patent No. 2,552,013 issued May 8, 1951.

The output of line 120, which is positive, is applied through coupling condenser 121 to the cathode of electron tube 122, whose grid is connected to ground through variable resistor 123 and to the plate of electron tube 124 by means of coupling condenser 125. The grid of tube 124 is coupled back to the plate of tube 122 by means of condenser 126 and thus the combination of tubes 122 and 124 constitutes a multivibrator. The plate of tube 124 is connected through a differentiating circuit consisting of small condenser 127 and resistor 128 to the grid of electron tube 129, whose plate in turn is directly coupled to the grid of electron tube 130. Tube 130 is normally off or nonconducting due to its cathode being returned to the source of positive plate potential through resistor 132 and to ground through resistor 133. Multivibrator tube 122 is normally conducting and each positive pulse from line 120 applied to its cathode has the same effect as a negative pulse applied to its grid, turning this tube off and turning tube 124 on very abruptly. The length of time that this condition continues is determined by the time constant of the multivibrator, which is controlled by variable resistor 123, and this is normally adjusted to be in the neighborhood of 60,000 microseconds. The negative gate output thus produced at the plate of tube 124 is differentiated by the combination of condenser 127 and resistor 128, resulting in a negative trigger pulse at the grid of tube 129 coincident with the leading edge of the 60,000 microsecond negative gate produced at the plate of tube 124. This negative trigger pulse is inverted and amplified by tube 129 and coupled as a positive pulse through tube 130, which acts as a cathode follower, to line 131 leading to blocks 80 and 81. Thus one positive pulse is produced at line 131 coincident with the first of each four pulses applied to line 120.

In Fig. 6b are shown the detailed circuits of blocks 78 and 82. The positive pulses from line 120 of block 74 are connected through condenser 150 to the control grid of gas tube 152 of 16,666 microsecond gate generator 78. The control grid of tube 152 is also connected to a negative source of potential through resistor 155, and its screen grid and cathode are connected together and to ground. The plate of tube 152 is connected to ground through condenser 157, to the grid of cathode follower 158 through resistor 159, and to a source of positive potential through plate resistor 160. The plate of cathode follower 158 is directly connected to the same source of positive potential, and its cathode is connected to blocks 82, 83, and 84 by means of line 163 and to ground through cathode resistor 164. Each positive short pulse of line F (Figs. 5a and 5b) is sufficient to overcome the bias on gas-type switch tube 152 and cause it to fire, and by proper choice of the values of condenser 157 and resistor 160, this tube can be rendered non-conductive again virtually instantaneously when the input pulse ends. Thus the output at the plate of tube 152 and at the cathode of cathode follower 158 is in the form of a series of successive 16,666 microsecond gates, the leading edge of each gate being virtually coincident with a corresponding pulse of line F.

Figure 5B:
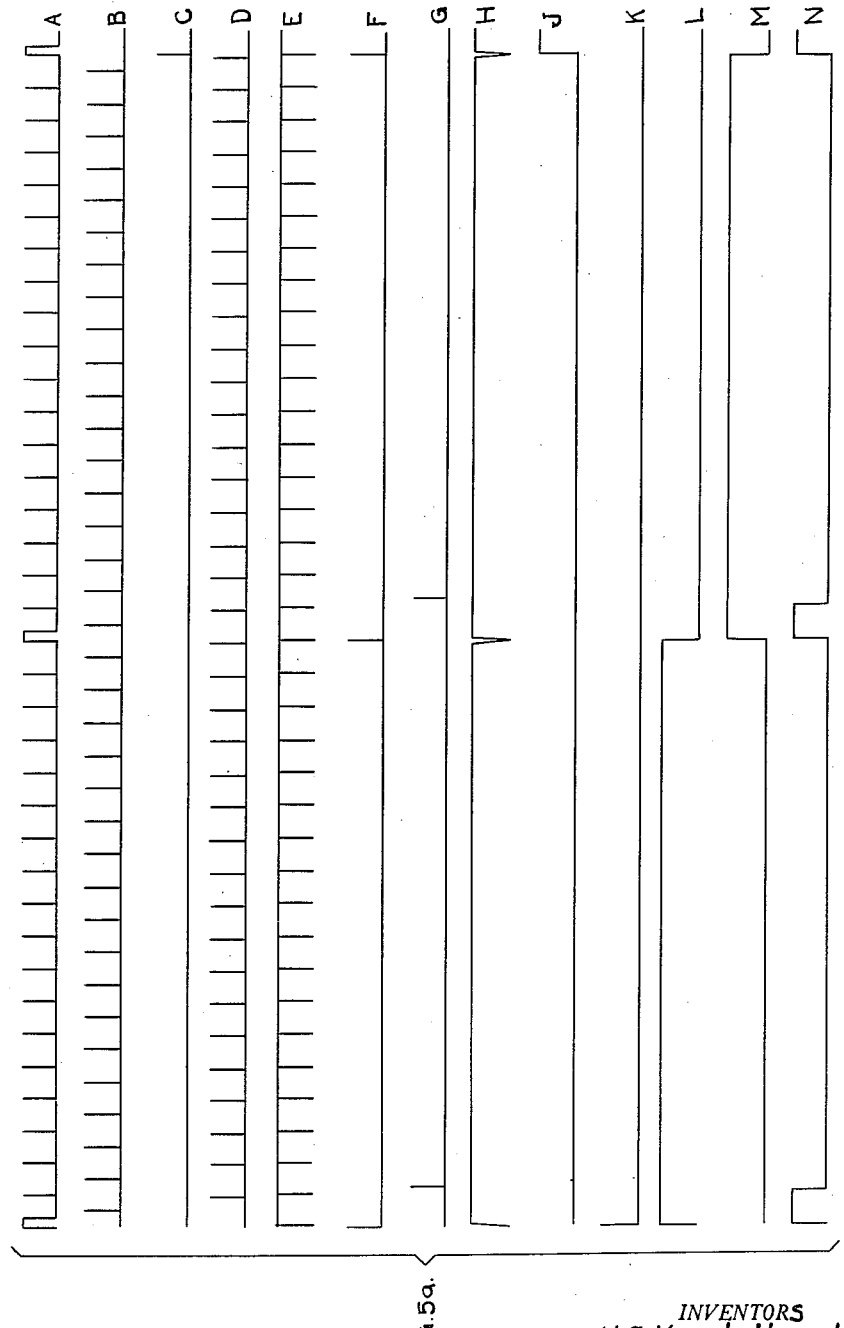

Block 82, the sequence gate circuits, includes a plurality of similar circuits, the exact number depending upon the number of sequences in the code transmitted by the ground station. In block 82 four similar circuits are shown for the four sequence code exemplified in this embodiment. The first circuit has its operation initiated by means of line 131 from block 77, which is connected through coupling condenser 180 to the control grid of gas-type switch tube 181. The positive 16,666 microsecond gates of line H (Figs. 5a and 5b) from line 163 of block 78 are applied to the plate of switch tube 181 and to the plates of all other similar switch tubes, such as 182, 183, and 184, of this circuit in parallel. The control grid of switch tube 181 is biased negatively from a negative source through bias resistor 185, and its cathode is connected to ground through cathode resistor 186. Each positive pulse of line C (Figs. 5a and 5b) when applied to the control grid of switch tube 181 turns this tube on and causes it to pass current for the length of time during which plate potential is applied to this tube or, in other words, for the length of time equal to one of the voltage gates of line H (Figs. 5a and 5b). Thus, if the positive pulse of line C occurs during the occurrence of the first voltage gate of line H, tube 181 continues to pass current until the end of this first voltage gate. Since the positive pulse of line C occurs substantially simultaneously with the beginning of the first voltage gate of line H, as may be seen from Fig. 5a, the resultant output at the cathode of switch tube 181 is thus a voltage gate similar to the first voltage gate of line H, and this cathode output is connected by means of line 189 to blocks 84, 87 and 88. This 16,666 microsecond output constitutes the first sequence gate, and the wave form thereof is shown in line J of Figs. 5a and 5b.

The cathode of switch tube 181 is coupled to the grid of an inverter-amplifier tube 190 through coupling condenser 191 and resistor 192. The output of inverter amplifier 190, taken from its plate, is directly connected to the grid of cathode follower 193. The output of cathode follower 193 is coupled through coupling condenser 194 to the control grid of the second gas-type switch tube 182. Switch tube 182 is similar to switch tube 181 and is connected in circuit similarly except for its input connection as described above. Only the trailing edge of the output of switch tube 181 has any effect upon inverter-amplifier tube 190, since this latter tube is normally on due to its grid being returned to a positive source of potential through resistor 195 and its cathode being returned to ground. This trailing edge of its input turns tube 190 off and switch tube 182 on, producing a gate output at the cathode of the latter tube corresponding to the second sequence gate shown in line K (Figs. 5a and 5b), which is made available at line 196 and also connected to blocks 84, 87 and 88. In this detailed circuit diagram, only two additional similar gate stages are shown for producing outputs corresponding to those of lines L and M of Figs. 5a and 5b, but it is obvious that by providing additional stages as many successive gate output can be produced as desired, each 16,666 microseconds long.

Figure 6C:
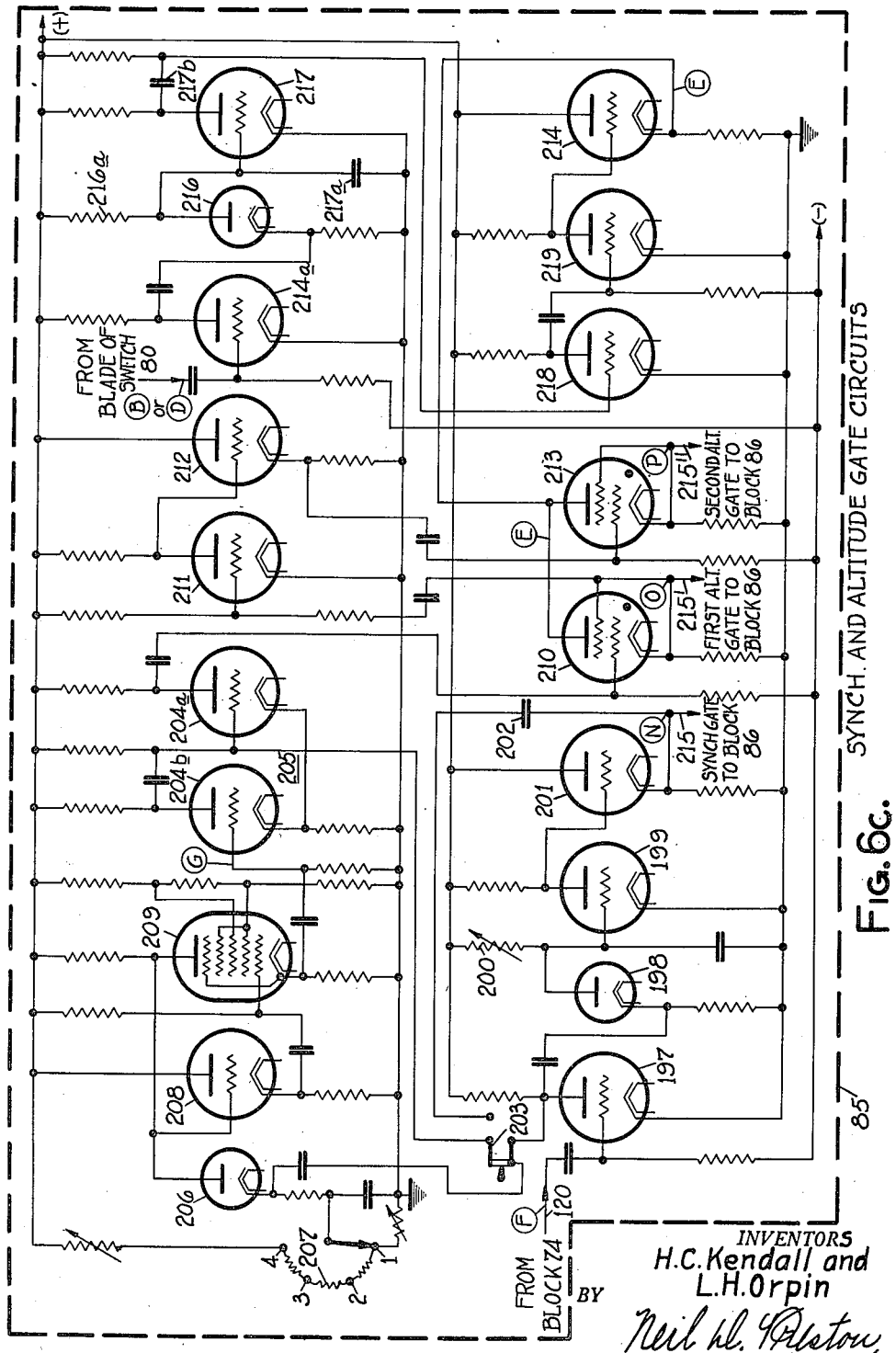

In Fig. 6c is shown the detailed circuit of block 85, which includes the synch and altitude gate circuits. Each positive pulse of line F (Figs. 5a and 5b) from line 120 of block 74 is connected through a coupling condenser to the control grid of inverter-amplifier tube 197, which is biased from a suitable source of negative potential so as normally to be non-conducting. The output of inverter-amplifier 197, taken from its plate, is connected through a coupling condenser to the cathode of diode 198, whose plate is connected to the grid of triode 199 and through variable resistance 200 to a positive source of plate potential. The output of triode 199, taken from its plate, is connected directly to the grid of cathode follower 201, and the output of this cathode follower, taken from its cathode, is connected via line 215 to block 86 and comprises the synch gates shown in line N of Figs. 5a and 5b.

The circuit thus far described constitutes the synch gate circuit. Each positive pulse appearing at the grid of tube 197 is inverted and applied through diode 198 to the control grid of triode 199. Tube 199 is normally conducting due to its grid being returned to the positive source of plate potential through resistor 200, and this negative pulse applied to its grid turns it off. The length of time that tube 199 remains off depends upon the value of resistance 200, which is variable as above-described, since the control grid of tube 199 is connected to ground through the condenser shown, which is charged up negatively when diode 198 conducts, and resistor 200 determines the time constant of discharge of this condenser. Preferably, variable resistor 200 is adjusted so that tube 199 remains non-conducting for approximately 1,000 microseconds after it is turned off by each inverted pulse corresponding to a positive pulse of line F. Thus the output at line 215 which is connected to block 86 is a positive gate starting simultaneously with each positive pulse of line F and ending approximately 1,000 microseconds thereafter. The output from the cathode of cathode follower 201 is also connected through condenser 202 to one contact of DPDT switch 203 whose corresponding blade contact is connected to the control grid of tube 204a of multivibrator 205. The other blade of DPDT switch 203 is connected directly to the plate of inverter-amplifier 197, and that contact engageable by this latter blade which is oppositely poled from that one connected to condenser 202 is connected through a condenser to the cathode of biased diode 206. The cathode of diode 206 is also connected to ground through a resistor and a condenser connected in series as shown, and the positive voltage across the condenser is determined by means of the position of the slider arm of tapped potentiometer 207, as shown, which thus determines the bias upon diode 206. The plate of diode 206 is directly connected to the control grid of cathode follower 208 and to the plate of phantastron 209. The cathode of cathode follower 208 is connected through a coupling condenser to the control grid of phantastron 209, which is conventionally connected as shown. The output of phantastron 209, taken from its cathode, is connected through a small or differentiating condenser to the control grid of triode 204b of multivibrator 205. Note that the control grid of triode 204a of multivibrator 205 is returned through a resistor to the positive source of plate potential, and hence tube 204a is normally on and tube 204b is normally off. The output of multivibrator 205 is taken from the plate of tube 204a and is connected through a condenser to the control grid of a first gas-type tetrode switch tube 210, which is biased so as normally to be non-conducting from a suitable source of negative potential as shown. The screen grid and cathode of switch tube 210 are connected together and to line 215' leading to block 86, which constitutes the first altitude gate output (line O, Figs. 5c and 5d), and to inverter-amplifier tube 211. The output of tube 211, taken from its plate, is connected through cathode follower 212 and a coupling condenser to the control grid of a second similar gas-type tetrode switch tube 213, whose output, taken from its cathode, is connected to line 215'' leading to block 86 and constitutes the second altitude gate (line P, Figs. 5c and 5d). Tubes 210, 211, 212, and 213 are similar to tubes 181, 190, 193, and 182, respectively, of the sequence gate circuits of block 82 discussed above in connection with Fig. 6b, except that the plate supply of tubes 210 and 213 is derived from the cathode of tube 214 as shown, the waveform of the output of tube 214 being illustrated in line E of Figs. 5a and 5b as above-mentioned. The output at the cathode of tube 214 constitutes a series of positive voltage gates, each 926 miscroseconds in duration and the leading edge of each delayed approximately 500 microseconds after its corresponding trigger pulse of line B (Figs. 5a and 5b for each A ground station. For each B ground station, this delay is approximately 963 microseconds because of the introduction of an additional 463 microseconds delay by means of B station delay 79 (see Fig. 4a). Each positive pulse of line B, if the ground station is an A station as is assumed in this case, or of line D if the ground station is a B station, derived from the blade of switch 80 (Fig. 4a) is connected through a coupling condenser to the grid of inverter-amplifier tube 214a, which is biased from a suitable source of negative potential as shown. Inverter-amplifier 214a is normally off because of this negative bias applied to its grid, and each of these positive 1080-cycle triggers turns this tube off and produces a corresponding negative pulse at its plate, which is then connected through the coupling condenser shown to the cathode of charging diode 216, causing diode 216 to conduct and charge condenser 217a, which is connected between the control grid of tube 217 and ground, up negatively. Condenser 217a thereafter can discharge only through plate resistor 216a of diode 216, and the resultant negative pulse at the grid of inverter-amplifier 217 thus has an abrupt leading edge and an exponential rising trailing edge. The abrupt leading edge of the input pulse turns tube 217 off, and this condition obtains until the magnitude of the input pulse no longer exceeds the cut-off value of tube 217. Tube 217 then again conducts, the resultant waveform at its plate being an approximately square wave, and this is coupled to the grid of tube 218 through a small coupling condenser 217b. Condenser 217b charges up due to the flow of grid current, and the resultant input to the grid of tube 218 is a square wave of small amplitude whose trailing edge drops suddenly to a negative value, thereafter rising exponentially. The square wave portion of its input has little effect on the output of tube 218, since this tube is already conducting heavily due to its cathode being connected to ground and its grid being returned to the positive source of plate potential as shown, but the negative spike portion of its input produces a corresponding positive spike or trigger at its plate. This positive spike is then connected through a coupling condenser to the grid of inverter-amplifier tube 219. Tube 219 is normally off due to its grid being biased from the above-mentioned source of negative potential, as shown, and this positive spike or trigger turns tube 219 on. The output of tube 219, taken from its plate, is then coupled through the cathode follower 214 to the plates of switch tubes 210 and 213 in parallel as above-described. The 500 microseconds delay above-mentioned between each input pulse and its corresponding delayed and inverted output pulse is controlled by the circuit parameters, being the time between the leading and the trailing edge of the square wave at the output of tube 217 and the input of tube 218. Note that the circuitry of tubes 214a, 216, 217, and 218 is similar to the circuitry of tubes 197, 198, 199, and 201, respectively.

The operation of the altitude gate circuits is as follows when switch 203 is in the position shown. Each positive pulse of line F of Figs. 5a and 5b is inverted and amplified in tube 197 and applied through switch 203 to the cathode of biased diode 206 as a negative pulse. Diode 206 is biased from potentiometer 207 by a bias voltage that is a direct measure of the first altitude zone with which it is desired that the ground station have communication. In the present example, it is assumed that this is the first altitude zone and hence tapped potentiometer 207 has its slider adjusted to the lowest tap position. The output of biased diode 206 is connected through cathode follower 208 to phantastron 209 to produce a negative voltage gate ending in a sharp positive spike, the duration of this voltage gate, and hence the relative time of occurrence of the positive spike, being in turn a direct measure of the bias voltage and hence of the first altitude zone with which communication is to be had (in this case the first altitude zone). The output of phantastron 209 is connected to multivibrator 205, and the positive spike at the end of the negative phantastron gate is the only portion of this input which will have any effect upon multivibrator tube 204b of multivibrator 205 inasmuch as this tube is normally off. The waveform of this effective portion of the input to multivibrator 205 is represented by line G of Figs. 5a and 5b, and it will initiate a positive voltage gate at the plate of tube 204a of multivibrator 205 which is then coupled to the control grid of switch tube 210 as above-described. The leading edge of this positive voltage gate turns tube 210 on, and by making the gate output of multivibrator 205 short relative to the 926 microsecond gate applied at that instant to the plate of gas-type switch tube 210, the output of tube 210 will be a positive voltage gate whose trailing edge occurs coincident with the trailing edge of the corresponding individual voltage gate of line E (Figs. 5a and 5b) and whose leading edge occurs at a time after the corresponding initiating pulse of line F (Figs. 5a and 5b) which is determined by the setting of potentiometer 207 of the phantastron delay circuit. This delay is illustrated in line G (Figs. 5a and 5b). In this particular case, as mentioned above, the delay of the phantastron delay circuit is adjusted so that the leading edge of this first altitude gate available at line 215' of block 86 and corresponding to the waveform of line O (Figs. 5a and 5b) will occur slightly after the end of the corresponding preceding synch gate of line N (Figs. 5a and 5b).

An alternative method of initiating the first altitude gate if the first gate is to correspond to the first altitude zone is by moving the blade of switch 203 to the other of its two positions. The phantastron delay is then effectively removed from the circuit, and the 1,000 microsecond positive gate output of line 215 (line N, Figs. 5a and 5b) is then connected to the grid of tube 204a of multivibrator 205 through condenser 202, tube 204a then acting as a normally-on inverter-amplifier. Since this tube is already heavily conducting, the positive rise occurring at the leading edge of the synch gate output at line 215 has little effect upon the output of tube 204a. However, the sudden negative drop at the end of this synch gate will turn this tube off and produce a positive pulse at its plate, which being connected to switch tube 210 as above-described, will then turn gas-type switch tube 210 on. The latter tube will thereafter remain on until its plate potential falls at the end of the corresponding individual 926 microsecond positive gate of line E (Figs. 5a and 5b). With switch 203 in this other position it is, of course, obvious that the waveform of line O (Figs. 5a and 5b) will be modified slightly in that its leading edge will now occur simultaneously with the trailing edge of the waveform of line N, the synch gate output.

While only two switch tubes 210 and 213 have been shown in the exemplified embodiment for producing successive altitude gates for two successive altitudes, it is, of course, apparent that by providing additional similar switch tubes together with an intervening inverter-amplifier and cathode follower between each successive pair of switch tubes, as many successive altitude gates may be provided as desired. Furthermore, while in this circuit only one phantastron delay circuit is illustrated and thus only the first of a group of altitudes can be selectively chosen from the available altitudes, the remaining altitudes being limited to immediately successive altitudes, it is, of course, apparent that by providing additional phantastron delay circuits, properly timed altitude gates for any of the desired altitudes could be provided.

In Fig. 6d is shown the detailed circuit of adjustable station delay 75. Starting at the left-hand side of the sheet, gas tube 220 is part of a saw-tooth generator. The two microsecond synch trigger pulses and one microsecond altitude trigger pulse of line A (Figs. 5a and 5b) from line 73 of block 70 are applied through coupling condenser 221 to the grid of gas tube 220, which is returned to a source of negative potential through resistor 222. The cathode and screen grid of tube 220 are connected together and to ground, and the plate is connected directly to the grid of cathode follower 223, to ground through condenser 224, and to a source of positive potential through resistors 225 and 226 in series. The junction point of resistors 225 and 226 is connected through condenser 227 to the cathode of tube 223, whose plate is directly connected to the same source of positive potential. The cathode of tube 223 is also connected to the plate of isolating diode 228 and to ground through cathode resistor 229. The synch and altitude trigger pulses from line 73 are also applied through coupling condenser 230 to the control grid of gas tube 231, which is connected in a manner similar to that of the gate generator of block 81. The cathode and screen grid of tube 231 are connected together and to ground and the control grid is returned to a source of negative potential through resistor 232. The plate of tube 231 is connected to the source of positive potential through resistor 233, to ground through condenser 234, and to the grid of cathode follower 235 through resistor 236. The plate of tube 235 is connected to the same source of positive potential and its cathode is directly connected to the plate of gas tube 237 and to ground through cathode resistor 238. The cathode of isolating diode 228 is connected to the control grid of gas tube 237, whose screen grid and cathode are connected together and to ground through resistor 239 and condenser 240 in series. The junction point of resistor 239 and condenser 240 is connected to arm 241 of potentiometer 242, whose end terminals are respectively connected between the positive source of potential and ground. The cathode of tube 237 is coupled through a differentiating circuit, consisting of condenser 243 and resistor 244, to the control grid of gas tube 245, which has a pulse-forming line 246 connected in series with a resistor 247 between its plate and cathode. The plate of tube 245 is also connected to the positive source of potential through resistor 248 and its cathode is connected to its screen grid and to the control grid of tube 250 through coupling condenser 251. The plate of tube 250 is directly connected to the same source of positive potential, its grid is returned to the negative source of potential through resistor 252, and its cathode is connected to output line 253 and through tail-clipping inductance 254, diode 255, and the parallel combination of resistor 256 and condenser 257 to ground. Each pulse applied at line 73 will cause gas tubes 220 and 231 to fire, discharging condensers 224 and 234, respectively. By making the capacitance of condenser 234 small with relation to that of condenser 224, the output at the cathode of cathode follower 235 will be a fast action saw-tooth wave, in effect a voltage gate, whereas the output at the cathode of cathode follower 223 will be a normal saw-tooth wave. Varying the position of arm 241 of potentiometer 242 varies the cathode bias of tube 237, thus controlling the time at which this tube fires to produce a pulse at its cathode when the above-mentioned voltage gate is applied to its plate and the saw-tooth to its control grid as above-described. Arm 241 can be adjusted to delay the pulse produced at the cathode of tube 237 from 100 to 900 microseconds after the initiating trigger pulse applied at line 73, but in the embodiment herein described it will be remembered that it has been assumed that this adjustment has been made to give a delay of 500 microseconds. The output at the cathode of tube 237 is differentiated by the differentiating circuit consisting of condenser 243 and resistor 244, resulting in a trigger pulse appearing at the control grid of gas tube 245 coincident with the leading edge of the pulse at the cathode of tube 237. This trigger pulse fires gas tube 245, causing pulse-forming line 246 to discharge through the gas tube and the effective resistance of its cathode circuit. For this reason the ohmic value of resistance 247 is made approximately equal to the characteristic impedance of pulse-forming line 246. The pulse appearing across resistor 247 is coupled to the grid of "boot-strapping" tube 250 whose cathode is also simultaneously raised in potential by the pulse due to the "boot-strap" connection shown. The length of time that pulse-forming line 246 continues to discharge across resistor 247 is determined by the circuit constants of pulse-forming line 246, here assumed to be such that the discharge continues for one microsecond, with the result that a positive one microsecond pulse is produced at line 253 for each synch or altitude trigger pulse applied to line 73, each pulse at line 253 being delayed after its corresponding pulse applied to line 73 by a predetermined time fixed by the setting of arm 241 of potentiometer 242. Tail-clipping inductance 254 is inserted in the circuit in order to increase the rate of fall of the trailing edge of each pulse at line 253, and diode 255 is inserted to prevent oscillations from occurring following the trailing edge of each pulse.

Figure 6E:
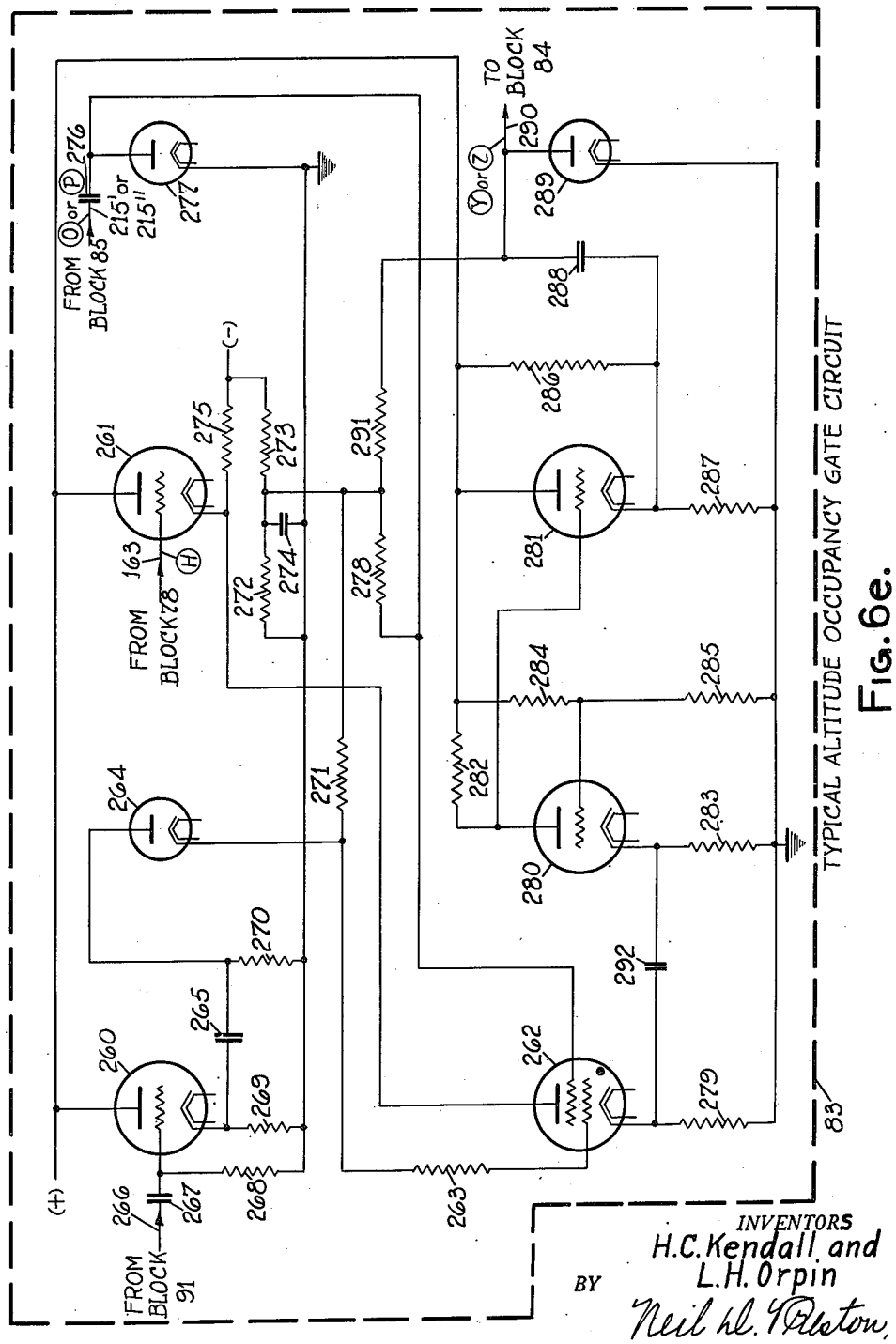

In Fig. 6e is shown a typical altitude occupancy gate circuit of block 83, there being one such circuit for each altitude zone to which altitude or information pulses are being sent. Cathode followers 260 and 261 of Fig. 6e, however, are common to all the altitude occupancy gate circuits, the plates of switch tubes 262 of the circuits being connected together and in parallel to cathode follower 261 and the control grids of switch tubes 262 being connected through their respective resistors 263 and isolating diodes 264 to coupling condenser 265 from the cathode of cathode follower 260. Starting at the left-hand edge of the sheet, each small trigger abstracted from modulator 91 coincident with each output pulse from transmitter 89 is fed via portional synchronizing output line 266 and coupling condenser 267 to the grid of cathode follower 260, whose plate is connected to a source of positive potential and whose grid and cathode are returned to ground through resistors 268 and 269 respectively. The plate of isolating diode 264 is returned to ground through resistor 270 and its cathode is returned through resistor 271 to a point of negative potential on a network consisting of resistors 272 and 273 and condenser 274, this network being connected between a source of negative potential and ground. The 16,666 microsecond gates of line H (Figs. 5a and 5b) from line 163 of block 78 are connected to the grid of cathode follower 261, its plate is directly connected to the source of positive potential above-mentioned, and its cathode is returned to the source of negative potential above-mentioned through resistor 275. The desired altitude gate (line O or P, Figs. 5c and 5d, in the embodiment herein described) of line 215' or 215'', respectively, from block 85 is applied through condenser 276 to the plate of clamper tube 277 and the screen grid of switch tube 262, which is of the gas type. The screen grid of tube 262 is connected to the same point of negative potential on the network above-mentioned through resistor 278, and its cathode is connected to ground through resistor 279 and to the cathode of isolating tube 280 through differentiating condenser 292. The plate of tube 280 is directly connected to the grid of cathode follower tube 281 and also is returned to the above-mentioned source of positive potential through plate resistor 282, its cathode is returned through cathode resistor 283 to ground, and its grid is positively biased by means of resistors 284 and 285 connected in series between the above-mentioned source of positive potential and ground. The plate of tube 281 is connected to the same source of positive potential and its cathode is positively biased by means of resistors 286 and 287 connected in series between the same source of positive potential and ground. The cathode of tube 281 is coupled through condenser 288 to the plate of clamper tube 289 and output line 290, which leads to block 84, the waveform at line 290 corresponding to that of either line Y or Z (Figs. 5c and 5d) depending upon whether the waveform of line O or P (Figs. 5c and 5d), respectively, is connected to clamper tube 277 from line 215. The plate of clamper tube 289 is returned to the same negative point on the network above-mentioned through resistor 291. In operation switch tube 262 will be normally off or nonconducting, even with the positive potential upon its plate due to the 16,666 microsecond gate, because of its two grids being returned to the point on the negative network above-mentioned. This tube will fire, however, when its grids are simultaneously raised by the application of a portional synchronizing trigger from block 91 and an altitude gate from block 85. Clamper tube 277 prevents the screen grid from ever rising above ground potential. When switch tube 262 fires, a positive pulse is produced at its cathode which continues until the potential of the plate falls at the end of the 16,666 microsecond gate, and the leading edge of this cathode output is differentiated by differentiating condenser 292, which in this case is made large enough so that its time constant of discharge through resistor 283 is approximately 500 microseconds. Tube 281 is normally off due to its cathode being returned to a positive potential as above-described. Isolating tube 280 is normally on due to its positive grid bias, and this differentiated positive pulse applied to its cathode will turn the tube off for approximately 500 microseconds, resulting in a positive pulse of 500 microseconds duration at its plate which turns cathode follower tube 281 on. The result then is a positive pulse of approximately 500 microseconds duration being produced at the cathode of tube 281 whose leading edge is coincident with the corresponding portional synchronizing trigger from block 91, and this positive pulse is then coupled to output line 290, clamper tube 289 being inserted to prevent this pulse from ever going above ground potential.

Figure 6F:
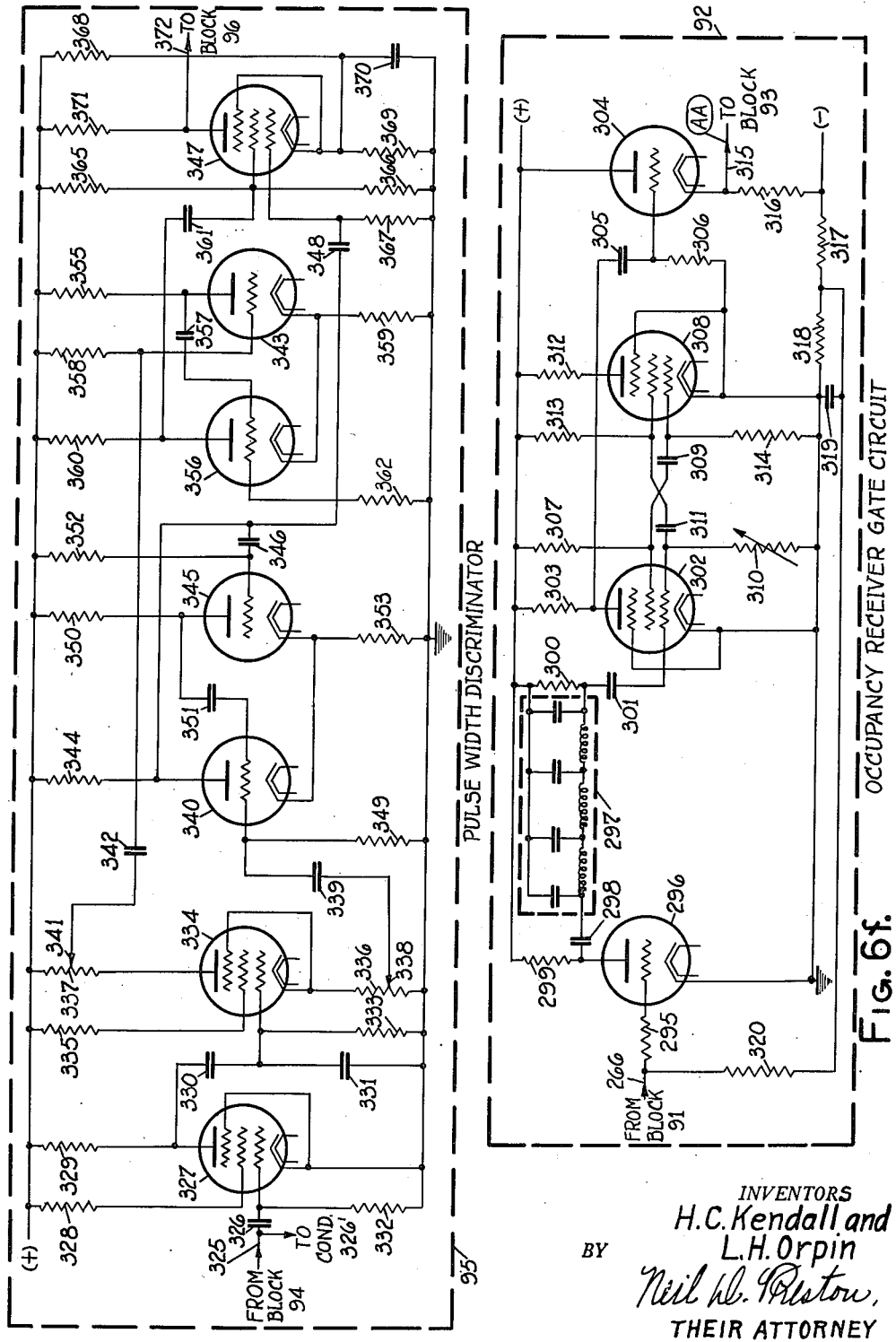

If Fig. 6f are shown the detailed circuit of occupancy receiver gate circuit 92 and a typical circuit of pulse width discriminator 95. In block 92 the same small triggers abstracted from modulator 91 coincident with each output pulse from transmitter 89 are fed via portional synchronizing output line 266 and resistor 295 to isolating and inverter tube 296, whose cathode is connected to ground and whose plate is connected to one end of delay line 297 through coupling condenser 298 and to a positive source of potential through plate resistor 299. The other end of delay line 297 is connected across resistor 300, which is connected in series with condenser 301 between the same source of positive potential and the control grid of tube 302. The suppressor grid and cathode of tube 302 are connected together and to ground, and its plate is connected to the above-mentioned positive source of potential through plate resistor 303 and to the grid of cathode follower 304 through coupling condenser 305. The grid of cathode follower 304 is returned to ground through resistor 306. The screen grid of tube 302 is returned to the above-mentioned source of positive potential through resistor 307 and coupled to the control grid of tube 308 through coupling condenser 309, and the control grid of tube 302 is also connected to ground through variable resistor 310 and to the screen grid of tube 308 through coupling condenser 311. The suppressor grid and cathode of tube 308 are connected together and to ground, its plate is returned to the above-mentioned source of positive potential through plate resistor 312, its screen grid is returned to the same source of positive potential through resistor 313, and its control grid is returned to ground through resistor 314. Thus, tube 302 and 308 constitute an electron-coupled multivibrator. The plate of cathode follower 304 is directly connected to the above-mentioned source of positive potential, and its cathode is connected to output line 315 leading to block 93 and returned to a source of negative potential through cathode resistor 316. A network consisting of resistors 317 and 318 and condenser 319 is connected between this same source of negative potential and ground, and line 266 is returned to a point of negative potential on this network through resistor 320. In operation tube 296 is normally off due to this negative bias on its grid, but is turned on by the positive pulse from modulator 91 coincident with each output pulse of transmitter 89, thus causing a pulse to appear at the plate of tube 296 coincident with each transmitter output pulse. The ohmic value of resistor 300 is made approximately equal to the characteristic impedance of delay line 297, and each pulse appearing at the plate of tube 296 is delayed by delay line 297 a finite amount of time determined by the circuit constants of this delay line. In this particular embodiment, it will be assumed that delay line 297 introduces a delay of 10 microseconds in order that I-F amplifier 93 of occupancy receiver 94 will not be made operative until after the termination of transmission of the longest pulse that transmitter 89 produces. Each delayed pulse appearing at the grid of multivibrator tube 302 will turn this tube off and turn tube 308 on abruptly due to the well-known multivibrator action. Tube 302 will remain off and tube 308 on for a length of time determined by the circuit constants of the multivibrator, in this case being controllable from approximately 0 to 300 microseconds by means of variable resistor 310. In the operation of this embodiment, it will be assumed that variable resistor 310 has been adjusted to keep tube 302 turned off for 300 microseconds, thus resulting in a voltage gate at the plate of tube 302 of 300 microseconds duration whose leading edge starts 10 microseconds after the leading edge of its corresponding portional synchronizing trigger at line 266, this 300 microsecond pulse then being coupled through cathode follower 304 and output line 315 to I-F amplifier 93 to control its operativeness.

Pulse width discriminator 95 comprises two discriminator channels in order to separate the occupancy and response pulses received from the aircraft. As pointed out above in connection with the description of Figs. 5a–5d, the aircraft replies in general to each normal altitude pulse transmitted to and intended for its altitude zone with a response pulse, of width 5 microseconds, and replies to each blank or check pulse transmitted to and intended for its altitude zone with an occupancy pulse, of width 2 microseconds. In this embodiment, the aircraft transmits no reply pulse to synch pulses. In Fig. 6f is shown only one discriminator channel of pulse width discriminator 95, the occupancy pulse channel. The response pulse channel is, however, identical except for the different settings of the adjustable controls in order to make the response channel capable of passing only pulses whose width lies within the limits of 3 to 6 microseconds. Each pulse received by occupancy receiver 94 during the time I-F amplifier 93 is operative is coupled via line 325 through coupling condenser 326 to the control grid of integrator pentode 327, whose screen grid is returned to a positive source of potential through resistor 328 and whose suppressor grid and cathode are connected together and to ground. As indicated, each pulse received by occupancy receiver 94 during the time I-F amplifier 93 is operative is also coupled via line 325 to coupling condenser 326' of the similar response channel of pulse width discriminator 95. The plate of tube 327 is connected to the same source of positive potential through resistor 329 and to ground through condensers 330 and 331 in series, and its control grid is returned to ground through resistor 332. The junction point of condensers 330 and 331 is connected to ground through resistor 333 and to the control grid of phase inverter pentode 334, whose screen grid is connected to the above-mentioned source of positive potential through resistor 335 and whose suppressor grid and cathode are connected together and to ground through the resistance strip of potentiometer 336. The plate of pentode 334 is connected to the above-mentioned source of positive potential through the resistance strip of potentiometer 337. Arm 338 of potentiometer 336 is connected through coupling condenser 339 to the grid of tube 340 and arm 341 of potentiometer 337 is connected through coupling condenser 342 to the grid of tube 343. The plate of tube 340 is connected to the same source of positive potential through resistor 344, to the grid of tube 345 through condenser 346, and to the grid of pentode 347 through differentiating condenser 348, and its control grid is returned to ground through resistor 349. The plate of tube 345 is connected to the above-mentioned source of positive potential through resistor 350 and to the grid of tube 340 through coupling condenser 351, its grid is returned to the same source of positive potential through resistor 352, and its cathode and that of tube 340 are connected together and to ground through resistor 353. Thus tubes 340 and 345 constitute a delay multivibrator. The plate of tube 343 is connected to the above-mentioned source of positive potential through resistor 355 and to the grid of tube 356 through condenser 357, its grid is returned to the same source of positive potential through resistor 358, and its cathode and that of tube 356 are connected together and to ground through cathode resistor 359. The plate of tube 356 is connected to the same source of positive potential through resistor 360 and to the screen grid of sharp cut-off pentode 347 through condenser 361, and its grid is connected to ground through resistor 362. Thus, tubes 343 and 356 constitute a second multivibrator. The screen grid of pentode 347 is also connected to the junction point of resistors 365 and 366, which are connected in series between the above-mentioned source of positive potential and ground, thus positively biasing this screen grid. The control grid of pentode 347 is returned to ground through resistor 367, its suppressor grid and cathode are connected together and to the same source of positive potential through resistor 368 and to ground through resistor 369 and condenser 370 connected in parallel, and its plate is connected to the same source of positive potential through resistor 371. Pentode 347 is thus normally off or nonconducting due to this cathode biasing. The output of this occupancy channel of pulse width discriminator 95 is taken from the plate of pentode 347 and coupled via line 372 to block 96. The output of the similar response channel of pulse width discriminator 95 is coupled via line 372' (not shown) directly to block 84.

The operation of this occupancy channel of pulse width discriminator 95 is as follows. Each pulse received at line 325 from occupancy receiver 94 will be negative and will turn integrator pentode tube 327 off for a time dependent upon its duration or pulse width. Whenever pentode 327 is turned off, condenser 331 starts charging toward the potential of the positive source, and thus a positive saw-tooth is produced at the control grid of phase inverter tube 334, the peak amplitude which this saw-tooth attains being a direct measure of the duration of the received pulse at line 325. A portion of the positive saw-tooth at the cathode of tube 334 is picked off by arm 338 of potentiometer 336 and connected to the delay multivibrator consisting of tubes 340 and 345, and a portion of the corresponding negative saw-tooth appearing at the plate of tube 334 is picked off by arm 341 of potentiometer 337 and connected to the multivibrator consisting of tubes 343 and 356. If the duration of the pulse coming from block 94 is equal to, or greater than, the minimum pulse length to be accepted by this discriminator (in this case, approximately 1.5 microseconds), the portion of the positive saw-tooth thus applied to the grid of tube 340 will turn this tube on and tube 345 abruptly off and this condition will obtain for a time fixed by the circuit constants of the multivibrator, here assumed to be approximately three microseconds. The resulting negative pulse at the plate of tube 340 is differentiated by the differentiating circuit consisting of condenser 348 and resistor 367, and the positive differentiated pulse produced coincident with the trailing edge of this negative pulse is applied to the control grid of output pentode 347 to produce an output at the plate of this tube, providing that a negative voltage gate is not applied to its screen grid. If the width of the pulse applied from block 94 is greater than the maximum pulse width to be accepted by this discriminator (here assumed to be three microseconds), the portion of the negative saw-tooth applied to the grid of tube 343 will be of sufficient magnitude to turn this tube off and tube 356 on abruptly, producing a negative voltage gate at the plate of tube 356, and this condition will continue for a time fixed by the circuit constants of this multivibrator. Adjustment of arm 338 of potentiometer 336 controls the minimum input pulse duration which will trigger the multivibrator consisting of tubes 340 and 345 into operation to produce an output at line 372, and adjustment of arm 341 of potentiometer 337 controls the maximum duration pulse passed by this circuit, since if a pulse of duration greater than this maximum setting is received, it will trigger the multivibrator consisting of tubes 343 and 356 into operation, thus producing a disabling negative voltage gate at the plate of multivibrator tube 356 which will then be coupled to the screen grid of pentode 347 to prevent its operation even though a differentiated positive pulse from condenser 348 is received at its control grid. This pulse width discriminator is more fully described and claimed in the application of Lionel H. Orpin for Pulse Duration Discriminator, Serial No. 743,149, filed April 22, 1947.

In Fig. 6g is shown the detailed circuit diagram of receiver output switch 96. Occupancy line 372 from block 95 is coupled through condenser 380 to the primary of pulse transformer 381, whose primary and secondary are wound oppositely from one another as indicated on the drawing. The high side of the secondary of pulse transformer 381 is connected to the grid of cathode follower 382, whose plate is connected to a source of positive potential and whose cathode is connected to ground through cathode resistor 383, to the grid of inverter tube 384 through coupling condenser 385, and directly to the control grids of electron switch tubes 386 and 387. The cathode of tube 384 is connected directly to ground, its grid is returned to a source of negative potential through resistor 388, and its plate is connected to the above-mentioned source of positive potential through resistor 389 and directly connected to the control grid of tube 390. The suppressor grid and cathode of tube 390 are connected together and to ground, its screen grid is connected to the above-mentioned source of positive potential through resistor 391 and to the control grid of tube 392 through coupling condenser 393, its control grid is also connected to ground through resistor 394 and to the screen grid of tube 392 through coupling condenser 395, and its plate is connected to the same source of positive potential through resistor 396 and directly connected to the screen grid of tube 386. The suppressor grid and cathode of tube 392 are connected together and to ground, its control grid is returned to a source of negative potential through resistor 397, its screen grid is returned to the above-mentioned source of positive potential through resistor 398, and its plate is connected to the same source of positive potential through resistor 399 and directly connected to the screen grid of tube 387. Thus the circuits of tubes 390 and 392 constitute an electron-coupled multivibrator. The suppressor grids and cathodes of switch tubes 386 and 387 are all connected together and to ground through the parallel combination of resistor 400 and condenser 401 and to the above-mentioned source of positive potential through resistor 402. The grid of tube 382 is also connected to the junction point of resistors 400 and 402 through resistor 403. The plate of tube 386 is connected to the above-mentioned source of positive potential through resistor 404 and to the grid of inverter tube 405 through coupling condenser 406, and the plate of tube 387 is connected to the same source of positive potential through resistor 407 and to the grid of inverter tube 408 through condenser 409. The cathode of tube 405 is directly connected to ground, its grid is connected to ground through resistor 410, and its plate is connected to the above-mentioned source of positive potential through resistor 411 and to output line 412 leading to block 84. The cathode of tube 408 is directly connected to ground, its grid is connected to ground through resistor 413, and its plate is conected to the same source of positive potential through resistor 414 and to output line 415 leading to block 84. Each occupancy pulse received by occupancy receiver 94 and passed by the occupancy channel of pulse width discriminator 95 as a negative pulse is inverted by pulse transformer 381 to produce a positive pulse at the grid of cathode follower 382 and hence also a positive pulse at its cathode. This positive pulse is coupled to the control grids of electron switch tubes 386 and 387 and will be passed by whichever of these switch tubes has its screen grid simultaneously raised in potential at the same time. This positive pulse at the cathode of cathode follower 382 is also coupled to the grid of inverter tube 384 and the resulting negative pulse produced at its plate is coupled to the control grid of multivibrator tube 390. Multivibrator tube 392 is normally off or nonconducting due to the negative bias applied to its control grid, and multivibrator tube 390 is normally on or conducting. The negative pulse applied to the control grid of tube 390 will turn that tube off and tube 392 on abruptly due to the well-known multivibrator action, thus producing a positive voltage gate at the plate of tube 390 and a corresponding negative voltage gate at the plate of tube 392 whose durations are equal and are controlled by the circuit constants of the multivibrator. In the embodiment herein described, it will be assumed that these have been chosen to produce voltage gates at the plates of the multivibrator of approximately 300 microseconds duration in order that any second occupancy pulse received during any one of the occupancy receiver gates of line AA (Figs. 5c and 5d) will be channelled into the proper double occupancy detection circuit. These positive and negative voltage gates are applied to the screen grids of switch tubes 386 and 387 respectively to control their operation. Switch tube 386 will conduct in response to a positive pulse applied to its control grid only when a positive voltage gate is simultaneously applied to its screen grid, and switch tube 387 will conduct in response to a positive pulse applied to its control grid only when a negative voltage gate is not applied to its screen grid. Since it requires a finite time for the operation of the multivibrator to produce output voltage gates in response to a negative signal received at line 372, the first occupancy pulse received at line 372 during any one occupancy receiver gate will be passed by switch tube 387 and coupled through inverter tube 403 to produce a positive pulse at line 415 (the single occupancy circuit). Immediately following this pulse, the negative voltage gate from the multivibrator (produced by this initial signal at line 372) will disable switch tube 387 and the corresponding positive gate will enable switch tube 386, and this condition will continue for approximately 300 microseconds so that any ensuing occupancy pulses received by occupancy receiver 94 and passed by the occupancy channel of pulse width discriminator 95 during that particular occupancy receiver gate will be channelled through switch tube 386 and inverter tube 405 to produce positive pulses at line 412 (the double occupancy circuit) leading to block 84.

In Fig. 6h is shown a detailed typical response, occupancy, or double occupancy detection circuit of block 84. Three of the tubes, isolating diodes 420 and 421 and sequence gate output cathode follower 422 are common to all response detection circuits, or to all occupancy detection circuits or to all double occupancy detection circuits. One gas tube 423, one charging diode 424, and one cathode follower 425 is required for each response, occupancy, or double occupancy detection circuit. One response detection circuit is required for each altitude zone to which information is being sent for each code sequence. Thus if communication is being had with two altitude zones and a four sequence code is being used (as assumed in the embodiment described) eight response detection circuits are required. Similarly, one occupancy and one double occupancy detection circuit is required for each altitude zone, and in the embodiment described, two of each are thus required. Line 290 from block 83 is connected to the plate of isolating diode 420, whose cathode is directly connected to the screen grid of gas tube 423 and returned to a source of negative potential through resistor 426. Line 372', if a response circuit, line 415, if an occupancy circuit, or line 412, if a double occupancy circuit, is connected from block 95 or 96, as the case may be, through coupling condenser 427 to the plate of isolating diode 421, whose cathode is connected through resistor 428 to the control grid of gas tube 423 and is also returned to the above-mentioned source of negative potential through resistor 429. The plate of isolating diode 421 is also connected to the same source of negative potential through resistor 430. Line 189 or 196 from block 82, if a response circuit, or line 163 from block 78, if an occupancy or double occupancy circuit, is conneced through coupling condenser 431 and resistor 432 to the grid of cathode follower 422, whose plate is connected to a source of positive potential and whose cathode is connected to ground through cathode resistor 433 and to the plate of gas tube 423. The junction point of condenser 431 and resistor 432 is connected to ground through resistor 434. The cathode of gas tube 423 is connected to the plate of charging diode 424 and to ground through resistor 435. The cathode of charging diode 424 is connected to the grid of cathode follower 425 through resistor 436, to a source of negative potential through resistor 437, and to ground through condenser 438. The plate of cathode follower 425 is connected to the above-mentioned source of positive potential and its cathode is connected through resistor 439 to its corresponding relay of block 87 via line 440 if a response circuit, or via line 440' if an occupancy circuit, or via line 441 if a double occupancy circuit. The operation of this typical circuit will first be described with reference to a response detection circuit and the variations in this operation for an occupancy or double occupancy detection circuit will then be noted. The desired altitude occupancy gate from block 83 (in this embodiment that of line Y or Z, Figs. 5c and 5d) is coupled through isolating diode 420 to the screen grid of gas tube 423. This gas tube will fire in response to a positive pulse applied to its control grid only if its plate supply is on and its screen grid is simultaneously raised in potential. The response pulses received by receiver 94 and passed by the response channel of pulse width discriminator 95 via line 372' and isolating diode 421 are applied as positive pulses to the control grid of gas tube 423. The proper sequence gate, from line 189 (line J, Figs. 5a and 5b) if the first code sequence, or from line 196 (line K, L, or N, Figs. 5a and 5b) if the second, third or fourth code sequence, respectively, is coupled through gate output cathode follower 422 to provide the plate potential for gas tube 423. Thus the occurrence of a received signal at the control grid of gas tube 423 simultaneously with any one altitude occupancy gate will cause gas tube 423 to conduct and continue to conduct until the plate voltage of the gas tube is reduced at the end of the sequence gate. When gas tube 423 conducts, it causes a current to flow through resistor 435, producing a positive potential at the plate of charging diode 424 and charging condenser 438. Condenser 438 remains charged until gas tube 423 ceases to conduct and thereafter discharges along an exponential discharging path whose time constant is determined by the capacity of condenser 438 and resistance of resistor 437. The pulse of gradually decreasing amplitude thus produced at the grid of cathode follower 425 is reproduced at its cathode and coupled via line 440 to energize the proper response relay in block 87 for a length of time fixed as desired by varying the values of condenser 438 and resistor 437. The operation of a typical occupancy or double occupancy detection circuit is similar as above-mentioned. Line 415 or 412 from block 96 is connected through isolating diode 421 to the control grid of gas tube 423, however, instead of line 372', and the 16,666 microsecond gate (line H, Figs. 5a and 5b) from block 78 is now coupled via line 163 and cathode follower 422 to provide the plate potential for gas tube 423. Thus if a pulse signifying occupancy or double occupancy is received from block 96 via line 415 or 412, respectively, and diode 421 at the control grid of gas tube 423 during any one altitude occupancy gate, gas tube 423 will conduct and continue to conduct until the end of the 16,666 microsecond gate or, in other words, continue to fire during that particular code sequence. The result of gas tube 423 conducting will be to produce an output pulse at the cathode of cathode follower 425 similar to that above-mentioned for the response detection circuit, which is then coupled to the proper occupancy or double occupancy relay of block 87 via line 440' or 441, respectively.

Figure 6I:
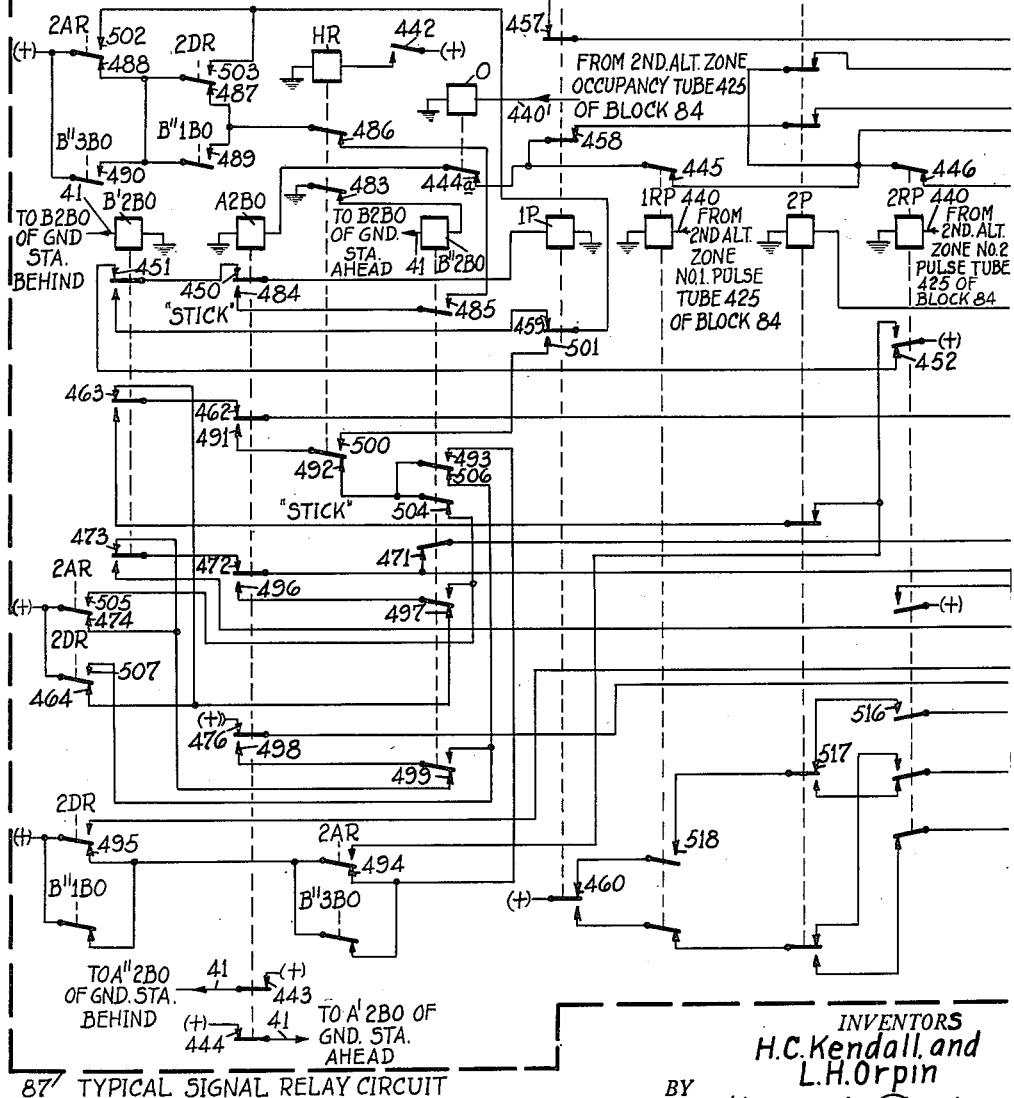

In Figs. 6i and 6j are illustrated a typical signal relay circuit of block 87 and an assumed code for communication between a ground station and an aircraft. In the code, signals shown above the double line are sent to an aircraft within the altitude zone of a block and their reception by the aircraft is checked back to the ground station by means of reply pulses to each transmitted pulse, while signals shown below the double line are sent to the altitude zone only when it is unoccupied and hence ordinarily cannot be replied to, thus being unchecked. The encircled "x's" of certain of the unchecked signals indicate that an aircraft without that altitude zone of the block replies to that single pulse to signify its desire to enter that altitude zone (either by ascent, descent, or from the side as the case may be), no reply being sent corresponding to the other pulses of the unchecked signals. The particular relay circuit shown is the one controlling the information intended for the second altitude zone. In the drawings, the abbreviation A2BO indicates the block occupancy relay for the second altitude zone of this block, B'2BO indicates the block occupancy relay conveying information as to the occupancy conditions of the second altitude zone in the block behind this one, and B"2BO indicates the block occupancy relay conveying information as to the occupancy conditions of the second altitude zone of the block ahead. 1P, 2P, 3P, 4P and 6P denote the relays controlling the sending of the Nos. 1, 2, 3, 4, and 6 pulses, respectively, to the second altitude zone of this block and 1RP, 2RP, 3RP, 4RP, O, and DO denote the relays which are energized to signify the reception of Nos. 1, 2, 3 and 4 reply pulses from an aircraft in the second altitude zone of this block and an occupancy and a double occupancy condition within the second altitude zone respectively. HR denotes the "hold" relay which may be energized by means of switch 442 to indicate orders from the ground station to an aircraft with which communication is being had in the second altitude zone of this block to hold its position within the block, as by circling. 2AR and 2DR denote the ascent relay and descent relay, respectively, for ordering or granting permission to an aircraft within the second altitude zone to ascend or descend as the case may be. Since it is not feasible to show the correspondence of certain relay armatures and contacts with the proper relay by the physical arrangement of the components on the drawing, the correspondence of these armatures and contacts has been designated by letters and numerals. For instance, B"1BO above a relay armature and contacts indicates that they correspond to the block occupancy relay of the first altitude zone of this block conveying information as to the occupancy conditions of the first altitude zone of the block ahead, 3—1P above a relay armature and contacts indicates that they correspond to the No. 1 pulse relay of the third altitude zone of this block, 0AR the ascent relay of zone 0 of this block, etc. The convention has been adopted in Figs. 6i and 6j that all relay armatures are energized in the upward position and de-energized in the downward position irrespective of the physical position of the relay upon the drawings, and the relay armatures have been shown in the drawings in the proper positions for the second altitude zones of this block and the block behind this being clear or unoccupied. While all relay circuits have been shown as being returned to ground, it is of course obvious that if desired they may be returned instead directly to the negative terminal of the relay potential source in accordance with standard relaying practice. As shown, the "O" or occupancy relay is energized by means of line 440' from the second altitude zone occupancy tube 425 of block 84, the DO or double occupancy relay is energized by means of line 441 from the second altitude zone double occupancy tube 425 of block 84, and the 1RP, 2RP, 3RP and 4RP reply pulse relays are energized by means of lines 440 from the second altitude zone Nos. 1, 2, 3 and 4 pulse tubes 425 respectively of block 84. Relay B'2BO is energized from line wire 41 from the B2BO relay of the ground station behind, and relay B"2BO is energized from line wire 41 from the B2BO relay of the ground station ahead. Block occupancy relay A"2BO of the ground station behind this one is energized through contact 443 corresponding to relay A2BO, and block occupancy relay A'2BO of the ground station ahead is similarly energized through contact 444 of relay A2BO. As shown by the code in the upper left-hand portion of Fig. 6i, whenever a particular altitude zone of both the B' (block behind) and A (this)

block are clear or unoccupied, Nos. 1, 2, 3 and 4 pulses are sent to that altitude zone of this block, and, since that altitude zone is unoccupied, no reply pulses are received. This condition for the second altitude zone is manifested in the signal relay circuits by block occupancy relay A2BO being energized, the circuit path being through relay contacts 444a, 445, 446, 447 and 448 corresponding to the 0, 1RP, 2RP, 3RP, and 4RP relays, respectively. Since block occupancy relay B'2BO is also energized (from the ground station behind), relay 1P is energized through upper contacts 450 and 451 of block occupancy relays A2BO and B'2BO respectively and lower contact 452 of reply relay 2RP. Relay 1P being energized results in the topmost circuit of the figure being closed through upper contact 453, which connects the cathode of diode 454 to output line 455 leading to the screen grid of normal tube 600 of altitude zone 2 of block 86. The plate of diode 454 is connected to line 189 from block 82, which corresponds to waveform J of Figs. 5a and 5b, the first sequence gate. Thus through the succeeding circuits of the ground station system the normal pulse for the first sequence, or, in other words, the No. 1 pulse, will be sent from transmitter 89. Simultaneously, other circuits are closed through contacts 457, 458, 459, and 460, whose purposes will be indicated hereinafter. Relay 2P is similarly energized at the same time through contact 461 of the DO relay, upper contacts 462 and 463 of the A2BO and B'2BO relays respectively, and lower contact 464 of the 2DR relay. Diode 465, whose plate is connected to the line 196 from block 82 corresponding to the second sequence gate (line K, Figs. 5a and 5b), is then connected through upper contact 466 of the 2P relay to line 455, so that the normal or No. 2 pulse will be sent out by transmitter 89 for the second sequence, and other circuits are also closed through upper contacts corresponding to the 2P relay as shown in the drawing. Relay 3P is energized through contacts 470 and 471 of the DO and B''2BO relays respectively in parallel if the second altitude zone of the block ahead is occupied or through contact 470 alone if that altitude zone is unoccupied, upper contacts 472 and 473 of relays A2BO and B'2BO respectively, and lower contact 474 of the 2AR relay. Relay 4P is energized through contact 475 of the DO relay and upper contact 476 of the A2BO relay. When the 3P and 4P relays are energized, diodes 478 and 479, whose plates are connected to the lines 196 from block 82 corresponding to the third and fourth sequence gates respectively (lines L and M, Figs. 5a and 5b), are connected to line 455 through upper contacts 480 and 481 respectively, resulting in the normal pulses for the third and fourth sequences (Nos. 3 and 4 pulses) also being sent out by transmitter 89. When an aircraft enters the second altitude zone of this block, it will begin to reply to each normal pulse and reply relays 1RP, 2RP, 3RP and 4RP will then be energized, which will thus open the circuit to relay A2BO through contacts 445, 446, 447, and 448. If the second altitude zone of the block ahead is clear, the B''2BO relay will be energized through contact 483 providing the HR relay is not energized, a green signal should be sent to the aircraft, and as required by the code, the 1P relay will then be energized through lower contact 484 of the A2BO relay, contact 485 of the B''2BO relay, contact 486 of the HR relay, and lower contacts 487 and 488 of the 2DR and 2AR relays, respectively, if neither the HR, DR, or AR relays have been energized. Even if the 2DR relay is energized, a path from contact 486 is provided through contact 489 of the B''1BO relay if the first altitude zone of the block ahead is clear, and if the 2AR relay is energized and the 2DR relay is de-energized, the circuit is completed through contact 490 of the B''3BO relay rather than through contact 488 if the third altitude zone of the block ahead is clear. Simultaneously the 2P relay is energized through contact 461 of the DO relay, lower contacts 491 and 492 of the A2BO and HR relays, upper contact 493 of the B''2BO relay, and lower contacts 494 and 495 of the 2AR and 2DR relays respectively if the HR, 2AR, and 2DR relays are not energized. At the same time it can be shown that the 3P and 4P relays are not energized, resulting in only the normal pulses corresponding to the first and second sequences, or, in other words, Nos. 1 and 2 pulses being sent to the second altitude zone of this block. As will be pointed out more in detail hereinafter, blank or check pulses will then be sent to the aircraft during the third and fourth sequences of the code since normal pulses are not being sent during these two sequences. The aircraft will reply to these blank or check pulses with occupancy pulses, which will then energize occupancy relay O and de-energize second altitude zone block occupancy relay A2BO by opening contact 444a. It is to be noted that due to the circuitry thus provided, reception of either a response or an occupancy pulse from the aircraft in reply to any pulse transmitted to and intended for the second altitude zone of this particular block will result in the second altitude zone block occupancy relay A2BO being de-energized because of the opening of one or more of contacts 444a, 445, 446, 447, and 448 associated with the 0, 1RP, 2RP, 3RP, and 4RP relays, respectively.

If another aircraft should then enter the second altitude zone, the DO relay will be energized, resulting in the 2P relay being de-energized since it is no longer connected through contact 461, and the code being transmitted would thus change as desired. If the ground station wishes to hold the aircraft in the second altitude zone of this block, energization of the HR relay through switch 442 will de-energize both the 1P and 2P relays since connections to the potential source will no longer be made through contacts 486 and 492, respectively. Simultaneously, relay B''2BO will be de-energized since its circuit no longer will be completed through contact 483, and this will result in pulse relays 3P and 4P being energized, giving the aircraft a red signal. Relay 3P is energized through contacts 470 and 471 of the DO and B''2BO relays, respectively, in parallel and lower contacts 496, 497 and 464 of relays A2BO, B''2BO and 2DR respectively, and relay 4P is energized through contact 475 of the DO relay and lower contacts 498, 499 and 474 of relays A2BO, B''2BO, 2AR, respectively. This red signal may be produced by the same relaying sequence, of course, if relay B''2BO is de-energized due to an aircraft being present in the second altitude zone of the block ahead rather than by energizing the HR relay through hold switch 442. However, after receiving the red signal the aircraft in the second altitude zone of this block can then request permission or be ordered by the ground station to ascend or descend, and if altitude zone block occupancy conditions are met, this will result in energizing the No. 2 relay through contacts 461 and 491, as before, and upper contact 500 of the HR relay if the HR relay is energized, lower contact 501 of the 1P relay, and upper contact 502 of the 2AR relay for ascent or through upper contact 503 of the 2DR relay and contact 488 of the 2AR relay for descent. If the HR relay is not energized, the circuit to relay 2P is completed through contacts 461 and 491, as before, and lower contacts 492 and 504 of the HR and B″2BO relays, respectively, and upper contact 505 of the 2AR relay for ascent or through lower contact 506 of the B″2BO relay and upper contact 507 of the 2DR relay for descent. Thus in the case of ascent the No. 4 pulse is no longer sent since the circuit to relay 4P will not then be completed through contact 474, and in the case of descent the No. 3 pulse is no longer sent since the circuit to relay 3P will not then be completed through contact 464. The circuitry for an aircraft requesting permission or the ground station ordering the aircraft to ascend or descend will be more fully discussed hereinafter in connection with the 2AR and 2DR relays.

As has been indicated previously, wherever a normal pulse is not sent to an aircraft during a particular code sequence, either a No. 5 (blank) or No. 6 (check) pulse is sent, the No. 5 pulse being sent until reception of the particular code by the aircraft has been checked back to the ground station, all No. 5 pulses thereafter being replaced by No. 6 pulses. This is accomplished by the circuitry shown at the top and bottom of Figs. 6i and 6j whenever a No. 1, 2, 3 or 4 pulse is not being sent as evidenced by the 1P, 2P, 3P or 4P relays, respectively, not being energized. When the 6P relay is de-energized, its armature 508 is connected through lower contact 509 to the screen grid of the blank (No. 5 pulse) tube 600 of altitude zone 2 of block 86, and when relay 6P is energized, armature 508 is connected through upper contact 510 to the screen grid of the check (No. 6 pulse) tube 600 of altitude zone 2 of block 86. Armature 508 is directly connected to four lower contacts 511, one associated with each of relays 1P, 2P, 3P, and 4P, so that whenever the 1P, 2P, 3P, or 4P relay is not energized, the cathode of the corresponding diode 454, 465, 478, or 479 is connected to armature 508. Thus, when the normal pulse for a sequence is not being sent during that sequence, the No. 5 pulse will be sent unless the 6P relay is energized. Energization of the 6P relay is accomplished after checking reception of the green code, when the Nos. 1 and 2 pulses are being sent and no Nos. 3 or 4 pulses are being sent, through lower contacts 512, 513, 514, and 515 and upper contacts 516, 517, 518, and 460 corresponding to the 4RP, 4P, 3RP, 3P, 2RP, 2P, 1RP and 1P relays, respectively. Similarly, it can be shown for any of the eight signals marked "checked" in the code in the upper left-hand corner of Fig. 6i that the 6P relay will be energized when each pulse relay that is energized has its corresponding reply pulse relay energized and each pulse relay that is de-energized has its corresponding reply pulse relay de-energized.

The other circuitry illustrated can be similarly shown to give the desired code signals assumed, but the individual operation of each circuit will not be described with the exception of the ascent and descent circuits. In these circuits, relay contacts are shown corresponding to one and two altitude zones above and below the particular aircraft with which communication is being had, and these are utilized in case there is air lane traffic in these zones. In case traffic is limited to two altitude zones, as was previously assumed for the embodiment presently being described, such relay contacts are shorted out of the circuit. Ascent relay 2AR may be energized through contacts 520, 521, 522, 523, 524, 525, 526, 527, and 528 of relays 3—3P, 3—1P, 3—2P, 3—4P, 4DR, A3BO, 3—1RP, 1—3RP, and 2DO, respectively. The circuit includes contacts closed by pulse relays 1P, 2P, 3P and 4P and block occupancy relay A3BO of the third altitude zone of this block in order that an ascent permission cannot be granted or ordered unless the altitude zone above of this block and of the block behind are both clear. A relay contact corresponding to the descent relay of two altitude zones above in this block (4DR) is included in order that ascent and descent permission or orders into the same altitude zone cannot be given simultaneously, and a contact corresponding to the double occupancy relay of this altitude zone of this block (2DO) is included in order that permission or orders to ascend or descend can never be given in case of double occupancy. Similarly, contacts corresponding to the No. 1 reply pulse relay of the altitude zone above (3—1RP) and the No. 3 reply pulse relay of the altitude zone below (1—3RP) are included in order that both ascent and descent requests cannot be made by an aircraft at the same time. Contact 520 of relay 3—3P is by-passed by a "stick" circuit through contact 529 since ascent permission or orders are manifested to the altitude zone into which entry is desired by the ground station ceasing to send the No. 3 pulse to that altitude zone, and contact 526 of relay 3—1RP is by-passed by a switch 530 which when closed by the ground station orders the aircraft to ascend, the circuit being completed through contact 526 only when an aircraft requests permission to ascend by responding to the first pulse of the code being sent to the altitude zone above that in which it is located, in this case the third altitude zone. The descent relay 2DR circuit is similar, including relay contacts corresponding to relays 1—2P, 1—1P, 1—3P, 1—4P, OAR, A1BO, 3—1RP, 1—3RP, and 2DO. This descent circuit also includes a "stick" circuit around the contact corresponding to the 1—2P relay and a manual or local switch 531 for ordering descent which by-passes the contact corresponding to relay 1—3RP through which the circuit is closed when an aircraft requests descent permission.

In Fig. 6k are shown two typical sequencing and signal pulse selection circuits of block 86. One pulse selection circuit is required for each altitude zone with which communication is being had for each pulse width which it is desired to transmit to the altitude zone, and one pulse selection circuit is required to control the altitude synch pulses. A typical pulse selection circuit for controlling pulses of one width to one altitude zone includes a coincidence or switch tube 600, a clamper tube 601, an inverter tube 602, and an output cathode follower 603.

In the right-hand portion of Fig. 6k is shown the pulse selection circuit for controlling the synch pulse output of the transmitter, and this includes a coincidence or switch tube 600, a clamper tube 601, an inverter tube 602, an output cathode follower 603, as described above, and in addition an input cathode follower 604. The delayed trigger pulses of line B (Figs. 5a and 5b) from line 253 of block 75 are connected through coupling condenser 605 to the grid of input cathode follower 604. The plate of tube 604 is connected to a source of positive potential, its grid is returned to ground through resistor 606, and its cathode is returned to ground through resistor 607 and also is connected to the control grid of the right-hand or synch coincidence or switch tube 600 through coupling condenser 608. The altitude gates of line N (Figs. 5c and 5d) are connected from line 215 of block 85 through coupling condenser 609 to the suppressor grid of switch tube 600 and to the plate of clamper tube 601. The screen grid of tube 600 is connected to the above-mentioned source of positive potential through resistor 610 and to ground through resistor 611, and its plate is connected to the same source of positive potential through resistor 612 and also is connected to the grid of inverter tube 602 through condenser 613. Resistor 614 is connected between junction point 615 and the same source of positive potential, and resistor 616 and condenser 617 are connected in parallel between ground and junction point 615. The cathodes of all switch tubes 600 and clamper tube 601 are connected together and to junction point 615. Relative values of resistors 610, 611, 614, and 616 are chosen such that the positive bias at the screen grid of right-hand or synch tube 600 is greater than that at its cathode. The plate of inverter tube 602 is connected to the above-mentioned source of positive potential through resistor 618 and is directly connected to the grid of output cathode follower 603, whose plate is directly connected to the same source of positive potential and whose cathode is connected to output line 619 leading to block 90 and also to ground through resistor 620. The cathode of tube 602 is directly connected to ground and its grid is returned to ground through resistor 621. The control grid of each coincidence tube 600 is returned to ground through a respective resistor 622, and the plate of each clamper tube 601 is returned to ground through a respective resistor 623.

The operation of this synch pulse selection circuit is as follows: Switch tube 600 is normally off or non-conducting due to the positive bias upon its cathode obtained from junction point 615. Due to the greater positive bias upon the screen grid of switch tube 600 produced by the network consisting of resistors 610 and 611, whenever an altitude gate such as is shown in line N (Figs. 5c and 5d) is applied to its suppressor grid, this tube will conduct in response to whichever delayed trigger from block 75 occurs during the duration of this altitude gate appearing at its suppressor grid. When switch tube 600 conducts, the negative trigger produced at its plate is inverted by inverter 602 and coupled by output cathode follower 603 to line 619 leading to block 90, where it will be used to trigger the proper synch pulse-forming circuit.

In the embodiment described, since it is assumed that information is being sent to two altitude zones and since, as above-mentioned, it is desired to send any one of three pulses, either the normal, the No. 5 or the No. 6 pulse, to any altitude zone, six of the typical pulse selection circuits shown in the left-hand portion of Fig. 6k will be required. Similar circuit parameters in this circuit and that of the right-hand portion of the drawing are numbered identically. The major differences between the typical pulse selection circuits and the synch pulse selection circuit already described are: (1) The altitude gates of either line O or line P of Figs. 5c and 5d from line 215' or 215'' of block 85 are connected through coupling condenser 609 to the suppressor grid of switch tube 600, depending upon whether communication is desired with the first altitude zone or the second altitude zone, respectively. (2) Instead of always being positively biased, the potential of the screen grid of switch tube 600 is obtained from line 455 of block 87, being thus controlled by the signal relay circuits according to occupancy conditions of the particular altitude zone in the embodiment described, and this requires that the screen grid of switch tube 600 be returned to ground through resistor 624. (3) The input to the control grid of switch tube 600 is obtained from the blade of switch 80, through coupling condenser 608. When the blade of switch 80 (Fig. 4b) is connected to the A contact or, in other words, if this is an "A" station, this left-hand switch tube 600 is triggered on by the pulses shown in line B of Figs 5a and 5b. If, on the other hand, the blade of switch 80 is connected to the B contact or, in other words, if this is a "B" station, switch tube 600 would be triggered on by the pulses of line D of Figs. 5a and 5b, each of which occurs 463 microseconds later than the corresponding pulse of line B (Figs. 5a and 5b). (4) Plate resistor 612 and the subsequent portions of the circuit, including inverter 602 and cathode follower 603, are common to each pulse selection circuit controlling a particular pulse width, either normal, No. 5, or No. 6, and the output at the cathode of output cathode follower 603 is connected to the line 625 leading to the proper pulse-forming circuit of block 88 or block 90. The operation of the typical pulse selection circuit is as follows: Switch tube 600 being off or non-conducting due to the positive bias upon its cathode, it will conduct only in response to its three grids being simultaneously raised in potential, and this occurs only when the desired altitude gate of line O or line P (Figs. 5c and 5d) is applied to its suppressor grid and the proper sequence gate is applied to its screen grid as determined by the signal relay circuits of block 87. When these gates are applied to these grids simultaneously, the corresponding delayed trigger pulse of line B or D (Figs. 5a and 5b), depending upon whether this is an "A" or "B" station and hence which position switch 80 is in, will cause switch tube 600 to conduct, producing a current flow through the common plate resistor 612 and a consequent negative pulse at the grid of common inverter 602, the positive pulse produced at the plate of the latter being conducted through common output cathode follower 603 and the proper line 625 to the proper pulse-forming circuit of block 88 or 90.

Figure 6L:
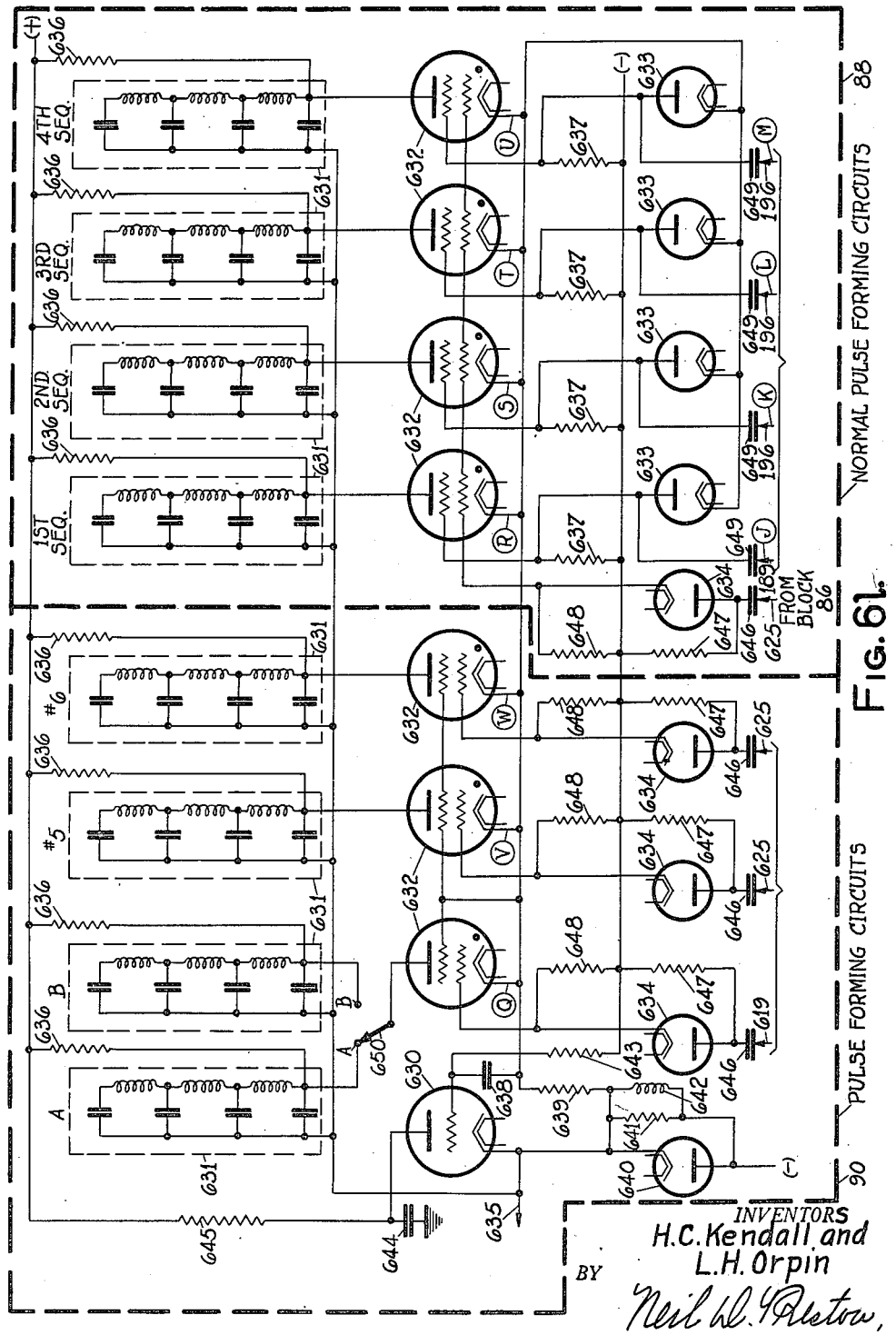
Figure 60:
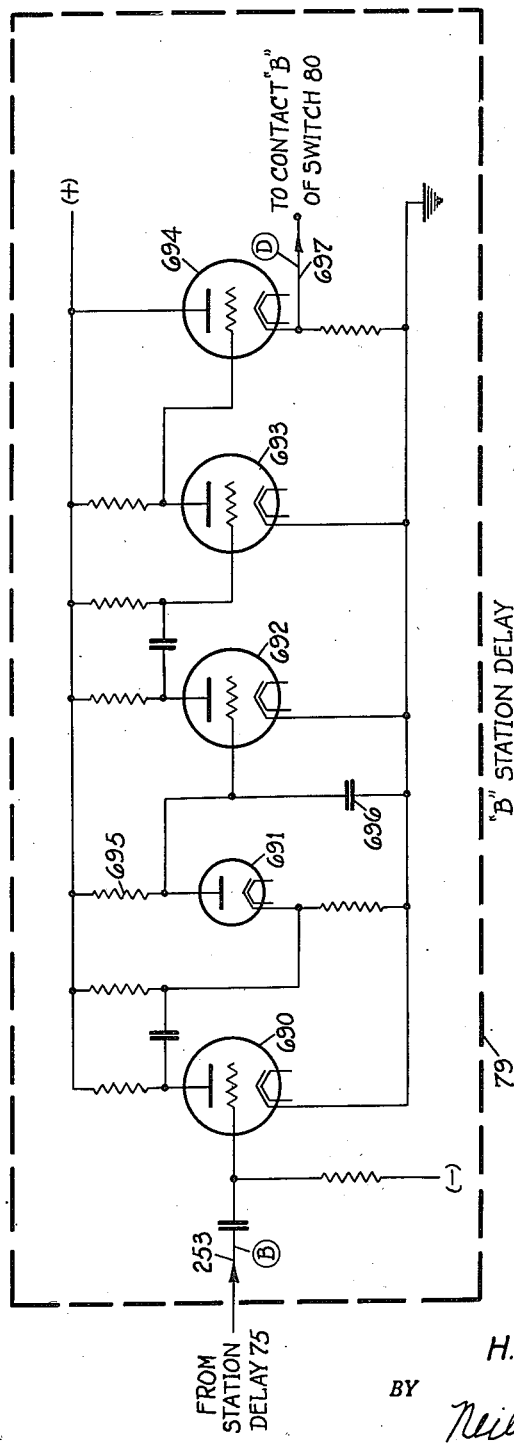

In Fig. 6l are shown pulse-forming circuits 90 and normal pulse-forming circuits 88. Any output from any one of the pulse-forming circuits operates driver tube 630. Each normal pulse-forming circuit includes a pulse-forming network 631, a switch tube 632 of the gas type and a clamper tube 633. The control grids of switch tubes 632 of all normal pulse-forming circuits are connected together and to the cathode of isolating diode 634. The low sides of all pulse-forming networks 631 are connected together, to the cathode of driver tube 630, and to output line 635 leading to modulator 91. The high side of each pulse-forming network 631 is connected to a source of positive potential through a resistor 636 and to the plate of the corresponding switch tube 632, whose screen grid is connected to the plate of its corresponding clamper tube 633 and to a source of negative potential through resistor 637. The cathodes of all switch tubes 632 and clamper tubes 633 are connected together, to the grid of driver tube 630 through condenser 638, and to one end of resistor 639, whose other end is connected to the cathode of tube 630. The ohmic value of resistor 639 is made approximately equal to the characteristic impedance of each pulse-forming network 631. A damping diode 640, cathode resistor 641, and tail-clipping inductance 642 are connected together in parallel between the cathode of driver 630 and a second source of negative potential, which source of potential, however, is not as great as that to which the screen grids of switch tubes 632 are returned. The grid of driver 630 is connected through resistor 643 to the same source of negative potential as that to which the screen grids of switch tubes 632 are returned, and its plate is connected to ground through condenser 644 and to the above-mentioned source of positive potential through resistor 645. While all pulse-forming networks 631 have been shown in the drawing as including the same number of sections, it is to be understood that this is merely diagrammatic and that the proper number of sections are included in each pulse-forming network to produce a pulse of the desired width. The operation of the normal pulse-forming circuits is as follows: Line 625 from cathode follower 603 of block 86 controlling the normal pulse circuits is connected through condenser 646 to the plate of isolating diode 634. The source of negative potential to which the screen grids of switch tubes 632 is returned is connected to the plate and cathode of tube 634 through resistors 647 and 648, respectively. The sequence gates shown in line J (Figs. 5a and 5b) from line 189 of block 82 are connected through coupling condenser 649 to the plate of the clamper tube 633 which is connected to the screen grid of the switch tube 632 controlling the normal pulse-forming network for the first sequence. Lines 196 from the second, third and fourth sequence gate circuits, respectively, are connected through similar condensers 649 to the plates of the clamper tubes 633 and associated circuits controlling the normal pulse-forming networks of the second, third and fourth sequences, respectively. All switch tubes 632 are normally off or non-conducting due to the negative potential supplied to their screen grids being greater than that supplied to their cathodes, and each switch tube 632 will fire only when its screen grid is raised in potential by the application of its sequence gate simultaneously with a trigger pulse from line 625 being applied to its control grid through isolating diode 634. Whenever one of the switch tubes 632 is turned on or conducts, it allows its pulse-forming network 631 to discharge across cathode resistance 639 to produce a pulse thereat. If the gas tube 632 corresponding to the first sequence normal pulse-forming circuit is the one that fires, a pulse corresponding to one of those of line R (Figs. 5c and 5d) will be produced at its cathode and across cathode resistor 639; if the second sequence normal pulse-forming circuit, it will be one of those of line S; if the third sequence normal pulse-forming circuit, it will be one of those of line T; and if the fourth sequence normal pulse-forming circuit, it will be one of those of line U. This pulse produced across cathode resistor 639 will be coupled to the grid of driver tube 630 through condenser 638, and since, as shown, this driver tube 630 is connected in a "boot-strapping" circuit, a similar amplified positive pulse will be produced across its cathode resistor 641 and at line 635 leading to modulator 91. Tail-clipping inductance 642 is inserted to insure a sharp trailing edge of the pulse. In the absence of tail-clipping inductance 642, the end of the pulse would trail off gradually due to the distributed capacitance of the circuit, which is not desirable. However, the insertion of inductance 642 alone would produce oscillations including a negative swing of the waveform after the sharp trailing edge if damping diode 640 were not inserted in the circuit.

The pulse-forming circuits of block 90 are similar to those of block 88 except that the screen grids of their gas-type switch tubes 632 are all connected together and to their cathodes, and the control grid of each tube 632 is connected through its isolating diode 634 and coupling condenser 646 to its corresponding cathode follower 603 of block 86. Similar circuit parameters in blocks 90 and 88 which are similarly connected have been numbered identically. Either one of two pulse-forming networks, which produce synch pulse widths A and B, respectively, may be connected to the plate of the gas tube 632 corresponding to the synch pulse-forming circuit by means of switch 650, and this switch is normally set to either A or B, depending upon which type of ground station this is to be, as above-mentioned, at the time the ground stations are put into operation and not thereafter changed. Preferably, switch 650 is ganged with switch 80 (Fig. 4b) so that the two must be operated simultaneously. Since this embodiment has been assumed to be an A ground station, switch 650 is shown in the A position, thus connecting its switch tube 632 to the A pulse-forming network 631, and this gas tube 632 has its control grid connected through its isolating diode 634 and coupling condenser 646 to line 619 from block 86. The pulse-forming networks 631 producing pulse widths No. 5 and No. 6, respectively, are connected to their respective switch tubes 632, whose control grids are connected through their respective isolating diodes 634 and coupling condensers 646 to the proper line 625 from block 86 connected to the corresponding cathode follower 603. The operation of these pulse-forming circuits of block 90 is similar to that of the pulse-forming circuits of block 88 except that each of these switch tubes 632 will conduct in response to a trigger from block 86 applied to its control grid alone, no supplementary voltage gate being required at its screen grid. The output at the cathode of the gas tube 632 corresponding to the synch pulse-forming circuit is shown in line Q (Figs. 5c and 5d), that of the No. 5 pulse-forming circuit is indicated in line V, and that of the No. 6 pulse-forming circuit is shown in line W.

In Fig. 6m is shown the modulator of block 91. The output from "boot-strap" driver 630 at line 635 is connected to the grids of modulator tubes 660 in parallel through parasitic resistors 661. The screen grids of these two tubes are connected together and to the high voltage source of the transmitter through resistor 662. The plate of each tube 660 is connected through its parasitic resistor 663 and resistor 662 to the same high voltage source. The junction point of resistors 662 and 663 is connected to one terminal of condenser 665; the other terminal of condenser 665 is connected to ground through inductance 666 and through resistor 664 in multiple, to output line 667 leading to the cathode of the transmitter oscillator, and to the plate of damping diode 668. The cathode of damping diode 668 is connected to ground through resistor 669 and to portional synchronizing line 266 leading to blocks 83 and 92 through coupling condenser 670. The cathode of modulator tubes 660 are connected together and to ground. Modulator tubes 660 are normally off or non-conducting due to line 635 being connected to a source of negative potential within block 90 as above-described, and hence condenser 665 is normally charged to the potential of the high voltage source, its charging path being essentially through resistor 662 and inductance 666 in parallel with resistor 664. Whenever a positive pulse from "boot-strap" driver 630 is applied via line 635 to the grids of modulator tubes 660, these tubes conduct heavily and allow condenser 665 to discharge through the transmitter oscillator, which may be a magnetron, lighthouse tube and cavity, or the like. At the end of the pulse applied to the modulator tubes 660, these tubes again cease to conduct and condenser 665 ceases to discharge, and the result would be a slow trailing edge pulse at line 667 if tail-clipping inductance 666 were not inserted in the circuit. Tail-clipping inductance 666 produces a sharp trailing edge of the pulse, and damping diode 668 and resistor 664 are inserted to prevent the pulse at line 667 from going very far positive after the trailing edge, as it would do due to the presence of inductance 666 if the damping diode and resistor were not present as previously discussed. When damping diode 668 conducts, it produces a sharp pulse across resistor 669 which is then utilized as a portional synchronizing trigger in blocks 83 and 92 of the system. While it is stated elsewhere in this disclosure that these portional synchronizing triggers occur simultaneously with the output of the transmitter, it will be noted that actually these occur immediately following the output of the transmitter, when damping diode 668 conducts. This difference in time, however, is so small that it can be disregarded in the operation of the system, and this is the reason that elsewhere in this disclosure these portional synchronizing triggers are treated as occurring simultaneously with the transmitter output.

In Fig. 6n are shown the trigger circuit of block 76 and the pulse-forming circuits 675 of block 71. Pulse-forming circuits 675 include a gas-type switch tube 676 associated with a 1 microsecond pulse-forming network 677, a gas-type switch tube 678 associated with a 2 microsecond pulse-forming network 679, and a "boot-strap" driver 680. Trigger circuit 76 includes a trigger amplifier 681 and cathode follower 682 and a 1½ microsecond delay tube 683 having associated with it a pulse-forming network 684 and a delay line 685. Each output pulse from line 120 of discriminator 74 (shown in line F, Figs. 5a and 5b) is applied to the cathode of amplifier 681 and thence through cathode follower 682 to the control grid of switch tube 678, turning this tube on and causing pulse-forming network 679 to discharge through the tube, forming a 2 microsecond pulse across cathode resistor 686. This 2 microsecond pulse is then coupled through "boot-strap" driver 680 to the modulator of transmitter 71, the construction and operation of driver 680 being similar to that of "boot-strap" driver 630 of Fig. 6l previously discussed. Each pulse from the output circuit of synchronization receiver 70 (see line A, Figs. 5a and 5b) is coupled via line 73 to the control grid of tube 683 which is also of the gas type, turning this tube on and thus discharging pulse-forming network 684 through the tube. Pulse-forming network 684, which preferably produces a pulse of 1 microsecond duration, is introduced in the circuit to insure a sharp leading edge pulse at this point, and this pulse is then delayed by delay line 685 by a time preferably equal to about 1½ microseconds before being applied through differentiating condenser 687 to the control grid of switch tube 676. This time delay is chosen such that a 2 microsecond pulse applied from line 73 simultaneously to tube 683 and discriminator 74 will trigger switch tube 678 an instant before switch tube 676 is triggered. Delay line 685 terminates in a resistance 688 whose ohmic value is equal to the characteristic impedance Zc of the line. As shown, the cathodes of switch tubes 676 and 678 are coupled together so that whenever one fires the other is disabled due to the rise of its cathode potential, and hence only one switch tube can fire at a time, tube 676 firing in response to each 1 microsecond altitude pulse from line 73 and tube 678 firing in response to each pulse from line 120 corresponding to each 2 microsecond synch pulse received at this ground station. The circuits shown in Fig. 6n thus repeat each synch and altitude or information pulse received by synchronization receiver 70 for transmission by synchronization transmitter 71, and although a 1½ microsecond delay of each pulse is introduced, this can be taken care of at successive ground stations by varying the delay introduced by each adjustable station delay 75.

In Fig. 6o is shown the detailed circuitry of "B" station delay 79, which is inserted effectively in the ground station circuit (by means of switch 80, Fig. 4b) only if the station is a "B" station. It introduces in each sequence scan an additional 463 microseconds delay after each synch pulse before the transmission of the altitude or information pulses intended for each altitude zone, as discussed above in detail in connection with Fig. 3. Its circuitry and operation are similar to that of the 500 microseconds delay circuit of block 85, discussed above in detail in connection with Fig. 6c, and tubes 690, 691, 692, 693, and 694 are connected similarly to tubes 214a, 216, 217, 218, and 214, respectively, of Fig. 6c. Hence this circuit will not be discussed here in detail except to point out the major difference between the two, which is that the value of resistor 695 is adjusted such that the time constant of discharge of condenser 696 is just large enough to cause a 463 microseconds delay between the leading edge of the negative pulse produced at the grid of tube 218 in response to each trigger pulse of line B (Figs. 5a and 5b) from line 253 of station delay 75 and the instant thereafter that this grid input becomes equal to the cut-off value of the tube. Thus each pulse appearing at the cathode of cathode follower 1064 is delayed 463 microseconds after its corresponding input pulse derived from line 253 of station delay 75. These output pulses at the cathode of cathode follower 1064, and whose waveform is shown in line D of Figs. 5a and 5b, are applied to contact B of switch 80 (Fig. 4b) via line 697.

Airborne equipment

In Fig. 7a is shown a block diagram of one embodiment of the airborne apparatus to be carried in each aircraft of the system. All pulses radiated from all ground stations within range of the aircraft are received by antenna 700 and fed to mixer 701. The output of local oscillator 702 is also fed to mixer 701, resulting in each pulse being converted to an intermediate frequency, and thereafter the intermediate frequency pulse is fed to I-F and video amplifier 703. The output of amplifier 703 is fed to timer 704, whose function is to pass only those altitude or information pulses from the nearest ground station intended for the altitude zone in which the aircraft is flying and also to separate and identify the synch pulses from the nearest ground station. Altitude switch 705 provides a bias voltage to timer 704 which is a direct measure of the altitude zone in which the aircraft is flying to aid in the first function above-mentioned. Thus all pulses transmitted from all ground stations within range of the aircraft, including the synch pulses transmitted from each and all the altitude or information pulses transmitted from each and intended for all the various altitude zones, are passed through mixer 701 and I-F and video amplifier 703, but only the synch pulses from the nearest ground station and the altitude pulses from the nearest ground station intended for the altitude zone in which the aircraft is flying pass through timer 704.

The proper altitude or information pulses passed by timer 704 are next conveyed to normal discriminators 706 and to modulator 707. Also, after reception, separation, and identification of the synch pulses, timer 704 actuates indicating lamps in indicator 708 to indicate the pulse width of the synch pulses and thus the type of ground station whose pulses are being received, that is, either A or B. Timer 704 also controls altitude switch 705 to vary the bias voltage output of the latter applied to the former in accordance with the pulse width of the synch pulses received. This variation in bias thus effectively delays, by a time $x$, the period after each synch pulse during which the timer will pass altitude or information pulses, when the aircraft is located in a B block, as discussed above in connection with Fig. 3. The normal discriminators 706 separate the altitude or information pulses passed by timer 704, which are of different widths, and whenever a pulse of a certain width is separated the corresponding relay in local relay circuits 709 will be actuated. At the same time modulator 707 will be actuated to initiate a reply pulse from the aircraft as will be hereinafter described. These reply pulses are of two types, occupancy and response pulses, and either an occupancy or a response pulse will be transmitted under the control of modulator 707 in response to each altitude or information pulse passed by timer 704. That input to modulator 707 derived directly from the output of timer 704 is utilized to control the production of occupancy pulses, and a response pulse may be substituted for any such occupancy pulse under the control of that input line to modulator 707 derived from normal discriminators 706. In addition to forming pulses of the proper width (either occupancy or response), which are then fed to oscillator 711 and thence to output antenna 712, modulator 707 also produces a blanking pulse which is fed to I-F and video amplifier 703 to turn this amplifier off whenever a reply pulse is transmitted from antenna 712 in order to prevent the passage of such reply pulses to timer 704. High voltage source 713 is connected to modulator 707 as indicated to provide the necessary voltage for producing the large input pulse required by oscillator 711. In addition to the A and B indicators provided on indicator 708 as above-described, green, red, and double occupancy lights are provided on the face thereof to indicate respectively freedom of movement to the next block, necessity of holding the position in that particular block, and warning of another aircraft in the same altitude zone in the same block, these lights being controlled by local relay circuits 709.

In Fig. 7b is shown an alternative embodiment of the airborne apparatus of Fig. 7a which includes "look-in" and associated circuits for the purpose of allowing the aircraft operator to investigate traffic conditions in adjacent altitude zones and request clearance to proceed therein, and also includes an entry circuit for the purpose of allowing an aircraft to enter upon an air lane from the side. Similar components of Figs. 7a and 7b which are similarly connected have been identically numbered and will not be discussed. Altitude switch 705' differs from altitude switch 705 in that bias voltages corresponding to several altitude zones are provided for use in timer 704' as will be described hereinafter, the availability of certain of these bias voltages being controlled by local relay circuits 709'. Timer 704' differs from timer 704 of Fig. 7a in that a second output (to "look-in" discriminators 714) is provided, timer 704' passing to discriminators 714 only the altitude pulses for the altitude zone which the aircraft operator desires to "look-in." One output of "look-in" discriminators 714 and the output of normal discriminators 706 and indicator 708' is fed to local relay circuits 709', which in turn control the operation of altitude switch 705' as above-stated, various indicators in indicator 708', the operation of a delay circuit in modulator 707', and the operation of various keying circuits in "look-in" discriminators 714. "Look-in" discriminators 714 may also initiate a pulse output from modulator 707' if such is desired, as for instance, to indicate to the ground station that the aircraft operator wishes to ascend or descend, as the case may be, to the "look-in" altitude zone. Indicator 708' as shown includes in addition to the indicators provided on indicator 708 separate ones for ascent, descent, and entry and corresponding push-buttons for requesting permission to ascend, descend, and enter a given altitude zone. Modulator 707' differs from modulator 707 in that the 100 microsecond delay circuit provided therein is keyed for entry purposes so that each trigger from a keyed amplifier 780 of normal discriminators 706 or "look-in" discriminators 714 is ordinarily delayed by 100 microseconds before being applied to the driver tube of modulator 707'. Because of the fact that each ground station receiver is gated or disabled so that it will not receive reply pulses from aircraft beyond its block boundary, it would be impossible to request entry permission from an aircraft outside a block boundary were such a delay not inserted in the air-borne reply circuit. Whenever an aircraft just outside the block boundary desires to request entry, this can be done by keying or removing the delay circuit for one or more reply pulses in a predetermined fashion, and thus these reply pulses will be received at the ground station receiver during the time it is turned on, assuming of course, that the start of the ground station enabling gate is delayed by 100 microseconds more than the time required for the passage of a pulse from the ground station to the block boundary and back and the delay between reception of a pulse by an aircraft and transmission of a reply pulse as above-described.

In Fig. 8a is shown a block diagram of timer 704 of Fig. 7a. The output pulses from I-F and video amplifier 703, which are positive, are fed to normally-off amplifier 720 and normally-on amplifier 721. Amplifier 720 will produce an output leading to normal discriminators 706 only when it is gated on by means of its screen grid, as will be hereinafter described. The output of normally-on amplifier 721, which is negative, is connected to integrator 722. Each negative pulse at the input of integrator 722 produces at its output a saw-tooth voltage wave whose peak amplitude is a measure of the duration of the negative input pulse. This saw-tooth wave is coupled through cathode follower 723 to the inputs of three biased amplifiers 724, 725 and 726, respectively, each of which is differently biased. Assuming that the A synch pulse width is 14 microseconds and the B synch pulse width is 16 microseconds in this system, and that all other pulses transmitted by the ground station are of lesser width, amplifier 724 might be biased so that it would produce an output only if an input saw-tooth had a peak amplitude corresponding to a pulse of 13.8 or greater microseconds. Similarly, amplifier 725 might be biased so that it would produce an output only for an input saw-tooth whose peak amplitude corresponded to a pulse duration of 15.8 or greater microseconds, and amplifier 726 might be biased so that it would produce an output only for an input saw-tooth whose peak amplitude corresponded to a pulse duration of 16.2 or greater microseconds. Under these conditions, any pulse whose width lay between 13.8 and 15.8 microseconds would be classified as an A synch pulse, and any pulse whose width lay between 15.8 and 16.2 microseconds would be classified as a B synch pulse.

However, in order to prevent loss of signals adjacent block boundaries, where synch pulses from adjacent A and B stations may be received by the aircraft so closely spaced in time that they effectively merge, amplifier 726 actually must be biased so that it will produce an output only for an input saw-tooth whose peak amplitude corresponds to a pulse duration of 32 or greater microseconds. This is because, as pointed out previously, adjacent the block boundary between each A and B station, a B synch pulse may be received by an aircraft immediately after an A synch pulse so that the two appear as a single pulse whose width is equal to the sum of their individual widths. In this system this is to be recognized as a B synch pulse and the changeover of the aircraft relays is to occur at this point. As the aircraft continues on its course towards the next ground station, the synch pulses merge and one crosses through the other, the resultant input pulse appearing at the aircraft thus varying between the sum of the maximum permissible A and B synch pulse widths (15.8 and 16.2 microseconds, respectively) and the width of the B synch pulse alone, if the aircraft is heading toward a B station, or the A synch pulse alone, if the aircraft is heading toward an A station. Thus in this system any pulse whose width is between 15.8 and 32 microseconds will be classified as a B synch pulse and will produce an output from amplifier 725.

Any output from biased amplifier 724 is connected to delay multivibrator 727 to produce a negative voltage gate from the latter, and this negative voltage gate output is connected to differentiating circuits 728, 729, and 730, respectively. The trailing edge of this negative voltage gate when differentiated produces a positive pulse, and the positive pulse so produced by differentiating circuit 730 is connected to the input of multivibrator 731. Multivibrator 731 produces in response thereto a negative voltage gate of approximately 16,000 microseconds duration or, in other words, nearly the spacing between successive synch pulses transmitted from each ground station. This 16,000 microsecond negative gate is applied as a blanking pulse to the screen grid of normally-on amplifier 721 to turn this amplifier off and prevent any subsequent pulses which may be received by the aircraft from triggering on integrator 722 until it is time for another synch pulse to be received from the nearest ground station. Thus, normally-on amplifier 721 initially passes any pulse received by the aircraft and allows it to trigger on integrator 722. If the pulse thus passed is not a synch pulse and hence not greater than 13.8 microseconds in duration, no output is produced by biased amplifier 724 and hence no blanking pulse is applied from multivibrator 731 to turn normally-on amplifier 721 off. However, whenever a pulse greater than 13.8 microseconds, and hence in this system assumedly a synch pulse, is passed by normally-on amplifier 721, an output is produced from biased amplifier 724 which results in a blanking pulse being applied by multivibrator 731 to normally-on amplifier 721 to turn the latter off until it is time for the next synch pulse to be received from the ground station, as above-described.

Each synch pulse produces, in the same fashion, a positive pulse at the output of differentiating circuit 729, and each such positive pulse is connected to gated amplifier 732, which is biased just below cut-off, and hence will be turned on or caused to pass current. Only a synch pulse or a pulse whose duration falls within the synch pulse duration limits, e. g., 13.8–32 microseconds as assumed above, can turn gated amplifier 732 on. If the pulse duration is not equal to at least 13.8 microseconds, no output will be produced from differentiating circuit 729, and if the pulse duration is greater than 32 microseconds, a disabling negative voltage gate of 20 microseconds will simultaneously be applied to the screen grid of amplifier 732, as will be hereinafter described, thereby preventing this amplifier from being turned on even by the application of a positive pulse to its input from differentiating circuit 729. Each synch pulse thus produces a negative pulse delayed after itself by several microseconds at the output of amplifier 732. In this embodiment, this "several" microseconds delay is equal to 13.8 microseconds (introduced by the combination of integrator 722 and biased amplifier 724) plus the duration of the negative voltage gate output of delay multivibrator 727. The negative voltage gate output of delay multivibrator 727 is preferably made about 20 microseconds in duration, and hence this "several" microseconds delay is equal to 33.8 microseconds in this embodiment. This delayed negative pulse is connected to a biased diode 733, to which is also connected a bias voltage obtained from altitude switch 705 that is a direct measure of the altitude zone in which the aircraft is flying. The output of biased diode 733 is connected through cathode follower 734 to altitude phantastron 735 to produce a negative voltage gate ending in a sharp positive spike, the duration of this voltage gate and hence the relative time of occurrence of the positive spike being in turn a direct measure of the altitude at which the aircraft is flying. The output of phantastron 735 is connected to multivibrator 736, and the positive spike at the end of the negative phantastron gate will initiate a positive voltage gate at the output of multivibrator 736 which is then fed to the screen grid of normally-off amplifier 720, as above-described. The particular altitude or information pulse intended for the aircraft zone in which the aircraft is flying thus arrives at the aircraft and at normally-off amplifier 720 simultaneously with or shortly after the application to the screen grid thereof of this positive gate. This particular altitude or information pulse produces a corresponding negative pulse at the output of normally-off amplifier 720, and this is connected to normal discriminators 706, as above-described, and also to differentiating circuit 737. The output of differentiating circuit 737 is applied to the input of inverter-amplifier 738, which is biased just below cut-off. The trailing edge of each negative pulse produced at the output of normally-off amplifier 720 is thus differentiated by differentiating circuit 737 to produce a positive pulse, which when applied to the input of inverter-amplifier 738 produces a negative pulse from the output thereof. This negative output pulse is then coupled through rectifier 739 to the above-mentioned input of multivibrator 736 to turn the output of this multivibrator off. In this manner it is insured that only one pulse at a time will be passed by normally-off amplifier 720. Briefly, then, the action thus far described is as follows: The first synch pulse received produces a positive phantastron output to trigger multivibrator 736 into operation at the proper time corresponding to the altitude zone in which the aircraft is located so that normally-off amplifier 720 will be gated on by means of its screen grid just prior to the scheduled arrival time for the signal pulse for the particular altitude zone. The subsequent proper altitude or information pulse will be passed by amplifier 720 to produce a corresponding negative pulse at the output of inverter-amplifier 738 to turn multivibrator 736 off, hence causing the voltage gate output of the latter to cease and preventing amplifier 720 from passing any further pulses until after another synch pulse is passed by amplifier 721.

Timer 704 may be modified to provide a timer 704', such as is required for the block diagram of Fig. 7b, by including another normally-off amplifier 720, another biased diode 733, another cathode follower 734, another altitude phantastron 735, another multivibrator 736, another differentiating circuit 737, another inverter-amplifier 738, and another rectifier 739, these being similarly connected to control the passage of pulses received from I-F and video amplifier 703 to "look-in" discriminator 714.

The remainder of Fig. 8a includes the pulse width discriminator for separating and identifying synch pulses of A and B widths, part of which has been described above. The output of biased amplifier 725 is connected to delay multivibrator 743, and the output of biased amplifier 726 is connected to delay multivibrator 744. Delay multivibrators 743 and 744 are similar to delay multivibrator 727 except that they produce successively longer negative gate outputs, multivibrator 743 preferably producing a 15 microsecond gate output and multivibrator 744 preferably producing a 20 microsecond gate output. The 20 microsecond negative voltage gate output of multivibrator 744 is coupled through rectifiers 745 and 758 to the screen grids of gated amplifiers 746 and 732, respectively. The output of multivibrator 743 is connected to differentiating circuit 747 and also through rectifier 748 to the screen grid of gated amplifier 749. The output differentiating circuit 728 is connected to the input of gated amplifier 749, and the latter triggers multivibrator 750, whose square wave output is amplified by power amplifier 751 and rectified by bridge rectifier 752 before being fed to A pulse relay 753. The input of amplifier 746 is similarly derived from differentiating circuit 747, and its output is connected to multivibrator 754, whose output in turn is coupled through power amplifier 755 and bridge rectifier 756 to B pulse relay 757. The contacts of pulse relays 753 and 757 (A line and B line, respectively) are connected to control altitude switch 705 and indicator 708, as shown in Fig. 7a. Any pulse applied to integrator 722 whose duration is greater than 13.8 microseconds will trigger delay multivibrator 727, as above-described, to produce a positive pulse at the input of gated amplifier 749. If this input pulse applied to integrator 722 in addition is not greater than 15.8 microseconds in duration, a negative pulse will be produced at the output of amplifier 749 and connected to the input of multivibrator 750 to produce at the output of the latter a positive voltage gate of approximately 8,333 microseconds duration. This positive voltage gate is then amplified by power amplifier 751 and rectified by rectifier 752 to actuate A pulse relay 753. Any pulse applied to integrator 722 greater than 15.8 microseconds duration will produce a similar positive pulse at the input of amplifier 749, but at the same time a negative pulse will be produced at the input of multivibrator 743, which will then produce a negative voltage gate at its output of 25 microseconds duration, and this is coupled through rectifier 738 to the screen grid of gated amplifier 749, thus preventing amplifier 749 from producing a negative output to actuate A pulse relay 753. At the same time, differentiating circuit 747 will produce a positive pulse at its output delayed by 40.8 microseconds after the corresponding input pulse applied to integrator 722, and this being applied to gated amplifier 746 will produce a negative pulse output to trigger multivibrator 754 into operation and actuate B pulse relay 757 unless the input pulse applied to integrator 722 is of greater than 32 microseconds duration. If the input pulse is greater than 32 microseconds long, biased amplifier 726 will produce a negative output which triggers multivibrator 744 to produce at the output of the latter a 20 microsecond negative voltage gate. This negative gate is then coupled through rectifier 758 to the screen grid of amplifier 732, as above-described, and through rectifier 745 to the screen grid of gated amplifier 746 to prevent amplifier 746 from producing a negative pulse at its output, thus preventing multivibrator 754 from being triggered and B pulse relay 757 from being actuated. Thus it is seen that A pulse relay 753 will be closed only in response to a pulse whose duration is within the limits of 13.8 to 15.8 microseconds; that B pulse relay 757 will be closed only by a pulse whose duration is within the limits of 15.8 to 32 microseconds; and that an output will be produced from gated amplifier 732 only by an input pulse whose duration is within the limits of 13.8 to 32 microseconds or, in other words, in this system a synch pulse. These discriminator circuits above-disclosed are more fully described and claimed in the application of Lionel H. Orpin for Pulse Duration Discriminator, filed April 22, 1947, Serial No. 743,149.

In Fig. 8b is shown a detailed block diagram of normal discriminators 706. Each negative pulse passed by timer 704 is coupled to integrator 770, which converts it into a saw-tooth wave whose peak amplitude is a measure of the width of the input pulse. This saw-tooth is coupled through cathode follower 771 to the inputs of five biased amplifiers 772, assuming that pulses of six different widths are to be separated one from the other as above-mentioned. For purposes of illustration assume that the No. 5 or blank pulse is the shortest, being 2.2 microseconds long, that the four "normal" pulses, Nos. 1, 2, 3 and 4 are four, six, eight, and ten microseconds long, respectively, and that the No. 6 or check pulse is the longest, being 12 microseconds long. Amplifier 772 of the top line of the drawing (corresponding to the No. 1 pulse width circuit) is biased such that it will produce an output only for a saw-tooth whose peak amplitude corresponds to an input pulse of greater than 3 microseconds duration. The five successive amplifiers 772, going from top to bottom, are biased to limits of 5 microseconds, 7 microseconds, 9 microseconds, and 11 microseconds, respectively. The output of each biased amplifier 772 is connected to its corresponding delay multivibrator 773, and each successive delay multivibrator 773, going from the top of the drawing to the bottom, is arranged to produce a slightly longer output gate than the preceding multivibrator for disabling purposes as will be explained hereinafter. The output of each delay multivibrator 773 is connected through its corresponding differentiating circuit 774 to its corresponding gated or double input amplifier 775, and in addition the output of each delay multivibrator 773 except that of the top line is connected to the input of the gated amplifier 775 of the line above. The output of each gated amplifier 775 is connected to its corresponding 60 cycle multivibrator 776, whose output is then coupled through its power amplifier 777 and bridge rectifier 778 to actuate its corresponding relay. In addition, the output of each gated amplifier 775 except that of the bottom line is coupled through its corresponding pulse transformer 779 to its keyed amplifier 780, whose operation is controlled by its corresponding relay (782, 783, 784, or 785) in order to insure that no keyed output results unless the corresponding relay is already energized. The output of each keyed amplifier 780 is connected to modulator 707 to control the latter to produce response pulses to each No. 1, 2, 3, and 4 pulse in a manner which will be described more in detail hereinafter. The output of each relay is connected to control local relay circuits 709. The relay of the first line, corresponding to the No. 1 pulse, is 782; that of the second line, the No. 2 relay, is 783; the No. 3 relay is 784; the No. 4 relay is 785; and the No. 6 relay is 786. Each relay is "slugged" to provide an approximately one-half second delayed pick-up and a drop-out delay of the relay armature of approximately 3 to 7 seconds.

The operation of this discriminator briefly is as follows: Assuming that a 4 microsecond pulse has been received from the ground station by the airborne apparatus at a time corresponding to the altitude zone in which the aircraft is located, this 4 microsecond pulse would have then been passed by timer 704 to integrator 770 to produce a saw-tooth voltage of commensurate amplitude at the input of each biased amplifier 772. Only the amplifier 772 of the top line of the drawing, however, would produce an output because of the successively greater bias on the successive amplifiers 772, and its output, which is negative, would trigger its delay multivibrator 773 to produce a negative voltage gate at its output. The trailing edge of this negative gate is differentiated by differentiating circuit 774 to produce a delayed positive pulse which is then applied through gated amplifier 775 to trigger 60 cycle multivibrator 776 into operation. The 60 cycle square wave output of multivibrator 776 is amplified by power amplifier 777 and rectified by rectifier 778 to actuate No. 1 relay 782, indicating the reception of a No. 1 pulse at the aircraft from the ground station. The same negative pulse from gated amplifier 775 of the first line that initiated the closing of No. 1 relay 782 would also be connected through the pulse transformer 779 corresponding to the first line to its keyed amplifier 780. If this amplifier 780 is already keyed on by No. 1 relay 782 because this relay has been actuated by a previous No. 1 pulse (this relay will remain energized for from 3 to 7 seconds after it is actuated because it is "slugged" as described above), an output would result to modulator 707 to initiate a response pulse from oscillator 711 of the aircraft back to the ground station in a manner which will be described more in detail hereinafter. If, on the other hand, a No. 1 pulse has not been received within the previous approximately 7 seconds, so that the No. 1 relay 782 is not already energized, no output results from amplifier 780 to produce a response pulse from oscillator 711, and instead an occupancy pulse is transmitted from oscillator 711 in a manner to be described more in detail hereinafter. Note particularly that a single output from gated amplifier 775 resulting from a single No. 1 pulse cannot actuate No. 1 relay 782 in time to key amplifier 780 on to produce an output from the latter in response to the output from gated amplifier 775 because the No. 1 relay 782 is "slugged" as above-described. Similarly, if a 6 microsecond pulse were received from the ground station, a delayed positive output would be produced from differentiating circuit 774 of the top line and also from the differentiating circuit 774 of the next lower or second line. Since the output of the delay multivibrator 773 of the second line, which is a negative gate, is also coupled to the input of the gated amplifier 775 of the top line, however, the delayed positive pulse applied to this top line amplifier 775 would produce no output and the No. 1 relay 782 would not be actuated. However, there would be a resultant output from the gated amplifier 775 of the second line, and this in a similar manner to that described above would result in the actuation of the No. 2 relay 783. The same negative pulse from gated amplifier 775 of the second line that initiated the actuation of No. 2 relay 783 would also be connected through the pulse transformer 779 corresponding to the second line to its keyed amplifier 780. If this amplifier 780 of the second line is keyed on by virtue of No. 2 relay 783 having been energized by a previous No. 2 pulse, an output would result to modulator 707 to initiate a response pulse from oscillator 711 in a similar manner to that above-described with respect to No. 1 pulses. If, on the other hand, the No. 2 relay is not already energized, no output would result from amplifier 780 to produce a response pulse from oscillator 711, and an occupancy pulse will be transmitted from oscillator 711 in a manner to be described more in detail hereinafter in connection with Fig. 9g.

The operation of the next three circuits is similar to that of the second line, successively longer pulses of approximately seven, nine and eleven microseconds being required to actuate the successive amplifiers 772 as above-described. The biased amplifier 772 of the lowest line has been assumed to correspond to the No. 6 or check pulse, thus not requiring any control of modulator 707 to produce response pulses instead of occupancy pulses, and hence the output of gated amplifier 775 of the bottom line is utilized merely to trigger on its corresponding 60-cycle multivibrator 776.

Thus it is seen that because of the disabling function of each successive discriminator, only one discriminator at a time can operate, insuring reliable operation, and that in this embodiment each of the Nos. 1, 2, 3, 4 and 6 relay circuits control the local relay circuits 709, while only the Nos. 1, 2, 3 and 4 discriminator circuits can initiate a response pulse from the aircraft. It will also be noted that pulses of six different widths are separated from one another by the above-described circuitry through the use of only five biased amplifiers 772. This is accomplished by having the biased amplifier of the first or top line biased to respond to saw-tooths whose peak amplitude corresponds to an input pulse of greater than three microseconds duration, which is greater than the pulse duration of the shortest pulse to be sepaarted, e. g., 2.2 microseconds. In the present embodiment, no control of modulator 707 or of local relay circuits 709 is required by the blank pulses, which as above-described are the shortest and of 2.2 microseconds duration. Hence no channel, starting with a biased amplifier 772 and ending with a corresponding relay, is necessary for the No. 5 or blank pulses. These No. 5 or blank pulses do, however, appear at the output of integrator 770 and cathode follower 771, as well as at the output of timer 704, and any No. 5 or blank pulses appearing at the output of timer 704 are connected to modulator 707 to produce an occupancy pulse in reply thereto from oscillator 711 of the aircraft back to the ground station. It is, of course, obvious that if for any reason actuation of modulator 707 or of local relay circuit 709 or of any other component of the airborne equipment is desired by means of the No. 5 or blank pulses, an additional biased amplifier 772 and the subsequent channel ending with a relay corresponding with the No. 5 pulses can, of course, be provided and connected in a manner similar to that shown for the other pulse widths. Similarly, if actuation of modulator 707 by the No. 6 or check pulses is desired for any reason, an additional pulse transformer 779 and keyed amplifier 780, keyed by No. 6 relay 786, may be provided and connected in a manner similar to that shown for the other pulse widths. These discriminator circuits above-disclosed are described more fully and claimed in the application of Lionel H. Orpin for Pulse Duration Discriminators, Serial No. 743,149, filed April 22, 1947.

In Fig. 8c is shown a detailed block diagram of "look-in" discriminators 714, whose circuit components are similar to those of normal discriminators 706. Similar circuit components have been similarly numbered in Figs. 8b and 8c. "Look-in" discriminators 714 comprise four circuits adjusted respectively to pass the Nos. 1, 2, 3, and 4 pulses transmitted from the ground station. The No. 1 and No. 3 pulse circuits include a keying amplifier 780 whose output is delivered to modulator 707' and whose operation is controlled from the ascent and descent circuits respectively of local relay circiuts 709'. As is shown in the circuit diagram, each of the Nos. 1, 2, 3 and 4 pulse circuits control the local relay circuits 709'.

In Figs. 9a, 9c and 9d are shown in detail circuit diagrams of those circuit components illustrated in block diagram form in Figs. 8a, 8b and 8c. In Fig. 9a is shown the timer circuit portion of timer 704, which includes roughly the upper half of Fig. 8a, and altitude switch 705. Integrator 722, cathode follower 723, biased amplifier 724, and multivibrator 727 are shown here only in block diagram form since the first two are shown in complete detail in Fig. 9c, and the latter two are similar to biased amplifier 725 and multivibrator 743, which are also shown in complete detail in Fig. 9c. Since the connections between circuit components and their operation have been above-described in connection with Fig. 8a, no detailed description will be given except for altitude switch 705. As shown, it comprises a step-by-step potentiometer 850 whose end terminals are connected through A relay contacts 891a, B relay contacts 861b and 861c, and B relay contacts 861a, respectively, to a regulated positive voltage source and ground, respectively, each step of the potentiometer corresponding to one altitude zone. Slider 851 of potentiometer 850 is electrically connected through a resistor to the cathode of biased diode 733 and is mechanically connected to the shaft of an altimeter 852. Thus the voltage at slider 851 is a direct measure of the altitude zone in which the aircraft is located. The connections to ground and to the regulated positive voltage source from the end terminals of potentiometer 850 are made through the above-described relay contacts under control of the A and B relays 753 and 757, respectively, in order to insert the additional 463 microsecond delay required by the system of the present embodiment when the aircraft is within the block boundaries of a B station. This is accomplished by connecting one resistance across the contacts 861a of B relay 757 and another equal resistance across its contacts 861b, and by disposing contacts 861a and 861b so that contacts 861a effectively short their resistor when B relay 757 is not energized and contacts 861b at the same time are open so that their resistor is inserted in the supply lead leading to the regulated positive voltage source. This is the position of the relay contacts shown, with A relay 753 energized, and B relay 757 de-energized, because aircraft 26 is in an A block (Fig. 1a). When the B relay 757 is energized and A relay 753 is de-energized, which occurs when the aircraft is within the block boundaries determined by a B station, contacts 861a are opened and contacts 861b closed, so that the previous resistance inserted in the positive line is removed and an equal resistance inserted in the line leading to ground. The values of resistance shunting contacts 861a and 861b are equal as mentioned above and have an ohmic value sufficient to shift the phantastron delay by 463 microseconds as necessary in the present system. Contacts 861a, controlled by A relay 753, and contacts 861c, controlled by B relay 757, have both front and back contacts, which are cross-connected as shown, and the armatures of these contacts are connected in the manner illustrated to insure that the supply lead from the regulated positive voltage source to the high-voltage terminal of potentiometer 850 will be interrupted or opened if A and B relays 753 and 757 are both either energized or de-energized. This provides a safety or checking feature of the system in that no altitude or information pulses will be received by the aircraft if such a derangement of the equipment occurs and both the A and B relays are simultaneously energized or de-energized.

Timer 704' as above-described differs from timer 704 in that an additional biased diode 733, cathode follower 734, altitude phantastron 735, multivibrator 736, amplifier 720, differentiating circuit 737, inverter-amplifier 738, and rectifier 739 are provided and similarly connected, the plate of the second amplifier 720, however, being connected to "look-in" discriminators 714 and the cathode of the second biased diode 733 being connected to altitude switch 705' as shown in Fig. 9b.

In Fig. 9b is illustrated the detailed circuit diagram of altitude switch 705'. Altitude switch 705' differs from switch 705 in that additional slider arms are provided on potentiometer 850'. For instance, assuming it is desired to "look in" the altitude zone above and below the altitude zone in which the aircraft is located, two additional sliders 853 and 854 are required on potentiometer 850', one on either side of slider 851, all three sliders being electrically insulated one from the other but all three being mechanically connected to the shaft of altimeter 852. These two additional sliders 853 and 854 are then electrically connected by means of remote controlled relays 855 and 856 to the cathode of the second biased diode 733 of timer 704' in such a way that the second altitude phantastron 735 will turn on the second amplifier 720 at the proper time to receive the altitude or information pulses intended for the altitude zone above or below the normal altitude zone in which the aircraft is located as desired. As shown, relay 855 is energized by the descent circuits of block 709' and relay 856 is energized by the ascent circuits of block 709'. When relay 855 is energized and relay 856 is de-energized, slider 853, corresponding to the altitude below the normal altitude zone, is connected to the cathode of the second biased diode 733 of timer circuit 704' through relay contacts 857 and 858, and when relay 856 is energized and relay 855 is de-energized, slider 854, corresponding to the altitude zone above the normal altitude zone, is connected to the cathode of the second biased diode 733 of timer 704' through relay contacts 859 and 860. As in timer 705, slider 851 is directly connected to the cathode of the first biased diode 733.

Fig. 9c shows in detail a typical timer discriminator circuit, the one for separating the B synch pulses shown in block diagram form in the lower half of Fig. 8a. The A synch pulse timer discriminator circuit is similar. Again, since the connections between its components and its operation have already been discussed, it will not be taken up here in detail except as regards the operation of B pulse relay 757. When B synch pulses are being received by the aircraft, relay 757 is energized as shown and the control circuit leading to indicator 708 is completed to the indicator lamp voltage source through contact 861. At the same time, the control circuit leading to altitude switch 705 is modified through contacts 861a–861c as above-described.

In Fig. 9d is shown part of a typical normal discriminator circuit, the one that controls the No. 1 relay shown in block diagram form in Fig. 8b. Since integrator 770, cathode follower 771, biased amplifier 772, and delay multivibrator 773 are similar to integrator 722, cathode follower 723, biased amplifier 725, and multivibrator 743 of Fig. 9c, these have not been shown in detail here, Fig. 9d starting with the output from the No. 1 circuit multivibrator 773. Amplifier 775 is similar to amplifier 746 of Fig. 9c except that the disabling or blanking pulse from the successive discriminator is applied to its control grid through rectifier 842 whereas the disabling or blanking voltage for amplifier 746 is applied to its screen grid, the result being the same in either case. Relay 863, controlled by No. 1 relay 782, is shown connected in the control grid bias circuit of keyed amplifier 780. When relay 863 is de-energized, its armature is connected to the upper contact 864 as shown, resulting in a large negative bias being applied to the control grid of amplifier 780 and thus preventing the amplifier 780 from producing an output. When a No. 1 pulse has been received by the air-borne equipment and passed through normal discriminators 706, the No. 1 relay 782 is energized, which then results in relay 863 being energized through contact 865. When relay 863 is energized, its armature is grounded through the lower contact 866, thus reducing the bias upon amplifier 780 and allowing this tube to amplify subsequent No. 1 pulses received at its grid from pulse transformer 779. These amplified pulses are then coupled through rectifier 867 to modulator 707 to produce response pulses from the aircraft. Since the other connections between the components of this discriminator circuit and its operation have been above-described, it will not be discussed further in detail. This same discriminator circuit is used in "look-in" discriminators 714, the only difference being that relay 863 controlling the bias of keyed amplifier 780 is there controlled by the ascent or descent circuit of block 709' as indicated in Fig. 8c rather than by the corresponding No. 1, 2, 3 or 4 pulse relay circuits as indicated in Fig. 9d for normal discriminators 706.

Figure 9E:
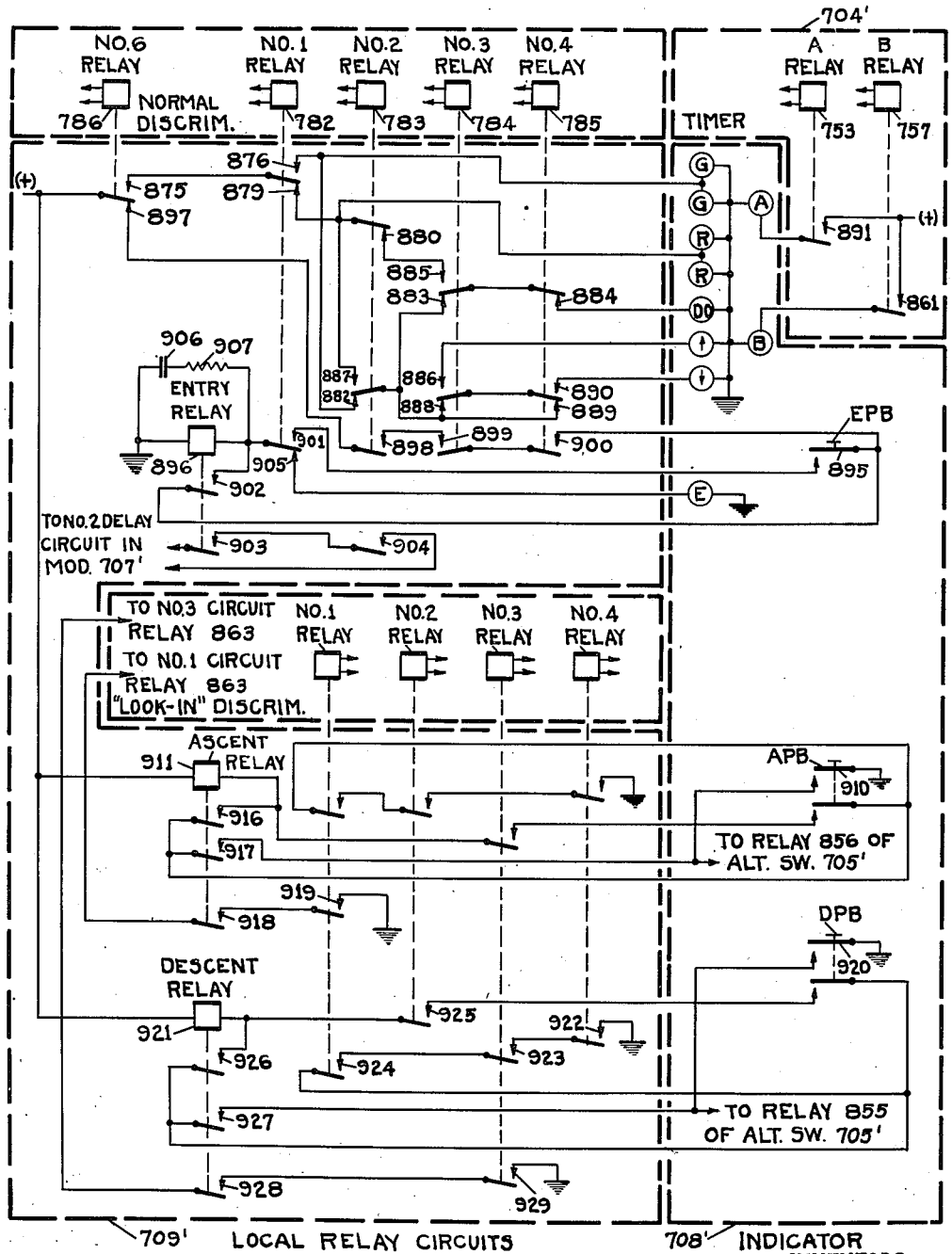

In Fig. 9e are shown the detailed components of local relay circuits 709' and their inter-relation with the components of normal discriminators 706, "look-in" discriminators 714, timer 704', and indicator 708'. Assuming the same codes as those shown in Fig. 6i, the green lights of indicator 708', represented by the circles with a G inscribed therein, will be lighted whenever a No. 1 pulse is received by the airborne equipment and this reception is checked with the ground station, since the No. 6 or check relay 786 and No. 1 relay 782 then will be energized, the source of potential then being connected to the green lights through relay contacts 875 and 876. Similarly, when a No. 1 pulse is not being received by the aircraft and this non-reception has been checked with the ground station, the red lights (similarly represented as above) will be lighted through contacts 875 and 879 as shown. Also with the assumed codes supra, in case of double occupancy following a green or cruising signal, the double occupancy light will be lighted through contacts 875, 876, 882, 883, and 884, and if following a red or hold signal, through contacts 875, 879, 880, 895, and 884. The ascent light, represented by the circle with an arrow pointing upward inscribed therein, will be lighted through contacts 875, 876, 882, 889, and 886 if permission or an order to ascend is specified by the ground station following a green or cruising signal, and through contacts 875, 879, 887, 889, and 886 if following a red or hold signal. Similarly, the descent light, represented by a circle with an arrow pointing downward inscribed therein, will be lighted through contacts 875, 876, 882, 888, and 890 if permission or an order to descend is specified by the ground station following a green or cruising signal, and through contacts 875, 879, 887, 888, and 890 if following a red or hold signal. The A pulse light indicating the reception of A synch pulses by the aircraft is lighted through contact 891 whenever A relay 753 of timer 704′ is energized, and the B light is similarly lighted through contact 861 whenever B relay 757 is energized. If an aircraft desires to enter a block of the air lane from the side, the operator must close entry push-button 895 (marked EPB in Fig. 9c) of indicator 708′. If the altitude zone which the aircraft desires to enter is clear, as indicated by Nos. 1, 2, 3 and 4 pulses being sent and no No. 6 pulse being sent to that altitude zone, entry relay 896 will be energized through contacts 897, 898, 899, 900, and 901 and entry push-button 895. Once entry relay 896 is energized it is no longer necessary to hold down entry push-button 895 since it is by-passed by a "stick" circuit through contact 902. This "stick" circuit also by-passes contact 901 associated with the No. 1 relay 782 since permission to enter, if granted by the ground station, will be manifested to the aircraft by a change in the ground station code consisting of the ground station thereafter ceasing to transmit the No. 1 pulse. When entry relay 896 is energized, the control circuit to the No. 2 pulse delay circuit in modulator 707′ is completed through contacts 903 and 904, resulting in the 100 microsecond delay being removed from the No. 2 pulse reply circuit of modulator 707′ thus manifesting a desire for entry into the particular altitude zone by the aircraft to the ground station. If this is permitted by the ground station, it will be acknowledged in the ground station pulse code by a change to omit the sending of the No. 1 pulse as above-described, which then energizes the entry light (represented by a circle with an E inscribed therein) through contact 905, indicating to the aircraft operator permission to enter at that particular altitude zone into that block of the air lane. Condenser 906 and resistor 907 are connected in series across the coil of relay 896 in order to make it of the slow release type so that the entry circuit will not be disabled in case of momentary failures to continue the checking of the code received with the ground station. It will be noted that closing entry push-button 895 cannot energize entry relay 896 and thus request permission to enter within the block boundaries by closing the circuit through contacts 903 and 904 unless the altitude zone within the block corresponding to the altitude at which the aircraft is flying is unoccupied. Ascent and descent requests by an aircraft are controlled through the pulse relays of "look-in" discriminators 714. In case an aircraft flying in a particular altitude zone of a block desires to ascend, the operator must close ascent push-button 910 which completes the circuit of relay 856 of altitude switch 705′ to ground as shown, thus connecting the discriminator circuits of block 714 to receive the altitude or information pulses intended for the altitude zone above that in which the aircraft is located as above-described in connection with Fig. 9b. If the zone above is unoccupied, its Nos. 1, 2, 3 and 4 pulses will be received by "look-in" discriminators 714 and relays 782, 783, 784 and 785 will be energized, and therefore ascent relay 911 will be energized through contacts 912, 913, 914 and 915, and the lower contact of ascent push-button 910. Thereafter, since ascent relay 911 is energized, ascent push-button 910 need no longer be held closed since its lower contact is by-passed by a "stick" circuit through contact 916 and its upper contact is now also grounded through contacts 912, 913, and 914 and contact 917 of a second "stick" circuit. The "stick" circuit through contact 916 also by-passes contact 915, since once permission is granted to an aircraft to ascend to the altitude zone above, the ground station ceases to send the No. 3 pulse to that zone in order that other aircraft may not thereafter request entry into that zone. Ascent relay 911 when energized will complete the ascent control circuit through contacts 918 and 919, and this ascent control circuit is connected to the No. 1 circuit relay 863 in "look-in" discriminators 714 where it turns on the No. 1 pulse circuit keyed amplifier 780 (Fig. 8c) to allow it to trigger modulator 707′ into operation to manifest to the ground station a desire for entry into the altitude zone above. When the reply pulse from the aircraft corresponding to the No. 1 pulse of the altitude zone above is received at the ground station, the request for ascent if permitted is acknowledged by the ground station thereafter ceasing to send the No. 3 pulse to the altitude zone above and changing the code sent to the altitude zone in which the aircraft is located to light the ascent light as above-described. Requests for descent to the altitude zone below that in which the aircraft is located are controlled in a similar fashion, the closing of descent push-button 920 completing the circuit of relay 855 of altitude switch 705′ to ground as shown, thus connecting the discriminator circuits of block 714 to receive the altitude or information pulses intended for the altitude zone below that in which the aircraft is located as above-described in connection with Fig. 9b. If the altitude zone below is unoccupied, its Nos. 1, 2, 3, and 4 pulses will be received by "look-in" discriminators 714 and relays 782, 783, 784 and 785 will be energized as before for ascent, and therefore descent relay 921 will be energized through contacts 922, 923, 924, and 925 and the lower contact of descent push-button 920. The lower contact of descent push-button 920 and relay contact 925 are by-passed by a "stick" circuit through descent relay contact 926, the lower contact being by-passed in order that the descent relay will remain energized without requiring the descent push-button to be closed continuously and contact 925 being by-passed since the No. 2 pulse to the altitude zone below is no longer sent from the ground station when permission to the aircraft is granted to descend in order that other aircraft may not thereafter request entry into that particular altitude zone in that block. Similarly, a second "stick" circuit through descent relay contact 927 is provided as shown so that descent push-button 920 need no longer be depressed in order to complete the circuit to relay 855 once descent relay 921 is energized, since then the circuit from relay 855 to ground is completed through contacts 922, 923, 924, and 927. The descent control circuit is closed through contacts 928 and 929 and is connected to the No. 3 circuit relay 863 of "look-in" discriminators 714, the operation of this control circuit being similar to that of the ascent control circuit above-described. Thus it is seen that lights are provided in indicator 708' to show in which type of block, that is, either A or B, the aircraft is located; that green or cruising and red or hold signals are provided for the particular altitude zone in which the aircraft is located within the block and that the green and red lights cannot be on or lighted simultaneously; that lights indicating double occupancy, permission or an order to ascend, and permission or an order to descend are provided and can be lighted simultaneously with either the green or red lights; than an entry-push-button is provided to request permission to enter within a block from the side and this permission if granted will light an entry light provided in indicator 708'; that ascent and descent push-buttons are provided for the purpose of requesting permission to ascend or descend into the next altitude zone from the altitude zone in which the aircraft is located in a particular block, and that this permission if granted will result in the lighting of the corresponding ascent or descent light, whichever is requested as above-described; and that once an aircraft has been granted permission to enter, ascend, or descend into an unoccupied altitude zone of a particular block, the clear signal code sent to that altitude zone is thereafter changed in order to prevent other aircraft from requesting entrance into that block. It will be noted that only entry into an air lane block from the side is governed by the entry circuit above-described. In case an aircraft desired to take off from an airport within the limits of a block boundary, the procedure would be to turn on its airborne equipment when ready for taking off, which would then express its occupancy in zone O, and thereafter request permission to ascend to the next altitude zone by pushing ascent push-button 910, continuing this procedure from altitude zone to altitude zone until the aircraft reaches the desired altitude.

In Fig. 9f are shown the detailed components of local relay circuits 709 and their inter-relation with the components of normal discriminators 706, timer 704, and indicator 708. The relaying circuits of local relay circuits 709 are all included in local relay circuits 709' and are similarly numbered, and their operation and inter-connections having been described above, they will not be discussed further here.

Figure 9G:
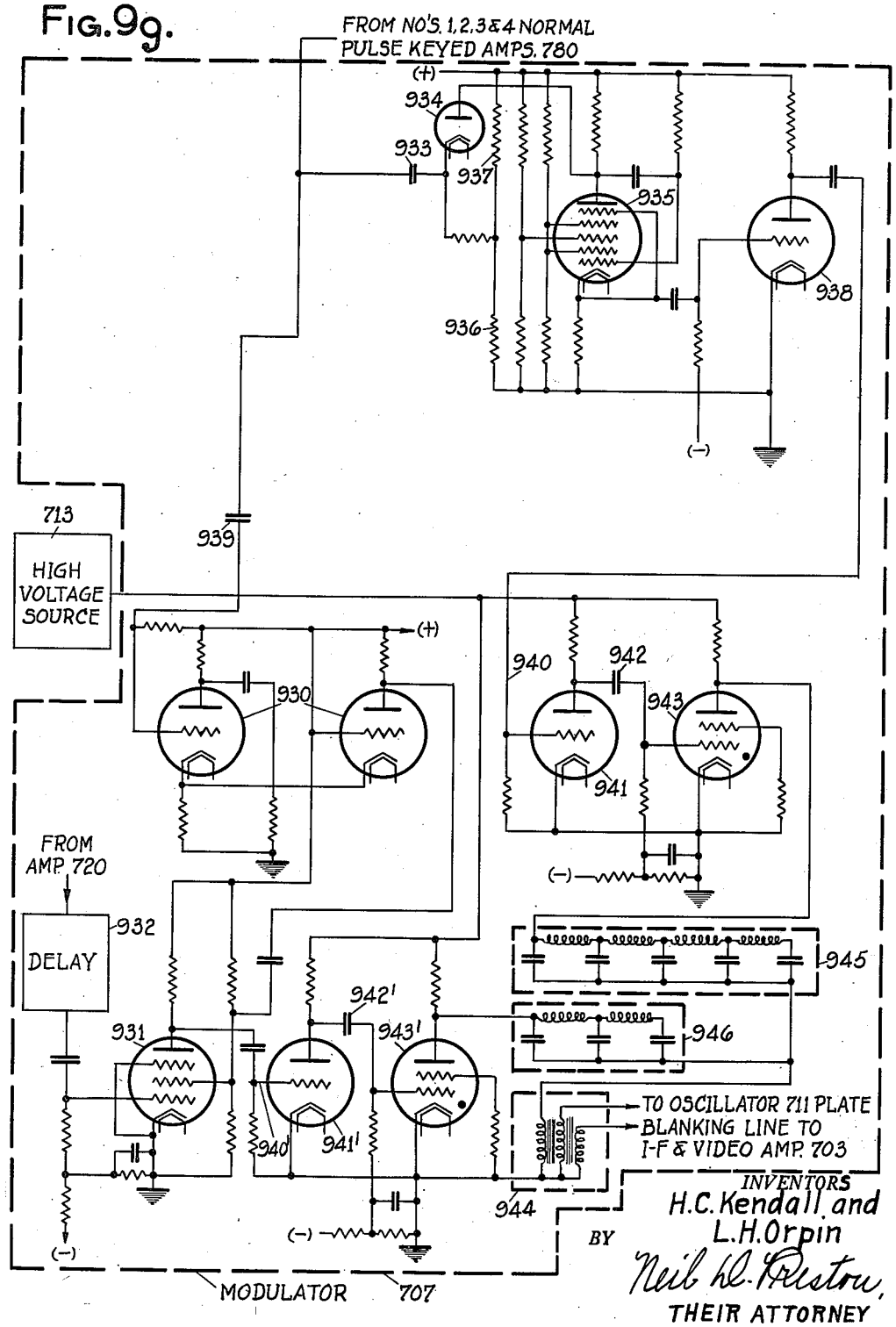

In Fig. 9g are shown the detailed circuits of modulator 707. The output of each keyed amplifier 780 of normal discriminators 706 is connected through a 100 micro-second delay circuit before being applied via trigger input line 940 to the grid of inverter-amplifier tube 941. The output of tube 941 is applied to gas-type switch tube 943, which when fired discharges pulse-forming network 945 to produce in the primary of pulse transformer 944 a 5 microsecond or response pulse. A similar pulse is induced in the first secondary of pulse transformer 944 and is coupled to the plate of oscillator 711, and a similar smaller pulse is induced in a second secondary of pulse transformer 944 and coupled via a "blanking" line to I-F and video amplifier 703 for disabling purposes as above-mentioned.

The output of each keyed amplifier 780 of normal discriminators 706 is also connected through a disabling gate generator circuit 930, whose negative gate output of 200 microseconds duration is applied to the screen grid of gated amplifier 931. Gated amplifier 931 is biased to be normally on in the absence of a negative gate output from gate generator 930. The output from amplifier 720 of timer 707, which consists of all (e. g., Nos. 1, 2, 3, 4, 5, and 6) pulses intended for the altitude zone in which the aircraft is flying are applied through a second 100 microsecond delay circuit 932 to the control grid of gated amplifier 931. The output of gated amplifier 931 is applied to trigger input line 940' leading to the grid of inverter-amplifier tube 941'. The output of tube 941' controls a second gas-type switch tube 943', and when this latter tube fires, it discharges pulse-forming network 946 to produce a 2 microsecond or occupancy pulse in the primary of pulse transformer 944.

The 100 microsecond delay circuit inserted ahead of trigger input line 940 includes a clamping diode 934, a phantastron 935, and a trigger amplifier tube 938. Delay circuit 932 is similar. More specifically, the outputs from the keyed amplifiers 780 corresponding to the Nos. 1, 2, 3, and 4 pulse normal discriminators 706 are connected through condenser 933 to the cathode of clamping diode 934. The plate of diode 934 is connected to the plate of phantastron 935, and the cathode voltage of diode 934, which is determined by the relative values of resistors 936 and 937, in turn determines the positive potential at which the plate voltage of phantastron 935 is "clamped" or held fixed. In this embodiment, as above-stated, it will be assumed that the relative values of resistors 936 and 937 are chosen such that phantastron 935 produces a 100 microsecond delay. The operation of phantastron 935 is similar to that of phantastron 735 discussed in connection with Figs. 8a and 9a, and the output at its cathode in response to each input pulse applied through diode 934 consists of a negative gate ending in a positive pip. The start of each gate coincides with the actuating negative pulse applied through condenser 933 to the cathode of diode 934, and the positive pip is delayed by the predetermined chosen time, in this case 100 microseconds. This positive pip is amplified and inverted by trigger amplifier tube 938 and is then connected to trigger input line 940 of inverter-amplifier tube 941. The plate of tube 941 is coupled through condenser 942 to the control grid of gas-type switch tube 943, high-voltage source 713 supplying the plate potential for both tubes 941 and 943. The cathode of gas tube 943 is grounded and its plate is connected to one terminal of pulse-forming network 945. The other terminal of pulse-forming network 945 is connected to the corresponding terminal of pulse-forming network 946, and to ground through the primary of output pulse transformer 944. Pulse-forming networks 945 and 946 are the response and occupancy pulse-forming networks respectively. The same input that is applied through condenser 933 to the 100 microsecond delay circuit is also coupled through condenser 939 to disabling gate generator 930. As shown, gate generator 930 may be a multivibrator similar to multivibrator 743 of Fig. 9c, and the circuit parameters of this multivibrator 930 are adjusted to produce a negative gate output of approximately 200 microseconds duration. As above-described, this is applied to the screen grid of gated amplifier 931.

The operation of modulator 707 is as follows. Each No. 1, 2, 3, 4, 5 and 6 pulse intended for the particular altitude zone in which the aircraft is flying, and hence passed by timer 707, triggers delay circuit 932 to produce at the control grid of gated amplifier 931 a corresponding pulse delayed 100 microseconds thereafter. If the pulse is a No. 1, 2, 3 or 4 pulse, it will also produce a subsequent output from the corresponding normal pulse keyed amplifier 780 of normal discriminators 706, providing the corresponding No. 1, 2, 3, or 4 pulse relay is already energized. If the corresponding No. 1, 2, 3 or 4 pulse relay is already energized, the corresponding output from the corresponding keyed amplifier 780 is applied simultaneously to the delay circuit preceding trigger input line 940 and to disabling gate generator 930. The resultant 200 microsecond disabling negative gate applied to gated amplifier 931 turns the latter off and prevents the subsequent pulse delayed by 100 microseconds applied to its control grid from delay circuit 932 from firing switch tube 943'. The resultant pulse delayed by 100 microseconds which is applied to inverter-amplifier tube 941 from trigger input line 940 causes gas tube 943 to fire. This discharges pulse-forming network 945 to produce a response pulse in the primary of pulse transformer 944 and hence a corresponding 5 microsecond or response pulse from oscillator 711 (Fig. 7a).

If, on the other hand, as above-described, the No. 1, 2, 3 or 4 pulse passed by timer 707 was the first such pulse received in the last approximately 7 seconds, the corresponding No. 1, 2, 3 or 4 pulse relay would be de-energized and no corresponding pulse would be passed by the corresponding keyed amplifier 780. Therefore, gated amplifier 931 would remain on and the pulse corresponding to the No. 1, 2, 3 or 4 pulse but delayed 100 microseconds thereafter by delay circuit 932 when applied to the control grid of gated amplifier 931 would produce a corresponding output at its plate. This output when inverted and amplified would cause switch tube 943 to fire, thus discharging pulse-forming network 946 and producing an occupancy or 2 microsecond pulse in the primary of pulse-forming network 944. This occupancy pulse applied to the primary of pulse-forming network 944, of course, produces a corresponding 2 microsecond occupancy pulse from oscillator 711 (Fig. 7a). Corresponding occupancy pulses are also produced by each No. 5 or No. 6 pulse passed by timer 707 but delayed 100 microseconds thereafter by delay circuit 932, inasmuch as disabling gate generator 930 can be actuated only by No. 1, 2, 3 or 4 pulse.

Thus the pulses emitted by the airborne transmitter will be of two kinds: response pulses, of width 5 microseconds; and occupancy pulses, of width 2 microseconds. When a normal (No. 1, 2, 3 or 4) pulse is received and the relay which the normal pulse is intended to energize is already energized, the airborne equipment will emit a response pulse. If the particular normal pulse relay is not already energized or if the pulse received is a blank (No. 5) or check (No. 6) pulse, the airborne equipment will reply with occupancy pulses.

While the delay inserted by phantastron 935 and the similar delay circuit 932 has been assumed in the present embodiment to be 100 microseconds, for reasons which will be apparent from the ensuing discussion with respect to modulator 707', if no provisions for entry, as discussed hereinafter, are to be provided, this delay may be made quite short. More specifically, this delay need be merely sufficient to insure that a single No. 1, 2, 3 or 4 pulse output from timer 707 will have sufficient time to disable gated amplifier 931 if the corresponding No. 1, 2, 3 or 4 pulse relay is already energized before the corresponding delayed pulse from delay circuit 932 is applied to the control grid of gated amplifier 931. The delay times of phantastron 935 and delay circuit 932 are, of course, made the same, or at least approximately so, in order that reply pulses from an aircraft, whether occupancy or response, will, for any one position of the aircraft relative to the ground station, be received at the ground station at equal times after the corresponding preceding altitude pulse is transmitted by the ground station.

In Fig. 9h is shown the detailed circuit of modulator 707'. Briefly, it adds to the circuit of modulator 707 a separate switch circuit for the No. 2 normal pulse, this switch circuit being under control of an entry relay for the purpose of allowing entry requests to be communicated to a ground station from an aircraft without the block boundary as above-discussed. When entry is not being requested, any output from the No. 2 normal pulse keyed amplifier 780 of normal discriminators 706 is connected through a first tube of the switch circuit to the 100 microsecond delay circuit including phantastron 935 and is thus delayed for 100 microseconds before application to input trigger line 940 in the same manner that the Nos. 1, 3 and 4 pulses are delayed. When an aircraft without the block boundary wishes to request entry, energization of the entry relay then switches the output from the No. 2 normal pulse keyed amplifier 780 through a second tube of the switch circuit directly to the input trigger line 940 so that the 100 microsecond delay is removed and the aircraft thus projects its position approximately 10 miles (100 microseconds ÷10+ microseconds per mile) nearer to the station.

The outputs from the keyed amplifiers 780 corresponding to the Nos. 1 and 3 pulse "look-in" discriminators 714 and the Nos. 1, 3 and 4 pulse normal discriminators 706 are now connected through condenser 933 to the cathode of clamping diode 934. The output from the keyed amplifier 780 corresponding to the No. 2 pulse normal discriminator 706 is connected to the primary of pulse transformer 966. The secondary of this transformer is connected to the control grids of switch tubes 967 and 968 through condensers 969 and 970, respectively. The plate of switch tube 967 is connected to trigger input line 940 through condenser 971, and the plate of switch tube 968 is connected through condenser 933 to the cathode of diode 934. The grid bias circuit of tube 967 is connected to lower contact 972 of entry relay 973, and the grid bias circuit of tube 968 is similarly connected to upper contact 974. Entry relay 973 is connected to the entry control circuit of local relay circuit 709' (Fig. 9e) and hence the operation of switch tubes 967 and 968 is controlled by the entry circuit. When the aircraft operator desires to request entry from a position off the airway, entry relay 973 is energized in the manner above-described, which results in the bias of switch tube 967 being reduced inasmuch as lower contact 972 is then returned to ground through resistor 975. Similarly, when entry is not being requested, the bias on tube 968 is reduced through upper contact 964, it being assumed that the negative potential applied to tubes 967 and 968 is great enough to bias them beyond cut-off in the absence of a connection to ground through resistor 975. Thus when switch tube 967 has its bias reduced, each input negative pulse from the No. 2 normal pulse keyed amplifier 780 is coupled directly to trigger input 940 through switch tube 967 with no delay, whereas when the bias on tube 968 is reduced instead, the input pulse is coupled through switch tube 968 and phantastron 935, introducing a 100 microsecond delay as above-described. The remainder of the circuits of modulator 707' are identical with the circuits of modulator 707 discussed above in detail in connection with Fig. 9g and hence need not be further described.

Master station equipment

In Fig. 10 is shown in block diagram form the circuit of a master timer for synchronizing the output of the ground stations. As shown, the 1080 cycles per second (C. P. S.) source 980 has its output amplified by amplifier 981 before being fed to phase inverter 982. One output of phase inverter 982 is fed to blocking oscillator 983, whose trigger output occurs approximately 450 microseconds after the start of each negative cycle of the sine wave fed to its input, this trigger output being fed to the control grids of 1 and 2 microsecond switch tubes 984 and 985, respectively, in parallel. The other output of phase inverter 982 is fed to blocking oscillator 986, whose output is divided down by 18:1 divider 987, resulting in 60 cycle triggers being fed to multivibrator 988. One output of multivibrator 988 is fed to the screen grid of 1 microsecond switch tube 984, and the other output is similarly fed to the screen grid of 2 microsecond switch tube 985. The output of both switch tubes 984 and 985 are fed to driver 989, whose output in turn is coupled to oscillator 990 which feeds transmitter antenna 991. The output of blocking oscillator 983 is a series of triggers at the 1080 C. P. S. frequency or in other words, one trigger occurring approximately every 926 microseconds, and each trigger will turn on whichever switch tube (984 or 985) has a positive gate simultaneously applied to its screen grid. Approximately 450 microseconds before every 18th trigger at the output of blocking oscillator 983, a trigger from the output of 18:1 divider 987 will trigger multivibrator 988, disabling one microsecond switch tube 984 and enabling two microsecond switch tube 985. Thus driver 989 and oscillator 990 will produce a series of pulses whose leading edges are approximately 926 microseconds apart, every 18th pulse being two microseconds wide and all other pulses one microsecond wide.

In Figs. 11a through 11c are shown the detailed circuits shown in block diagram form in Fig. 10. In Fig. 11a is shown 1080 C. P. S. source 980, which is a beat frequency oscillator. Two electron tubes 1000 and 1001 are connected in modified Colpitts circuits as shown, tube 1000 having its frequency controlled by a 100 kc. crystal 1002 and tube 1001 being controlled by a 101.080 kc. crystal 1003. These two frequency outputs are then fed to detector 1004, whose output is connected through a 100 kc. filter 1005 and then through amplifier 1006 and cathode follower 1007. As shown, cathode follower 1007 is connected in a partial boot-strap circuit, and its output at a frequency of 1080 C. P. S. is connected by a line 1008 to the control grid of amplifier 981.

In Fig. 11b is shown amplifier 981, phase inverter 982, blocking oscillator and cathode follower 983, blocking oscillator 986, 9:1 divider 987a, and 2:1 divider and inverter 987b. The 1080 C. P. S. output from the cathode of tube 1007 of block 980 is connected to the grid of amplifier tube 1010, which amplifies the sine wave and clips its top and bottom because of the high value of plate resistance 1011 and cathode resistor 1012 being by-passed by cathode condenser 1013. The output of tube 1010 is coupled to the grid of tube 1015 of phase inverter 982, and the output at the cathode of tube 1015 is coupled to the grid of blocking oscillator tube 1016 whose pulse transformer 1017 is connected in the plate circuit as shown. Variable resistor 1018 in the grid circuit is adjusted so that the trigger output of tube 1016 occurs near the end of the positive half cycle of the input and thus gives approximately a 450 microsecond delay. The output of tube 1016, taken from a secondary winding of pulse transformer 1017, is coupled through cathode follower tube 1019 and thence via line 1020 to the plate of diode 1021 of driver 989. The grid of tube 1016 being returned to ground causes this tube to be normally on and the positive cycle of the clipped and amplified sine wave applied to its cathode thus turns the tube off and initiates the blocking oscillator action desired. The output from the plate of tube 1015 is connected to the cathode of another blocking oscillator tube 1025, whose pulse transformer 1026 is similarly connected in its plate circuit and whose variable grid resistor 1027 is adjusted so that the output of this blocking oscillator occurs substantially simultaneously with the leading edge of the negative cycle of the clipped amplified sine wave applied to its cathode. The output of tube 1025 is then coupled through a 9:1 divider tube 1028 and 2:1 divider tube 1029, which are also blocking oscillator circuits, in order to obtain at the output of tube 1029 one positive trigger occurring simultaneously with each 18th trigger produced at the output of tube 1025. This output of tube 1029, taken from a secondary of its pulse transformer 1030, is then inverted by inverter tube 1031 and coupled via line 1032 to multivibrator 988.

In Fig. 11c are shown the details of 1 microsecond switch tube 984, 2 microsecond switch tube 985, multivibrator 988, and driver 989. The 60 cycle trigger output from line 1032 of 2:1 divider 987b is connected to the control grid of multivibrator tube 1033 of multivibrator 988. Tubes 1033 and 1034 are connected as shown in an electron-coupled multivibrator circuit. Tube 1033 is normally on or conducting and tube 1034 is normally off, and the output of tube 1033 is connected to the screen grid of gas type switch tube 1035 and the output of tube 1034 to the screen grid of gas type switch tube 1036. D. C. level or restorer diodes 1037 and 1038 are connected between the screen grids of switch tubes 1035 and 1036, respectively, and ground. The delayed 1080 C. P. S. triggers from line 1020 of cathode follower 983 are coupled through isolating diode 1021 to the control grids of switch tubes 1035 and 1036 in parallel as shown. Thus, normally 1 microsecond switch tube 1036 will fire in response to each trigger pulse applied to its control grid because of the positive gate applied to its screen grid from tube 1034, whereas 2 microsecond switch tube 1035 cannot fire in response to the same trigger pulse applied to its control grid because of the negative gate applied to its screen grid from tube 1033. When tube 1033 is triggered off or made non-conducting, a positive gate is produced at its output plate circuit and a corresponding negative gate at the output plate circuit of tube 1034, and this reverses the condition of switch tubes 1035 and 1036, switch tube 1035 now being able to fire in response to a trigger pulse applied to its control grid. Two microsecond pulse-forming network 1039 is connected between the plate of switch tube 1035 and the cathode of boot-strap driver tube 1040, and similarly one microsecond pulse-forming network 1041 is connected between the plate of switch tube 1036 and the cathode of tube 1040. The cathodes of switch tubes 1035 and 1036 are connected together and to the grid of driver tube 1040 through coupling condenser 1042. Thus when 1 microsecond switch tube 1036 fires a one microsecond pulse is produced at the cathode output of driver tube 1040, and when tube 1035 fires a two microsecond pulse is formed at the same cathode output. The cathode of tube 1040 is also connected via line 1044 to oscillator 990, which may be of conventional design and hence is not shown except in block diagram form in Fig. 10, and to ground through damping diode 1043. The circuitry of "boot-strap" driver tube 1040 is similar to that of driver tube 639 above-described and hence will not be discussed here in detail.

Alternative airborne equipment

In Fig. 12 is shown in block diagram form another embodiment of an airborne equipment according to this invention wherein provision is made for ascent and descent requests by the aircraft or orders from the ground station without the use of "look-in" discriminators. In this figure, those blocks which are similar to corresponding blocks of Figs. 7a and 7b have been similarly numbered.

In the embodiment of Fig. 12, the following pulse widths are used: No. 1 pulse, 4 microseconds; No. 2 pulse, 6 microseconds; No. 3 pulse, 10 microseconds; No. 4 pulse, 8 microseconds; No. 5 or blank pulses, 2.2 microseconds; No. 6 or check pulses, 12 microseconds; "A" block synch pulses, 14 microseconds; and "B" block synch pulses, 16 microseconds. Note that these are the same pulse widths as utilized in the airborne equipment of Figs. 7a and 7b, and that the pulse widths of each pulse are the same as used there except that here the widths of the Nos. 3 and 4 pulses have been exchanged so that the No. 3 pulse is now 10 microseconds wide instead of 8, and correspondingly the No. 4 pulse is 8 microseconds wide instead of 10. The reason for this is to give a wider difference in width between the Nos. 2 and 3 pulses which will be used in a new code to indicate ascent and descent permission or orders to the aircraft from the ground station. The pulse code to be utilized in the air borne equipment of Fig. 12 differs from that utilized in the embodiments of Figs. 7a and 7b, and is as follows:

| Signal | Sequence, Pulse, and Relay No. | | | |
|---|---|---|---|---|
| | 1 | 2 | 3 | 4 |
| Green | x | B | B | B* |
| Green plus double occupancy | x | Ck | Ck | Ck |
| Green plus ascent | x | x | B | B* |
| Green plus descent | x | B | x | B* |
| Red | B* | B | B | x |
| Red plus double occupancy | Ck | Ck | Ck | x |
| Red plus ascent | B* | x | B | x |
| Red plus descent | B* | B | x | x |
| Approach | x | x | x | x |
| Entry | x | B | B | x |

As was the case with the code utilized in the embodiments of Figs. 7a and 7b, the altitude cycles transmitted by the ground station are arranged in groups of four to form signal cycles. The first altitude cycle of each signal cycle is called the first sequence, the second altitude cycle is called the second sequence, etc. An "x" in each of the above columns numbered 1, 2, 3, or 4 indicates that for that signal the ground station will transmit the normal (No. 1, 2, 3, or 4, as the case may be) pulse during that particular sequence of the four sequence code. A "B" in any column indicates that a blank pulse will be sent to the aircraft from the ground station during that particular sequence. A "B*" indicates that a blank pulse will be sent during that sequence until the reception of that particular code is checked by the aircraft back to the ground station, and thereafter a check pulse will be substituted for the blank pulse previously transmitted by the ground station during this sequence. A double occupancy condition is indicated to the aircraft by the ground station changing all blank pulses to check pulses. Note that until a complete code is transmitted by the ground station and the reception of this code has been checked by the aircraft back to the ground station, the code is made up entirely of normal (Nos. 1, 2, 3, and 4) pulses and blank (No. 5) pulses. When any of the three codes which display signals involving a green indication, with the exception of the one involving double occupancy, is checked, that blank pulse which in the unchecked code is sent in the fourth sequence is changed to a check pulse. Similarly, that blank pulse which is sent in the first sequence of an unchecked code involving a red indication, with the exception of the one involving double occupancy, is changed to a check pulse when the code is checked.

As was the case in the embodiments of Figs. 7a and 7b, the airborne transmitter will transmit reply pulses of two kinds: occupancy pulses, of width 2 microseconds; and response pulses, of width 5 microseconds. When a normal (No. 1, 2, 3, or 4) pulse is received and the relay whose armature the normal pulse is intended to pick up is already energized because a normal pulse of that width has previously been received within the last approximately 3–7 microseconds by the aircraft, the airborne equipment will transmit a response pulse thereto. This response pulse after reception at the ground station will actuate the occupancy unit there to pick up a response relay to show that the proper normal relay on the aircraft is, in fact, energized. In the absence of requests by the aircraft for permission to ascend or descend, the airborne equipment will reply with occupancy pulses to blank pulses and check pulses, and will also reply with occupancy pulses to normal pulses when the corresponding airborne relay is not already energized as indicated above. Occupancy pulses transmitted by the aircraft will indicate at the ground station the presence of the aircraft in the particular block of the ground station but will not pick up the response relays in the ground station.

If the pilot of the aircraft wishes to request permission to ascend, the ascent button on indicator 708" may be pushed, and the airborne equipment will then answer check pulses with response pulses instead of occupancy pulses. This will be recognized at the ground station as a request to ascend. If permission to ascend is granted, or if the ground station initiates an order to the aircraft to ascend, the ground station code will then be changed in accordance with the above table, and the ascent light on indicator 708″ will then be lighted by means of relay circuitry included in local relay circuit 709″.

Similarly, if the pilot of the aircraft wishes to request permision to descend, the descent button on indicator 708″ may be pushed, and the airborne equipment will then answer blank pulses with response pulses instead of occupancy pulses. Again, this will be recognized at the ground station as a request to descend. If permission to descend is granted, or if the ground station initiates an order to the aircraft to descend, the code will be changed as indicated in the table above, lighting the descent light on indicator 708″ through relay circuitry in local relay circuits 709″. If the pilot wishes to cancel either an ascent or a descent request after he has made it by pushing the proper button, this can be accomplished by pushing the cancellation button on indicator 708″. Pushing this cancellation button will result in cutting off all response pulses, which would normally be transmitted by the aircraft in response to normal pulses. Under these conditions, the aircraft's presence in the block is still manifested to the ground station, however, because the equipment then sends occupancy pulses in response to all normal, as well as blank or check, pulses received from the ground station.

A request to enter the airway is accomplished in much the same way as described above in connection with the embodiment of Fig. 7b. When an aircraft is outside the block boundaries of the ground station, it receives the approach code of the above table, and will transmit occupancy pulses to each of the four normal pulses the first time it receives this code as it approaches the ground station, and a response pulse to each of these pulses each time it receives the code after the first code sequence received. These occupancy or response pulses from an aircraft outside the block boundaries do not manifest occupancy to the ground station, however, because a 100 microsecond delay is normally inserted between the reception of a pulse by the ground station and the transmission of the response or occupancy pulse thereto, as described above in detail in connection with the embodiment of Fig. 7b, and the ground station receiver is gated off in accordance with its block boundary function before these response or occupancy pulses arrive back at the ground station. When the aircraft pilot presses the entry button on indicator 708″, the normal 100 microsecond delay before the transmission of the response pulse to the No. 4 normal pulse is removed. Removing this delay electrically projects the aircraft approximately 10 miles nearer to the ground station, as described above in detail in connection with Fig. 7b. Thus, if the aircraft is within 10 miles of the block boundary of the ground station, its response pulse transmitted in reply to the No. 4 pulse is received by the ground station and recognized as a request for entry. If permission to enter the block is granted, the approach code is changed to the entry code as in the above table, which consists of a No. 1 pulse followed by two blank pulses and a No. 4 pulse. Reception of this code will light the entry light on indicator 708″ through relay contacts in local relay circuits 709″. The aircraft will thereafter continue to transmit response pulses to the No. 1 pulse, but delayed 100 microseconds thereafter, and occupancy pulses to the two blank pulses, but delayed 100 microseconds thereafter, and also will continue to transmit a response pulse to each No. 4 pulse without the 100 microsecond delay, as long as it receives the entry code. When the aircraft comes within the block boundary, the response pulses in reply to both the No. 1 and No. 4 pulses, as well as the occupancy pulses in reply to the blank pulses, are then received at the ground station during the time the ground station receiver is gated on. The aircraft thus manifests its position within the block boundary, and the ground station will change the entry code to the code which displays the indicator red or green signals lights. Upon the termination of the transmission of the entry code, the normal 100 microsecond delay before the transmission of a response to the No. 4 pulse is restored in the airborne equipment, and the equipment thereafter functions in its normal manner with a 100 microsecond delay between the time of reception of a pulse by the aircraft and the transmission of a response or occupancy pulse in reply thereto.

Referring now more specifically to Fig. 12, antennas 700 and 712, mixer 701, local oscillator 702, I-F and video amplifier 703, altitude switch 705, oscillator 711, and high-voltage source 713 are similar to the correspondingly numbered blocks of Fig. 7a and hence will not be discussed here in detail. Timer 704″ is similar to timer 704 of Fig. 7a except that it includes only a B relay, as will be more apparent from the detailed description given hereinafter in connection with Fig. 13a, instead of both an A and a B relay. Timer 704″ also differs from timer 704 of Fig. 7a in that it controls a block boundary distance-measuring meter on indicator 708″ instead of A and B indicating lights, which previously indicated whether the aircraft was in an "A" or "B" block. This distance-measuring meter is calibrated to indicate the approximate distance to the nearest block boundary, and thus the minimum reading is obtained when the aircraft is at the block boundary and the maximum reading when the aircraft is directly above a ground station.

The outputs from timer 704″ and normal discriminators 706′, in a manner similar to that of the embodiment of Fig. 7a, selectively control modulator 707″ to produce either an occupancy or a response pulse in reply to each altitude or information pulse passed by timer 704″.

Two separate blanking gates are derived from modulator 707″, the first of which starts coincident with each output pulse from modulator 707′ and is fed to I-F and video amplifier 703 in order to prevent reply pulses from the aircraft transmitter antenna 712 from passing to timer 704″. The second blanking pulse is connected to timer 704″ and starts immediately after each altitude or information pulse passed by timer 704″ to prevent more than one altitude or information pulse from being passed by timer 704″ during any single altitude cycle or sequence.

Local relay circuits 709″ are controlled by the output of the various pulse width channel relays of normal discriminators 706′ and in turn control various keyed amplifiers of normal discriminators 706′ to selectively determine whether occupancy or response pulses are to be transmitted by the aircraft, depending upon whether the aircraft pilot is requesting permission to ascend or descend or cancelling either of these requests, as described above. Local relay circuits 709″ also control the various indicator lights of indicator 708" and in turn are controlled by the various push-buttons of indicator 708", and control in modulator 707" for entry purposes the 100 microsecond delay of the response pulses transmitted in reply to the No. 4 normal pulses received, as described above.

In Fig. 13a is shown in block diagram form the detailed circuitry of timer 704". Those circuit elements which are similar to the elements of timer 704 of Figs. 8a, 9a, and 9c are numbered similarly. The output from I-F and video amplifier 703 is connected to the input of normally-off amplifier 720, normally-on amplifier 721, and inverter-amplifier 1050 of the distance-measuring meter circuit. The output of normally-on amplifier 721 is connected to integrator 722, and the output of the latter is applied through cathode follower 723 to biased amplifiers 724 and 725, which are biased from potentiometers 1051 and 1052, respectively. Every pulse transmitted by a ground station within range of the aircraft is passed by I-F and video amplifier 703 through normally-on amplifier 721 to trigger integrator 722 into operation and thereby produce a corresponding saw-tooth output whose duration is proportional to the width of the input pulse. Biased amplifier 724 is biased by means of potentiometer 1051 so that it will produce an output only if the input saw-tooth has a peak amplitude corresponding to an input pulse whose duration is equal to 13.8 or greater microseconds, and biased amplifier 725 is similarly biased by means of potentiometer 1052 so that it will produce an output only for an input saw-tooth whose peak amplitude corresponds to an input pulse of 15.8 or greater microseconds. Thus an output will not be produced from biased amplifier 724 except in response to either "A" block or "B" block synch pulses, and from biased amplifier 725 only in response to "B" block synch pulses. The first synch pulse to be received at the aircraft will, of course, be the one from the nearest ground station, and the output produced from biased amplifier 724 in response thereto will trigger delay multivibrator 727 to produce at the output of the latter a negative voltage gate whose trailing edge is differentiated by differentiating circuit 730 to produce a positive trigger. This positive trigger is inverted by trigger amplifier 1053 to trigger blanking multivibrator 1054. The output of blanking multivibrator 1054, which is a 16,000 microsecond negative voltage gate, is applied through cathode follower 1055 to one element of normally-on amplifier 721, preferably the screen grid thereof, so that normally-on amplifier 721 will thereafter be rendered non-conducting or "off" until it is approximately time for another synch pulse to be received from the nearest ground station. Thus, normally-on amplifier 721 passes all pulses from I-F and video amplifier 703 until a synch pulse is received from the nearest ground station and identified as such by means of biased amplifier 724, whereupon normally-on amplifier 721 is turned off as above for approximately 16,000 microseconds. Delay multivibrator 727 is inserted in the circuit to insure that each synch pulse is completely received before the blanking voltage gate is applied to normally-on amplifier 721 and thus prevents the ends of any input synch pulses from being "chopped off" by turning normally-on amplifier 721 "off" too soon.

If the nearest ground station is a "B" station, biased amplifier 725 will produce an output approximately two microseconds after the output is produced by biased amplifier 724. This two microsecond delay is, of course, due to the difference in bias on the two amplifiers. The output of biased amplifier 725 is connected through delay multivibrator 743, differentiating circuit 747, trigger amplifier 1056, 60-cycle multivibrator 754, power amplifier 755, and bridge rectifier 756 to energize "B" relay 757. When "B" relay 757 is energized, it closes contacts 861a and opens contacts 861b to vary the bias voltage obtained from potentiometer 850 of altitude switch 705 to effectively insert the additional 463 microsecond delay required by the system of the present embodiment when the aircraft is within the block boundaries of a "B" station, as discussed above in connection with Figs. 3 and 9a.

The output of delay multivibrator 727 is also connected through differentiating circuit 729 to trigger amplifier 1057, and each synch pulse from the nearest ground station thus produces an output from trigger amplifier 1057. The output of trigger amplifier 1057 is connected through biased diode 733 and cathode follower 734 to phantastron 735. The bias of biased diode 733 is derived from slider 851 of potentiometer 850 of altitude switch 705 and is a direct measure of the altitude zone in which the aircraft is flying. As explained above in connection with Figs. 8a and 9a, the output of phantastron 735 is a negative voltage gate ending in a positive pip or trigger, the start of this negative voltage gate occurring coincident with the output of trigger amplifier 1057 and the duration of this voltage gate and hence the relative time of occurrence of the positive spike being a direct measure of the altitude zone in which the aircraft is flying. The output of phantastron 735 is used to initiate a positive voltage gate of approximately 100 microseconds duration to turn on normally-off amplifier 720 at the proper time so that this amplifier will pass that altitude pulse following the preceding synch pulse which is intended for the altitude zone in which the aircraft is flying. This 100 microsecond gate is obtained by connecting the output of phantastron 735 through amplifier 1058, diode 1059, and inverter-amplifier 1060. The 100 microsecond output of the latter is applied through cathode follower 1061 to the screen grid of normally-off amplifier 720, this amplifier being biased "off" by a negative voltage applied to its screen grid except when the gating voltage is applied thereto. Thus, no output occurs at the output of normally-off amplifier 720 except when an altitude signal arrives at the aircraft within the 100 microsecond period during which this positive gate is applied to the amplifier. In order to insure that only the first altitude pulse which reaches normally-off amplifier 720 after the application of the 100 microsecond gate from cathode follower 1061 is passed by this amplifier, a second 100 microsecond negative voltage gate is applied to the suppressor grid of amplifier 720 from the occupancy circuit of modulator 707", as will be discussed more in detail hereinafter in connection with Fig. 13c. The leading edge of this second 100 microsecond gate occurs approximately coincident with the trailing edge of the first altitude pulse passed by normally-off amplifier 720, and the application of this second gating voltage cuts off amplifier 720 for the remainder of the first 100 microsecond positive gate applied from cathode follower 1061.

The gate output of delay multivibrator 727 is also connected through trigger cathode follower 1062 to on-off multivibrator 1063. Another input to on-off multivibrator 1063 is derived from inverter-amplifier 1050 through integrator 1064 and clamper 1065, and this circuitry is arranged, as will be pointed out more in detail hereinafter in connection with Fig. 14, such that an input to on-off multivibrator 1063 is produced from clamper 1065 only if the input pulses appearing at the output of I-F and video amplifier 703 and applied to the input of inverter-amplifier 1050 are at least of 13 microseconds duration, or in other words, in this system a synch pulse. Thus, one input to on-off multivibrator 1063 consists of a negative gate in response to each synch pulse received by the aircraft and the other input, from trigger cathode follower 1062, consists of triggers in response to synch pulses from all adjacent ground stations, but only the triggers in response to synch pulses from the nearest ground station will be utilized, as will be described more in detail hereinafter. The duration of the voltage gate output of on-off multivibrator 1063 will thus be dependent upon the time delay between the reception of each synch pulse from the nearest ground station and the first synch pulse from the nearest adjacent ground station received thereafter by the aircraft. This voltage gate output is integrated by integrator-amplifier 1066 to provide a voltage output whose amplitude is proportional to the duration of the voltage gate input, and this integrated output is applied to distance-measuring meter 1067 of indicator 708″ to indicate the distance from the aircraft to the nearest block boundary as above-described. As will be pointed out more in detail hereinafter, if a second synch pulse arrives at the aircraft before the first is ended, a condition which occurs when the aircraft is adjacent a block boundary, the circuit does not recognize the presence of two independent pulses and consequently the voltage gate input to integrator-amplifier 1066 is determined by the third synch pulse to be received, if any. If no third synch pulse is received, multivibrator 1063 merely produces a voltage gate output in accordance with its circuit constants, which are designed to produce an approximately 200 microsecond unrestricted gate output. This results in a characteristic full-scale reading of distance-measuring meter 1067 during the time that the A and B synch pulses are merged or overlapping in the region of the block boundaries between two adjacent stations. It is also to be noted that as the aircraft approaches the effective block boundary between two adjacent ground stations, the meter needle will jump suddenly from zero to full-scale as the two synch pulses begin to merge after having previously been received one after another but with the leading edge of the second occurring slightly after the trailing edge of the first. As soon as the aircraft reaches a position where the synch pulses no longer merge and the synch pulse from the station ahead is received before the synch pulse from the station behind with in addition a space separation between the two synch pulses, the reading of the distance-measuring meter will again drop to zero, thereafter increasing slowly to a maximum as the aircraft proceeds toward the ground station ahead.

In Fig. 13b is shown in block diagram form the detailed circuitry of normal discriminators 706′. Those circuit elements which are similar to the elements of normal discriminators 706 of Figs. 8b and 9d are numbered similarly. The output from normally-off amplifier 720 of timer 704″, which is a negative pulse, is connected to integrator 770, and the latter converts it into a saw-tooth wave whose peak amplitude is a measure of the width of the input pulse. This saw-tooth wave is coupled through cathode follower 771 to the inputs of six biased amplifiers 772 of six pulse discriminator channels as shown, which are arranged from top to bottom of the page in order of increasing pulse width. Since the No. 5 or blank pulse is of the shortest width, 2.2 microseconds, its channel is shown in the top line. The second line is the No. 1 pulse channel; the third, the No. 2 pulse channel; the fourth, the No. 4 pulse channel; the fifth, the No. 3 pulse channel; and the bottom or last, the No. 6 or check pulse channel. Each pulse channel but the bottom one includes, after its biased amplifier 772, a delay multivibrator 773, a differentiating circuit 774, a gated amplifier 775, a 15-cycle multivibrator 776, a power amplifier 777, a bridge rectifier 778, and a corresponding pulse relay energized by the preceding bridge rectifier 778, these circuit elements being connected to one another in the order named as shown. The No. 5 pulse relay has been given the reference numeral 1070, the No. 1 pulse relay the reference numeral 782, the No. 2 pulse relay the numeral 783, the No. 4 pulse relay the numeral 785, the No. 3 pulse relay the numeral 784, and the No. 6 pulse relay the numeral 786. The negative output pulse of each gated amplifier 775 in addition to being connected to the input of multivibrator 776 is also connected to the input of response-inverter 1071, and the positive output pulse from inverter 1071 produces an output trigger from the associated keyed amplifier 1072 if the corresponding pulse relay of the channel is energized and if the associated relay contacts of local relay circuits 709″ are closed. Thus, the keying line to keyed amplifier 1072 of the top or No. 5 pulse channel is connected to ground through a series circuit including the relay contacts shown, which are closed when associated No. 5 pulse relay No. 1070 is energized, and relay contacts (not shown) in local relay circuits 709″ which are open except when descent permission is being requested due to the depressing of the descent button of indicator 708″. Similarly, the keying line to the keyed amplifier 1072 associated with the bottom or No. 6 channel is connected to ground through a series circuit including the contacts shown associated with No. 6 pulse channel 786, which are open except when the latter is energized, and through contacts (not shown) in local relay circuits 709″ which are closed except when permission to ascend is being requested by the previous depressing of the ascent button of indicator 708″. The keying line to each keyed amplifier 1072 associated with each of the normal (Nos. 1, 2, 3, and 4) pulse channels is connected to ground through the contacts shown associated with its corresponding pulse relay No. 782, 783, 785, or 784, respectively, in series with a contact (not shown) in local relay circuit 709′ which is closed except when the aircraft is cancelling previous ascent or descent requests by means of depressing the cancellation button of indicator 708″. For simplicity, these last-mentioned contacts in local relay circuits 709″ may be common to all the keying contacts associated with the relay circuits 782—785. In addition to the relay contacts shown associated with each pulse relay, additional contacts, not shown, are provided to control the signal lights of indicator 708″ in accordance with the pulse code received by the aircraft in a manner similar to that shown in Fig. 9f and described previously.

The outputs of keyed amplifiers 1072 of the Nos. 5, 1, 2, 3, and 6 channels are connected together and to the response circuit of modulator 707", as will be described more in detail hereinafter in connection with Fig. 13c, whereas the output of the keyed amplifier 1072 of the No. 4 pulse channel is taken separately to the response circuit of modulator 707" because of its "entry" function.

The amplifier 772 of the top line of the drawing (corresponding to the No. 5 or blank pulse channel) is biased such that it will produce an output only for a sawtooth whose peak amplitude corresponds to an input pulse of greater than two microseconds duration. The five successive amplifiers 772, going from top to bottom, are biased to limits of 3 microseconds, 5 microseconds, 9 microseconds, 7 microseconds, and 11 microseconds, respectively. A second output from each delay multivibrator 773 except that of the top line is connected to the input of the gated amplifier 775 of the preceding channel. Each successive delay multivibrator 773, going from the top of the drawing to the bottom, is arranged to produce a slightly longer output gate than the preceding multivibrator for disabling purposes, since it is desired that each successive biased amplifier 772 disable the gated amplifier 775 of the previous channel by means of the connection shown from the associated delay multivibrator 773 whenever the said biased amplifier 772 produces an output. Thus, an output will be produced from only a single gated amplifier 775 of normal discriminators 706' for a single input pulse applied to integrator 770. Accordingly, the successive delay multivibrators 773, going from top to bottom, may be arranged to produce output gates of 4 microseconds, 6 microseconds, 8 microseconds, 10 microseconds, 12 microseconds, and 20 microseconds, respectively, as indicated on the drawing. The bottom or No. 6 pulse channel differs from the other pulse channels only in that it includes no gated amplifier 775 since there is no successive pulse discriminator channel to turn it off in case a pulse of greater width than 12 microseconds is received, and accordingly no response-inverter 1071 is required between the differentiating circuit 774 and the keyed amplifier 1072 of the bottom line.

Since the operation of these discriminator channels has been described above in detail in connection with Figs. 8b and 9d, it is not believed necessary to repeat it here. These discriminator circuits above-disclosed are described more fully and claimed in the application of Lionel H. Orpin for Pulse Duration Discriminators, Serial No. 743,149, filed April 22, 1947.

In Fig. 13c is shown in block diagram form the detailed circuitry of modulator 707". Modulator 707" is practically identical with modulator 707' shown in Fig. 9h and described in detail heretofore, and similar circuit elements of that figure and this figure are numbered similarly. As explained above, the airborne equipment replies to altitude pulses received from the ground station, after a delay of approximately 100 microseconds, with either a 5 microsecond response pulse or a 2 microsecond occupancy pulse and modulator 707", like modulator 707', thus includes a response modulator channel and an occupancy modulator channel. The purpose of the occupancy modulator channel is to transmit an occupancy pulse whenever a response pulse is not transmitted in accordance with the coding discussed above.

The output from the No. 4 pulse channel keyed amplifier 1072 of normal discriminators 706' is connected through pulse transformer 966 to the inputs of by-pass switch tube 967 and switch tube 968. A relay 973 is provided, energized from the entry control circuit of local relay circuit 709", and this relay, by means of the contacts shown, determines which one of switch tubes 967 and 968 will pass any pulse applied to both in parallel from pulse transformer 966. Switch tubes 967 and 968 are biased so that each is "off" or non-conducting except when its corresponding relay contact is connected to ground through the armature of relay 973. The output of switch tube 968 is connected to the input of 200 microsecond disabling gate multivibrator 930 and also to the input of 100 microsecond delay circuit 1081. Delay circuit 1081 may be a phantastron delay circuit similar to the one including tubes 934 and 935 of Fig. 9h, although preferably it is a multivibrator. The common line leading from all other pulse channel keyed amplifiers 1072 of normal discriminators 706' is connected to the same inputs of disabling gate multivibrator 930 and delay circuit 1081. The negative gate output of 100 microsecond delay circuit 1081 (assuming this circuit is a multivibrator) is differentiated, and the positive signal thereby produced at the trailing edge is amplified and inverted in inverter 1082 and trigger amplifier 941 before being applied to gas-type switch tube 943. When switch tube 943 fires, it discharges 5 microsecond response pulse-forming network 945 through the primary winding of output pulse transformer 944. A first output from pulse transformer 944 leads to the plate of oscillator 711 to produce a corresponding 5 microsecond pulse for transmission from transmitting antenna 712 (Fig. 12) of the airborne equipment. A second similar pulse is applied from pulse transformer 944 via the blanking line to I-F and video amplifier 703, as discussed above in connection with Fig. 12.

The negative pulse produced at the output of normally-off amplifier 720 of timer 704" corresponding to each pulse passed by timer 704" is differentiated by differentiating circuit 1083, and the positive pulse thus produced coincident with its trailing edge is amplified by trigger amplifier 1084. The negative output of amplifier 1084, which is coincident with the end of the altitude pulse being received, is applied to 100 microsecond delay multivibrator 932. The negative gate output of delay multivibrator 932 is connected back to the suppressor grid of amplifier 720 of timer 704" to cut off this tube for the remainder of the interval during which it would otherwise be conducting due to the 100 microsecond positive gate applied to its screen grid from cathode follower 1061 (Fig. 13a). As discussed above, this insures that only the first altitude pulse of any group of altitude pulses which may be received at the aircraft during the time that normally-off amplifier 720 (Fig. 13a) is gated on, due to the functioning of altitude switch 705, will be passed by amplifier 720, and this first pulse will, of course, be the pulse from the nearest ground station corresponding to the altitude zone in which the aircraft is flying.

The trailing edge of the negative gate output of 100 microsecond delay multivibrator 932 is differentiated and applied to gated amplifier 931, which is normally on but which may be cut-off or rendered non-conducting if an output is produced from 200 microsecond disabling gate multivibrator 930 since the output of multivibrator 930 is connected to the screen grid of amplifier 931. The output of gated amplifier 931 is connected through trigger amplifier 941' to a second gas-type switch tube 943'. The plate voltage supply for both trigger amplifiers 941 and 941' and both gas-type switch tubes 943 and 943' is obtained from high-voltage source 713. When switch tube 943' fires, it discharges two microsecond occupancy pulse-forming network 946 to produce a corresponding two microsecond pulse in the primary of pulse transformer 944 and hence corresponding pulses in the secondaries of transformer 944, which are coupled to the plate of oscillator 711, and to I-F and video amplifier 703 for blanking purposes respectively, as above-described in connection with Fig. 12. As described above in connection with Fig. 13b, the keyed amplifiers 1072 of the No. 5 or blank and the No. 6 or check pulse channels are keyed on from their keying line only when descent or ascent requests are being made by the aircraft. Therefore, normally, in the absence of such requests, blank and check pulses passed by timer 704" while energizing their corresponding relays 1070 and 786 (Fig. 13b) do not produce any output from their corresponding keyed amplifiers 1072, and therefore do not trigger 200 microsecond disabling gate multivibrator 930 into action. Therefore, each blank or check pulse passed by timer 704" produces an output from amplifier 1084, which after 100 microseconds delay will actuate gated amplifier 931 to produce thereby a two microsecond occupancy pulse from pulse transformer 944. On the other hand, if ascent or descent requests are being made by the aircraft, the corresponding keyed amplifier 1072 of the No. 5 or No. 6 channel, as the case may be, will be energized, and 200 microsecond disabling gate multivibrator 930 will then be triggered to prevent gated amplifier 931 from producing an output at the end of the 100 microsecond delay period. At the same time, at the end of 100 microseconds, caused this time by 100 microsecond delay circuit 1081, an output will be produced from inverter 1082 to produce a 5 microsecond response pulse from pulse transformer 944. Thus, as discussed above, when an ascent request is being made, response, instead of occupancy pulses, are transmitted by the airborne equipment in answer to check pulses, and when a descent request is being made, response pulses, instead of occupancy pulses, are transmitted by the airborne equipment in answer to blank pulses. Each normal (No. 1, 2, 3, or 4) pulse passed by normally-off amplifier 720 of timer 704" will cause a response pulse to be transmitted from the airborne equipment due to the circuitry shown in Fig. 9h unless the aircraft is cancelling a previous ascent or descent request. If cancellation is being effected, the keying line to all the keyed amplifiers 1072 of the normal (Nos. 1, 2, 3, and 4) pulse channels of normal discriminators 706' is open, so that no input results to 100 microsecond delay circuit 1081 or 200 microsecond disabling gate multivibrator 930 when a No. 1, 2, 3, or 4 pulse is passed by timer 704", and thus for a short period occupancy pulses instead of response pulses are transmitted by the airborne equipment in answer to all normal pulses.

The operation of relay 973 controlling the insertion or removal of the 100 microsecond delay before the transmission by the airborne equipment of response pulses in answer to each No. 4 normal pulse is similar to that described above in connection with Fig. 9h and hence will not be discussed in detail here. The only difference is that in Fig. 9h, because of the different code utilized, this 100 microsecond delay was selectively inserted or removed in the circuit controlling the response pulses transmitted in answer to the No. 2 normal pulse instead of the No. 4 normal pulse as here.

One further modification of the response modulator circuit may be noted. It might be desirable to reduce the 100 microsecond delay of delay multivibrator 1081 normally to 90 microseconds in order that when an aircraft leaves an air lane, response pulses transmitted by the aircraft will be received at the ground station after the occupancy pulses transmitted by the same aircraft are no longer received in order to insure that the aircraft will receive signal light indications on indicator 708" and manifest its presence within the block boundaries until the very instant that it crosses the block boundary. If this is done, it is desirable that this 90 microsecond delay of delay circuit 1081 be increased to 100 microseconds when entry is being requested to improve the sharpness of the entry zone. This variation of the voltage gate output of delay circuit 1081 can be accomplished simply if this circuit comprises a multivibrator biased such that its normal voltage gate output is 90 microseconds long by changing the bias on this multivibrator to lengthen the output gate to 100 microseconds by means of a connection through additional contacts provided (not shown) controlled by relay 973.

In Fig. 14 is shown the detailed circuitry of the distance-measuring meter circuit shown in block diagram form in Fig. 13a. Each negative voltage gate at the output of delay multivibrator 727 of timer 704" (Fig. 13a) produced in response to each synch pulse from the nearest ground station is coupled through cathode follower 1062 to turn the normally "on" tube 1063a of multivibrator 1063 "off" and, as pointed out above, the circuit constants of this multivibrator are arranged such that tube 1063a will then remain off for a period of approximately 200 microseconds unless a trigger is applied to the grid of tube 1063b of multivibrator 1063 before the end of the 200 microsecond period. This usually occurs, since a synch pulse from the next adjacent ground station will be received by the aircraft and passed by I-F and video amplifier 703 to inverter-amplifier tube 1050 shortly after the synch pulse from the nearest ground station is received at the aircraft and results in tube 1063a being turned off. This later received synch pulse, which produces a positive output from I-F and video amplifier 703 in response thereto, is inverted and amplified in tube 1050 before being applied to integrator 1064. By making plate resistor 1090 of this tube large, its cooperation with the internal capacity of the tube produces a saw-tooth output which is then coupled through clamper 1065 to the grid of normally-off tube 1063b of multivibrator 1063. The circuit constants are arranged such that an output from clamper 1065 to tube 1063b will be produced only if the pulse at the input of inverter-amplifier 1050 has a duration of at least 13 microseconds, or in other words, is a synch pulse. When tube 1063b, which was turned on at the time tube 1063a was turned off by the synch pulse from the nearest ground station, is turned off again, the positive voltage gate produced at the plate of tube 1063a will end due to the multivibrator action. This positive voltage gate is applied to the grid of integrator-amplifier 1066, whose plate circuit includes in series a 200 micro-ampere meter 1067 and plate resistor 1091. The deflection of meter 1067 is thus a measure of the width of the positive voltage gate output applied to integrator-amplifier 1066 from the plate of tube 1063a of multivibrator 1063. As described above, the wider this voltage gate output or, in other words, the further apart the two synch pulses which are received from adjacent ground station, the larger will be the reading of meter 1067. Plate resistor 1091 is made of a large ohmic value and the series combination of meter 1067 and plate resistor 1091 is paralleled by a large (25 microfarad) condenser 1092 in order to prevent erratic operation during periods of weak incoming signals.

*Alternative ground station equipment*

In Figs. 15a and 15b are illustrated in block diagram form an alternative round station equipment. Many of the circuit elements of this embodiment are identical with those of the ground station equipment described above in connection with Figs. 4a, 4b, 6a–6o, 10 and 11a–11c, and most of the other elements of the present embodiment are at least similar. Identical elements of the present embodiment accordingly have been numbered identically, and similar elements have been numbered with the same reference numeral but with a prime added. For instance, the synchronization pulse width discriminator and output circuit of the present embodiment is similar to that of the ground station equipment described above but not identical therewith, and accordingly has been given the reference numeral 74'. In view of this, in general no detailed description will be given of the circuitry or operation will be given of those portions of the present embodiment which are identical with those described previously in detail, and similarly neither will any detailed description be given if the differences are only minor.

Starting at the top of Fig. 15a, synchronization receiver 70 and synchronization transmitter 71 are identical with the similarly numbered components of Fig. 4a. Pulse transmitter 89' and occupancy receiver 94' differ from pulse transmitter 89 and occupancy receiver 94 of Fig. 4a only in that no portional output is derived from modulator 91 to trigger an intermediate occupancy receiver gate circuit to provide a gating pulse for I-F amplifier 93. In the present embodiment, occupancy receiver gate generator 92' is provided instead, which derives its input from adjustable station delay 75 and furnishes a gating pulse to pulse width discriminator 95 to produce the same result.

Synchronization pulse width discriminator 74' replaces both synchronization pulse width discriminator and output circuit 74 and trigger circuit 76 of Fig. 4a. It derives its input from the output circuit of synchronization receiver 70, and this is applied via line 73 to gated inverter 1100. The operation of gated inverter 1100, which is normally on, is controlled by a blanking pulse derived via a blanking line from discriminator gate generator 1101, which like occupancy receiver gate generator 92', derives its input from adjustable station delay 75. Thus gated inverter 1100 is prevented from passing pulses when pulse transmitter 89' is transmitting, because gated inverter 1100 is intended to pass only synchronization pulses from the master station and not synch or altitude pulses transmitted to aircraft. The output of gated inverter 1100 is applied to 1080-cycle multivibrator 1102 and to synch integrator 101. The output of synch integrator 101 is fed through a 60-cycle discriminator 106, which is responsive only to the wider synchronization pulses received by synchronization receiver 70 or, in other words, those pulses which are intended to produce synch pulses for transmittal to the aircraft. The output of 60-cycle discriminator 106 is connected through an output circuit 111 to one S or "slave" contact of DPDT function switch 1103. The output of 1080-cycle multivibrator 1102 is similarly connected through a second output circuit 1104 to the other S contact of function switch 1103. The blade associated with the last-mentioned "slave" contact is connected to the 1080-cycle pulse-forming circuit of pulse-forming circuits 675, and the blade associated with the first-mentioned S contact is connected to the 60-cycle pulse-forming circuit of pulse-forming circuits 675. The oppositely-poled contact M associated with the 60-cycle blade of function switch 1103 is connected to the output of 18:1 divider 987 of master timing unit 1105. Master timing unit 1105 as shown includes the timing portions of the master station equipment described previously in connection with Figs. 10 and 11a–11c. It includes a 1080-cycle source 980 whose output is fed to a 1080-cycle trigger generator, which may include an amplifier 981, phase inverter 982, and blocking oscillators 983 and 986, as shown in Fig. 10. One output of the 1080-cycle trigger generator, which may for instance be from blocking oscillator 986, is fed to the input of 18:1 divider 987, and the other output, which may for instance be from the blocking oscillator 983, is fed to the other contact M of DPDT function switch 1103.

The purpose of function switch 1103 is, of course, to allow this ground station to function either as a master station or a "slave" unit. If the latter, it will receive its synchronization triggers by means of synchronization receiver 70 from a master timing station located elsewhere. This is the condition for the position of the DPDT function switch 1103 shown. When the blades of function switch 1103 are in the other position, this ground station equipment functions as a master timing station, and master timing unit 1105 and synchronization transmitter 71 then form the complete master timing station previously shown in Figs. 10 and 11a–11c.

The 1080-cycle multivibrator 1102 and output circuit 1104 of block 74' replace trigger circuit 76 of the ground station equipment previously described. The purpoise of 1080-cycle multivibrator 1102 is, of course, to delay the 1080-cycle synchronization signals received from synchronization receiver 70 via inverter 1100 by a time sufficient to allow the 60-cycle discriminator channel, including integrator 101, discriminator 106, and output circuit 111, to determine whether a long synchronization pulse has been received and hence whether the 60-cycle pulse-forming circuit of pulse-forming circuits 675 should be triggered instead of the 1080-cycle pulse-forming circuit thereof. As described above in detail in connection with Fig. 6n, the 1080-cycle pulse-forming circuit is biased and cooperates with the 60-cycle pulse-forming circuit such that if the 60-cycle pulse-forming circuit is triggered from output circuit 111, if function switch 1103 is in the position shown, or from 18:1 divider 987 if function switch 1103 is in its other position, the 1080-cycle pulse-forming circuit will be prevented from producing a pulse output.

Thus, synchronization transmitter 71 repeats the synchronization pulses received by receiver 70, which are shown in line A of Figs. 5a and 5b, although as described above in detail in connection with Fig. 6n, these repeated pulses are delayed very slightly due to the time required for 60-cycle discriminator 106 to determine whether a long synchronization pulse is to be transmitted instead of a short one.

As in the case of the previously described embodiment, the 60-cycle output from output circuit 111, which is shown in line F of Figs. 5a and 5b, is connected to the inputs of 4:1 time divider 77, 16,666 microsecond gate generator 78, and inverter 197 of altitude gate circuits 85. The 1080-cycle output of output circuit 1104 is connected to the input of adjustable station delay 75 and the output of the latter, which is shown in line B of Figs. 5a and 5b, is conneced to the inputs of occupancy receiver gate generator 92' and discriminator gate generator 1101, as above described, and to blocks 83', 85, and 86 as shown in Fig. 15b. Blocks 77, 78, 82, and 85 are identical with the similarly numbered blocks of Fig. 4b and described in detail in connection with Figs. 6a, 6b, and 6c, respectively, and hence will not be described here in detail. It should again here be noted that while only two altitude gate outputs are shown from block 85, these being the gate outputs for the first and second altitude zones, as indicated in lines O and P of Figs. 5a and 5b, as many successive output gates can be provided as desired, up to the limitation of 16 (only because of the particular spacing of the synchronization triggers chosen, as described above in detail in connection with Fig. 6c).

It may here be noted that in Figs. 15a and 15b as in Figs. 4a and 4b, those places where the waveforms of lines A through CC appear are indicated by the corresponding letter in a circle.

The remaining portions of the block diagram of Figs. 15a and 15b include only those circuit elements controlling the transmission of pulses to or reception of pulses from the first altitude zone in those cases where a separate such circuit element is required for each altitude zone. However, the circuit elements shown for the first altitude zone are typical and need merely be repeated for the other altitude zones.

Altitude occupancy gate circuits 83' of Fig. 15b are similar to altitude occupancy gate circuits 83 of Fig. 4b and Fig. 6e, but produce their altitude occupancy gates in a slightly different fashion. In block 83' is shown only a typical altitude occupancy gate circuit, the one for the first altitude zone, although the connection from block 85 to similar circuits to produce the second altitude occupancy gate is indicated. The first altitude occupany gate channel of block 83' includes an occupancy gate generator 1119, which derives its input from adjustable station delay 75 of Fig. 15a. It is thus fed by the delayed 1080-cycle triggers of line B (Figs. 5a and 5b) and its output is fed to first altitude switch tube 262', whose suppressor grid is gated on by the output of the first altitude gate generator of block 85 as shown. First altitude switch tube 262' is similar to altitude switch tube 262 of Fig. 6e except that instead of being a tetrode gas tube it may be a pentode vacuum tube. The output of first altitude switch tube 262' is coupled through first altitude occupancy gate output circuit 1111 to the switch tubes of the four 1st altitude response detection circuits of block 84'. The output of output circuit 1111 is indicated as having a waveform of line Y', which is not shown but is similar to the waveform shown in line Y of Figs. 5c and 5d. Like the waveform of line Y, its leading edge occurs coincident with one of the delayed 1080-cycle triggers of line B, but unlike line Y, its trailing edge occurs coincident with the trailing edge of the first altitude gate output of line O (Figs. 5a and 5b) due to the operation of coincidence or switch tube 262' from the inputs shown.

Referring now back to Fig. 15a, the output from the output circuit of occupancy receiver 94', which consists of all response and occupancy pulses transmitted from aircraft within range of the ground station, is connected to the inputs of two gated inverters 1112 and 1113 of pulse width discriminator 95'. It will be remembered that each aircraft replies selectively to altitude pulses transmitted from the nearest ground station with response or occupancy pulses according to the code set forth above. The purpose of gated inverter 1112 is to feed the two discriminator channels shown to separate the response pulses, of width 5 microseconds, from the occupancy pulses, of width 2 microseconds. Gated inverter 112 is normally off or non-conducting, but is turned on, or rendered conducting, by means of the gating line from occupancy receiver gate generator 92', as discussed previously, during that period after each pulse is transmitted from transmitter 89' when a reply will be received from an aircraft if it is within the block boundaries.

Occupancy receiver gate generator 92' consists of a fixed 60 microsecond delay circuit and a variable width gate generator which is triggered by the output of the 60 microsecond delay circuit. The 60 microseconds delay between the start of the transmitted pulse from the ground station and the leading edge of the receiver gate is inserted to protect the response and occupancy discriminator channels from ambient noise by rendering them insensitive for a major portion of the time during which no replies can be received from the aircraft because of the normal 100 microsecond delay in the airborne equipment, which is inserted for entry purposes as described above in connection with Fig. 9h. The output of occupancy receiver gate generator 92' is therefore indicated as corresponding to line AA', which is not shown, but is similar to line AA of Figs. 5c and 5d and differs only in that the start of the enabling gate is delayed 60 microseconds after the transmission of a pulse by pulse transmitter 89' instead of 10 microseconds as was the case with the ground station equipment previously described in connection with Figs. 4a and 4b. The output of gated inverter 1112 is fed to the inputs of both the response and occupancy discriminator channels. Each channel includes in the order named an integrator 770, a discriminator 1114, and a multivibrator 773, which may be similar to the similarly numbered elements described above in connection with Figs. 8b, 9d, and 13b. Response discriminator 1114 may be similar to that portion of pulse width discriminator 95, described above in detail in connection with Fig. 6f, which starts with tube 334, and is biased so that it will produce an output only if the output pulse from gated inverter 1112 is 3 microseconds wide but not greater than 6 microseconds wide. Alternatively, response discriminator 1114 may be similar to biased amplifier 772 of Figs. 8b, 9d, and 13b. In that case, response discriminator 1114 will be biased merely such that it will produce an output only if the output pulse from gated inverter 1112 is 3 microseconds wide or wider. In either case, the waveform of the output of response discriminator 1114 is shown in line BB of Figs. 5c and 5d. Similarly, occupancy discriminator 1114 may have either of the alternative forms described for response discriminator 1114. If it is like the above-described portion of pulse width discriminator 95 of Fig. 6f, it will be biased so that it will produce an output only if the output pulse from gated inverter 1112 is at least 1 microsecond wide but not greater than 3 microseconds wide. If it is like biased amplifier 772, it will be biased so that it will produce an output only if the output pulse from gated inverter 1112 is greater than 1 microsecond, and preferably then occupancy discriminator 1114 will include not only a biased amplifier 772 but also a second delay multivibrator 773, a differentiating circuit 774, and a gated amplifier 775, connected as shown in Figs. 8b, 9d, and 13b above, the output of the gated amplifier 775 then being fed to occupancy multivibrator 773. The output of response multivibrator 773 would then also be coupled to the gating element of gated amplifier 775 of occupancy discriminator 1114 so that the latter will not produce an output if the input pulse is greater than 3 microseconds wide. Occupancy multivibrator 773 will therefore produce an output only if an occupancy pulse (line CC, Figs 5c and 5d) is received from an aircraft within the block boundary in reply to an altitude pulse transmitted by pulse transmitter 89'. This output, which is in the form of a positive voltage gate 200 microseconds long, is applied to one grid of occupancy switch tube 423 of block 84' and to the screen grid of gated inverter 1113, which is normally off. The output of gated inverter 1113 is fed to the double occupancy discriminator channel which also includes, in the order named, integrator 776, discriminator 1114, and multivibrator 773. Double occupancy discriminator 1114 is biased the same as occupancy discriminator 1114 and thus, if a second reply pulse is received in reply to a single transmitted pulse from transmitter 89', it will be passed by gated inverter 1113 to produce an output from double occupancy multivibrator 773. The output of double occupancy multivibrator 773 is fed to one grid of double occupancy switch tube 423 of block 84'. Similarly, the output of the response multivibrator 773 is fed to one grid of the four 1st altitude switch tubes 423 of block 84'.

Block 84' includes the response, occupancy, and double occupancy detection circuits and, as mentioned above, there are shown only typical circuits for one altitude zone, although the circuits required for additional altitude zones are similar. The second grid of each of the occupancy, double occupancy, and the four 1st altitude switch tubes are connected together and to the output of 1st altitude occupancy gate output circuit 1111 of block 83', and thus are energized only during the first altitude occupancy gate. The waveform of line J (Figs. 5a and 5b) is connected directly to the plate of first altitude first sequence switch tube 423 and through mixing diode 1115 and output cathode follower 1116 to the plates of occupancy and double occupancy switch tubes 423. Similarly, the outputs of lines K and L (Figs. 5a and 5b) are fed directly to the plates of first altitude second sequence switch tube 423 and first altitude third sequence switch tube 423, respectively, and through mixing diodes 1117 and 1118, respectively, and output cathode follower 1116 to the plates of occupancy and double occupancy switch tubes 423. The waveform of line M (Figs. 5a and 5b) or, in other words, the fourth sequence gate, is fed only to the plate of first altitude fourth sequence switch tube 423. The output of each switch tube 423, which preferably are all tetrode gas-type tubes, is fed through a corresponding relay tube 425 to the corresponding relay of signal relay circuits 87'. Thus, the output of double occupancy relay tube 425 is fed to the double occupancy relay of the first altitude zone, indicated by the abbreviation 1–DO. The output of occupancy relay tube 425 is fed to the first altitude zone occupancy relay and the outputs of the four 1st altitude relay tubes 425 are fed to their respective 1st altitude zone response pulse relays. These relays are shown in detail in Figs. 6i and 6j and hence have not been repeated here. Relay tubes 425 preferably contain time constant components which delay the pickup and drop-out time of the relay armatures. This relay "slugging" makes it necessary that three consecutive aircraft replies to a given code digit be received before the corresponding relays will be picked up and, conversely, up to six replies can be missed before the relays will drop away. This "slugging" on pickup protects the control relays from false operation due to ambient noise, and the "slugging" on drop away sustains operation over a minor period of interruption of the aircraft signals.

Note that the response switch tubes 423 operate on a triple coincidence of a sequence gate, an altitude occupancy gate, and a response trigger. For a given tube, this coincidence can occur once each 15th of a second. Also, to allow for satisfactory entry under conditions of weak aircraft reply signals, the plate circuits of the occupancy and double occupancy switch tubes 423 are fed by the first, second, and third sequence gates through mixing diodes 1115, 1117, and 1118, respectively, and output cathode follower 1116. Thus, occupancy switch tube 423 operates on the triple coincidence of either the first, second, or third sequence gate, an altitude occupancy gate, and an occupancy trigger from occupancy multivibrator 773. Such a coincidence can occur a maximum of three times during a 15th of a second for a given altitude under certain coding conditions. The double occupancy switch tube 423 similarly operates on a triple coincidence of the above sequence gates, an altitude occupancy gate, and the double occupancy triggers fed from double occupancy multivibrator 773. Such a coincidence can also occur as many as three times in a 15th of a second, provided a second plane is located in the same altitude zone and within the block boundaries so that its reply signals occur during the application of the signal receiver gate and also during the width of the occupancy gate (200 microseconds) to gated inverter 1113.

Signal relay circuits 87' are similar to signal relay circuits 87 described above in detail in connection with Figs. 4b and 6i, and differ only in that their relays are differently arranged to take care of the different code utilized by the above alternative airborne equipment. Certain of these relay contacts are shown here, however, to illustrate the transmission of a green code to an aircraft in the first altitude zone of the block, the position of these relay contacts being controlled as described above in detail in connection with Figs. 6i and 6j, by reply pulses received from the first altitude zone of the block as well as by information received from the adjacent ground stations of the air lane over line wires 41.

Sequencing and signal pulse selection circuits 86 are the same as the similarly numbered circuits shown in Figs. 4b and 6k and described above in detail. These circuits determine when a synch pulse is to be transmitted and whether a blank, a check, or a normal pulse is to be sent during each sequence or altitude cycle in response to the 1080-cycle delayed trigger of line B (Figs. 5a and 5b) from adjustable station delay 75.

The four sequence gates (lines J–M, Figs. 5a and 5b) are connected through their respective isolating diodes 454, 465, 478, and 479 to the armatures associated with their respective relays I—IP, I—2P, I—3P, and I—4P. When any one of these armatures is in the up position or, in other words, when the corresponding relay is energized, the corresponding sequence gate (J, K, L, or M of Figs. 5a and 5b) will be connected to the screen grid of the normal trigger generator switch tube 600 of block 86 in order that pulse transmitter 89' will transmit a normal pulse corresponding to that sequence (either a No. 1, 2, 3, or 4 pulse). When either armature associated with the I—2P or I—3P relay is in its downward position, the corresponding sequence gate (K or L, Figs. 5a and 5b) will be connected to the screen grid of the blank trigger generator switch tube 600 of block 86, and thus will cause pulse transmitter 89' to transmit a blank pulse during that sequence. As shown, when the relay armatures associated with the I—IP and I—4P relays are in their downward position, either a blank or a check pulse may be transmitted by pulse transmitter 89', depending upon the position of the relay armatures associated with the check relay of the first altitude zone. If this armature is in the downward position as illustrated, a check pulse will be transmitted during that sequence whose corresponding relay armature is in its downward position. The position of the relay armature shown will produce a green code, which is being checked to an aircraft in the first altitude zone, and hence a normal or No. 1 pulse is being transmitted by pulse transmitter 89' during the first altitude cycle or sequence, blank or No. 5 pulses are being transmitted during the second and third sequences, and a check or No. 6 pulse is being transmitted during the fourth sequence. Note that in accordance with the code previously set up, check pulses can be substituted for blank pulses only during the first or fourth sequences.

As was the case in the ground station equipment previously described, the transmission of synch pulses by pulse transmitter 89' is controlled by the synch trigger generator switch tube 600 of block 86 whenever a delayed 1080-cycle trigger (line B, Figs. 5a and 5b) from adjustable station delay 75 is applied thereto simultaneously with a synch gate (line N, Figs. 5a and 5b) from the synch gate generator of block 85.

Numerous additional applications of the principles above-disclosed in the embodiment shown will occur to those skilled in the art, and no attempt has been made to exhaust such possibilities. While in the embodiment shown the outputs of various units have been controlled other than by switching the outputs on and off, it is contemplated that the outputs can also be controlled by switching the outputs on and off. The scope of this invention is defined in the following claims.

What is claimed is:

1. An airway traffic control system comprising the combination of a master timer, a plurality of fixed transmitters adapted to transmit a plurality of radio pulses, a corresponding plurality of automatic output control circuits and timers thereto, each under the control of said master timer and connected to and controlling the corresponding transmitter to produce a distinctive synch pulse followed by a plurality of information pulses differing from said synch pulse and in succession, each at a predetermined time interval after the preceding pulse, said fixed transmitters and automatic output control circuits and timers therefor being arranged to define a continuous air lane where each of said transmitters is spaced from the next adjacent transmitter a distance not greater than their combined ranges, whereby each transmitter constitutes a block, and adjacent fixed transmitters including pulse-forming circuits to transmit synch pulses of different character but alternate fixed transmitters transmitting synch pulses of the same character, and a delay circuit for one fixed transmitter and each alternate fixed transmitter spaced therefrom along the air lane and connected between the automatic output control circuit thereof and the fixed transmitter and timed to delay the transmission of the first of the information pulses transmitted by said one and alternate fixed transmitters following each synch pulse transmitted thereby by an additional predetermined time after that preceding synch pulse, each of the successive information pulses transmitted by said one and alternate fixed transmitters preceding the next synch pulse transmitted thereby being delayed after the preceding information pulse only by said first-mentioned predetermined time interval.

2. A combination in accordance with claim 1 including an airborne receiver, a control circuit therefor comprising a timer, responsive to each of said synch pulses and whose timing function is initiated thereby, and connected to said airborne receiver to control the output thereof to render it effective only for a predetermined period of time selected from the period of time following each of said synch pulses and coextensive with the period of time of transmission of one but not all of said information pulses, and an altitude-sensitive device connected to said last-mentioned timer to control the timing of the beginning of said predetermined period of time selected by said last-mentioned timer after each of said synch pulses.

3. A combination in accordance with claim 2 including a discriminator responsive only to the said synch pulses of different character transmitted by said one and alternate fixed transmitters and a delay circuit timed to delay signals applied thereto by a time equal to said additional predetermined time connected in series in the order named between said receiver and said last-mentioned timer to delay the beginning of said predetermined period of time selected by said last-mentioned timer following each of said synch pulses of said different character transmitted by said one and alternate fixed transmitters by a time equal to said additional predetermined time after the beginning of the predetermined period of time selected by said last-mentioned timer under control of said altitude-sensitive device for each corresponding information pulse following a synch pulse of the different character transmitted by the other fixed transmitters.

4. A combination in accordance with claim 3 including an airborne transmitter connected to the output of said airborne receiver to produce an output in the form of a reply pulse in response to each information pulse occurring within said period of time selected by said last-mentioned timer.

5. A combination in accordance wtih claim 4 wherein each fixed transmitter includes pulse-forming circuits to transmit successive corresponding information pulses following different successive synch pulses in the form of a code conveying intelligence intended for the aircraft at that altitude zone whose altitude-sensitive device is adjusted to initiate the timing of said predetermined period of time at that time after each synch pulse when the information pulse intended for the altitude zone occupied by the aircraft arrives at the aircraft.

6. A combination in accordance with claim 5 wherein successive corresponding information pulses transmitted following different successive synch pulses are of different width and different from the widths of said synch pulses but all the information pulses following any one synch pulse before the transmission of another synch pulse are of the same width, and a control circuit including a pulse-forming circuit for producing pulses of a predetermined width different from any of said above-mentioned pulse widths for and connected to each of said fixed transmitters to substitute a pulse of said predetermined width in place of any of said above-mentioned information pulses of different width.

7. A combination in accordance with claim 6 wherein said airborne transmitter includes pulse-forming circuits to produce reply pulses of first and second widths respectively and a discriminator responsive to information pulses of said predetermined width connected to said last-mentioned pulse-forming circuits to produce a reply pulse of said first width to information pulses of said predetermined width and a reply pulse of said second width different from said first width to all other information pulses.

8. A combination in accordance with claim 7 including a control circuit connected to said airborne transmitter to substitute a reply pulse of said second width in place of a reply pulse of said first width in reply to any information pulse of said predetermined width.

9. A combination in accordance with claim 7 including a control circuit connected to said airborne transmitter to substitute a reply pulse of said first width in place of a reply pulse of said second width in reply to any of said all other information pulses.

10. A combination in accordance with claim 8 including a fixed receiver for and adjacent each fixed transmitter to receive said reply pulses and an associated control circuit for each fixed receiver connected between the output of said fixed receiver and the associated fixed transmitter to vary said information pulses in accordance with the variations of the output of said fixed receiver.

11. A combination in accordance with claim 10 including an automatic timed control circuit for and adjacent each fixed transmitter and connected between said transmitter and the associated fixed receiver and timed to render the receiver output ineffective for a period of time, which period starts at a time after each transmitted pulse equal to the time it takes a pulse to travel from the fixed transmitter to the block boundary thereof and back plus such time as elapses between arrival of a pulse at an aircraft in the block and response thereto, whereby the block boundary is defined about the block of the fixed transmitter.

12. A combination in accordance with claim 11 including a control circuit for each fixed transmitter connected to the fixed receiver associated with the next adjacent transmitter for automatically varying pulses transmitted by the controlled fixed transmitter in accordance wtih the output of the receiver of said next adjacent block.

13. A combination in accordance with claim 1 wherein a delay circuit is connected between each fixed transmitter and the corresponding automatic output control circuit and timed to produce transmission of corresponding synch pulses by adjacent fixed transmitters to cause said corresponding synch pulses to arrive at the block boundaries therebetween simultaneously.

14. A combination in accordance with claim 1 wherein a delay circuit is connected between each fixed transmitter and the corresponding automatic output control circuit and timed to cause corresponding synch pulses transmitted by adjacent fixed transmitters to be transmitted simultaneously.

15. A combination in accordance with claim 1 wherein successive corresponding information pulses transmitted following different synch pulses are of different width and different from the widths of said synch pulses but all the information pulses following any one synch pulse before the transmission of another synch pulse are of the same width, and a control circuit including a pulse-forming circuit for producing a pulse of a predetermined width different from any of said above-mentioned pulse widths connected to said fixed transmitter to substitute a pulse of said predetermined width different from any of said above-mentioned pulse widths in place of any of said above-mentioned information pulses of different width.

16. A combination in accordance with claim 1 including a fixed receiver for and adjacent each fixed transmitter, each fixed transmitter including pulse-forming circuits to produce varying information pulses, and an associated control circuit for each fixed receiver connected between the output of said fixed receiver and the associated fixed transmitter to vary said information pulses in accordance with the variations of the output of said fixed receiver.

17. A combination in accordance with claim 1 wherein said fixed transmitters transmit corresponding synch pulses simultaneously and including an airborne receiver adapted to receive said synch pulses, a normally conducting switch circuit connected to the output of said airborne receiver to be turned off by the first of said synch pulses received by said airborne receiver, a control circuit connected to said switch circuit to render the latter conducting again and connected to the output of said airborne receiver to be actuated by the second of said synch pulses received of said airborne receiver, an integrator connected to and under control of said switch circuit to produce an integrated output proportional to the length of time during which said switch circuit is non-conducting, and an indicator connected to and under control of said integrator, whereby the first of said synch pulses received turns said switch circuit off and the second of said synch pulses received actuates said control circuit to turn said switch circuit on again, the resultant integrated output of said integrator applied to said indicator thereby being proportional to the time separation of said synch pulses as received at said aircraft and hence to the distance of the aircraft from the block boundary equi-distant between the fixed transmitters nearest and next nearest the aircraft.

18. A selective pulse spacing measuring circuit for measuring the time separation of two pulses each having a width within predetermined limits and occurring one after the other with a time interval therebetween comprising the combination of a pulse width discriminator responsive only to pulses whose width is within said predetermined limits, a normally conducting switch circuit connected to the output of said pulse width discriminator to be turned off by the first of said pulses, a control circuit connected to said switch circuit to render the latter conducting again and connected to said pulse width discriminator and under the control of the second of said pulses, an integrator connected to and under control of said switch circuit to produce an integrated output proportional to the length of time during which said switch circuit is non-conducting, and an indicator connected to and under the control of said integrator, whereby the first of said pulses is passed by said pulse width discriminator to turn said switch circuit off and the second of said pulses is passed by said pulse width discriminator to actuate said control circuit to turn said switch circuit on again, the resultant integrated output of said integrator applied to said indicator thereby being proportional to the time separation of said pulses.

19. A selective pulse spacing measuring circuit for measuring the time separation of two pulses each having a width within predetermined limits and occurring one after the other with a time interval therebetween comprising the combination of a first pulse width discriminator responsive only to pulses whose width is within said predetermined limits, a second pulse width discriminator also responsive only to pulses whose width is within said predetermined limits, a multivibrator whose natural period is longer than the time separation of said pulses and comprising first and second electron tubes each including a control grid and a plate with the control grid of said first tube being biased so that said first tube is normally conducting and said second tube being biased so as normally to be non-conducting, an integrator tube including a control grid and a plate with its control grid connected to the plate of said first multivibrator tube, an indicator connected in the plate circuit of said integrator tube, a connection from the output of said second pulse width discriminator to the control grid of said second multivibrator, and a connection from the output of said first pulse width discriminator to the control grid of said first multivibrator tube, whereby when said first pulse is applied to the control grid of said first multivibrator tube from the output of said first discriminator and said second pulse is applied to the control grid of said second multivibrator tube from the output of said second discriminator, said first multivibrator tube is rendered non-conducting and remains non-conducting until said second multivibrator tube is rendered non-conducting by said second pulse, and said integrator tube provides to said indicator an output proportional to the time during which said first multivibrator tube is non-conducting and hence proportional to the time separation of said pulses.

20. A signal spacing measuring circuit for measuring the time separation of two signals occurring one after the other with a time interval therebetween comprising the combination of a normally conducting switch circuit connected to be turned off by the first of said signals, a control circuit connected to said switch circuit to render the latter conducting again under the control of the second of said signals, an integrator connected to and under control of said switch circuit to produce an integrated output proportional to the length of time during which said switch circuit is non-conducting, and an indicator connected to and under the control of said integrator, whereby the first of said signals turns said switch circuit off and the second of said signals actuates said control circuit to turn said switch circuit on again, the resultant integrated output of said integrator applied to said indicator thereby being proportional to the time separation of said signals.

21. A signal spacing measuring circuit for measuring the time separation of two signals occurring one after the other with a time interval therebetween comprising the combination of a switch tube biased to be normally on and connected to be turned off by the first of said signals, a control circuit connected to said switch tube to render the latter conducting again and connected to be controlled by the second of said signals, an integrator connected to and under control of said switch tube to produce an integrated output proportional to the length of time during which said switch tube is non-conducting, and an indicator connected to and under the control of said integrator, whereby the first of said signals turns said switch tube off and the second of said signals actuates said control circuit to turn said switch tube on again, the resultant integrated output of said integrator applied to said indicator thereby being proportional to the time separation of said signals.

22. A signal spacing measuring circuit for measuring the time separation of two signals occurring one after the other with a time interval therebetween comprising the combination of a multivibrator whose natural period is longer than the time separation of said signals and comprising first and second electron tubes each including a control grid and a plate with the control grid of said first tube being biased so that said first tube is normally conducting and said second tube being biased so as normally to be non-conducting, an integrator tube including a control grid and a plate with its control grid connected to the plate of said first multivibrator tube, and an indicator connected in the plate circuit of said integrator tube, whereby when said first signal is applied to the control grid of said first multivibrator tube and said second signal is applied to the control grid of said second multivibrator tube, said first multivibrator tube is rendered non-conducting and remains non-conducting until said second multivibrator tube is rendered non-conducting by said second signal pulse and said integrator tube provides to said indicator an input proportional to the time during which said first multivibrator tube is non-conducting and hence proportional to the time separation of said signals.

23. A selective signal spacing measuring circuit for measuring the time separation of two signals each having a predetermined characteristic and occurring one after the other with a time interval therebetween comprising the combination of a discriminator responsive only to signals having said predetermined characteristic, a normally conducting switch circuit connected to the output of said discriminator to be turned off by the first of said signals, a control circuit connected to said switch circuit to render the latter conducting again and connected to the output of said discriminator to be controlled by the second of said signals, an integrator connected to and under control of said switch circuit to produce an integrated output proportional to the length of time during which said switch circuit is non-conducting, and an indicator connected to and under the control of said integrator, whereby when said two signals are applied to said discriminator, the first of said signals is passed by said discriminator to turn said switch circuit off and the second of said signals is passed by said discriminator to actuate said control circuit to turn said switch circuit on again, the resultant integrated output of said integrator applied to said indicator thereby being proportional to the time separation of said signals.

24. A selective signal spacing measuring circuit for measuring the time separation of two signals each having a predetermined characteristic and occurring one after the other with a time interval therebetween comprising the combination of a discriminator responsive only to signals having said predetermined characteristic, a multivibrator whose natural period is longer than the time separation of said signals and comprising first and second electron tubes each including a control grid and a plate with the control grid of said first tube being biased so that said first tube is normally conducting and said second tube being biased so as normally to be non-conducting, an integrator tube including a control grid and a plate with its control grid connected to the plate of said first multivibrator tube, and an indicator connected in the plate circuit of said integrator tube, whereby when said two signals are applied to said discriminator, the first of said signals is passed by said discriminator to render said first multivibrator tube non-conducting and it remains non-conducting until said second multivibrator tube is rendered non-conducting by the second of said signals passed by said discriminator, and said integrator tube provides to said indicator an output proportional to the time during which said first multivibrator tube is non-conducting and hence proportional to the time separation of said signals.

25. In apparatus of the class described the combination of an airborne receiver adapted to receive a series of distinctive synch pulses of either of two different widths and each followed by a corresponding plurality of information pulses differing from said synch pulses and in succession, each at a predetermined time interval after the preceding synch or information pulse but with the time interval between the first information pulse following each synch pulse of the second of said different widths equal to said predetermined time interval plus an additional predetermined time interval so that if said synch pulses of said two different widths are transmitted simultaneously, each information pulse following said synch pulse of said second width is transmitted at a time equal to said additional predetermined time interval after the transmission of the corresponding information pulse following each synch pulse of the first of said two different widths, and a control therefor comprising a timer responsive to synch pulses of either of said two different widths and whose timing function is initiated thereby, which is connected to and controls the output of said airborne receiver to render it effective only for a predetermined period of time selected from the period of time following each synch pulse and coextensive with the period of time of transmission of one but not all of said information pulses following that synch pulse which rendered the timer responsive, an altitude-sensitive device connected to said timer to control the timing of the beginning of said predetermined period of time selected by said timer after each synch pulse, and a discriminator responsive only to the synch pulses of the second of said two different widths and a delay circuit timed to delay signals applied thereto by a time equal to said additional predetermined time connected in series in the order named between said airborne receiver and said timer to delay the beginning of said predetermined period of time selected by said timer following each of said synch pulses of said second of said two different widths by a time equal to said additional predetermined time interval after the beginning of the predetermined period of time selected by said timer under control of said altitude-sensitive device for each corresponding information pulse following a synch pulse of the first of said two different widths.

26. A combination in accordance with claim 25 including an airborne transmitter connected to the output of said airborne receiver to produce an output in the form of a reply pulse in response to each information pulse occurring within said period of time selected by said timer.

27. A combination in accordance with claim 25 including a pulse width discriminator connected to said airborne receiver and responsive only to pulses of either of said two different synch pulse widths, a normally conducting switch circuit connected to the output of said discriminator to be turned off by the first of said pulses received by said airborne receiver and passed by said discriminator, a control circuit connected to said switch circuit to render the latter conducting again and connected to said discriminator to be actuated by the second of said synch pulses received by said airborne receiver and passed by said discriminator, an integrator connected to and under control of said switch circuit to produce an integrated output proportional to the length of time during which said switch circuit is non-conducting, and an indicator connected to and under control of said integrator, whereby the first of said synch pulses received turns said switch circuit off and the second of said synch pulses received actuates said control circuit to turn said switch circuit on again, the resultant integrated output of said integrator applied to said indicator thereby being proportional to the time separation of said synch pulses as received at said aircraft.

28. Apparatus for communicating between first and second adjacent radio pulse transmitters and an aircraft having a pulse receiver comprising means connected to said first transmitter to produce the transmission of a synch pulse of a first width, further means connected to said first transmitter to produce thereafter the transmission of a plurality of information pulses in succession, each of whose width differs from that of said synch pulse and each at a predetermined time interval after the preceding pulse, means under control of said first-mentioned means and connected to said second transmitter to cause the transmission therefrom of a synch pulse of a second width simultaneously with the transmission of the synch pulse of said first width from said first transmitter, further means connected to said second transmitter for causing the transmission thereafter of a corresponding plurality of information pulses in succession, each of a different width than that of either synch pulse and with the time interval between the first information pulse and the preceding synch pulse of said second width equal to said predetermined time interval plus an additional predetermined time interval and the time interval between each successive information pulse following this synch pulse and preceding the next synch pulse of said second width equal to said first-mentioned predetermined time interval, each corresponding information pulse following different synch pulses conveying information intended for a predetermined altitude zone different from that for which other information pulses following the same synch pulse are intended, pulse width sensitive means connected to and under control of said aircraft's receiver, altitude-sensitive means, and means connected to and under control of said pulse width sensitive means and said altitude-sensitive means and connected to and controlling said aircraft's receiver to render the latter operative after the receipt of the first synch pulse in accordance with the pulse width of said first synch pulse received and in accordance with the altitude of the aircraft for the period of time corresponding to the time when the information pulse intended for the altitude zone occupied by the aircraft and following said first received synch pulse arrives at the aircraft's receiver and inoperative for the periods of time during which information pulses following said first received synch pulse and intended for other altitude zones and all those periods of time during which the information pulses following the other synch pulse arrive at said aircraft.

29. Apparatus in accordance with claim 28 including a pulse transmitter carried by said aircraft for transmitting a pulse in reply to and at a predetermined time after the receipt at the aircraft of the information pulse intended for the altitude zone occupied by the aircraft, a pulse receiver for and adjacent each of said first and second radio pulse transmitters, and means connected between each of said first and second radio pulse transmitters and its respective adjacent pulse receiver to render the output of each of these receivers operative for a predetermined interval after each information pulse transmitted by the associated transmitter, which interval terminates at a time equal to the time required for a pulse to travel from the respective associated transmitter to the boundary of a predetermined area and return plus the delay involved between receipt and response at the aircraft after the sending of each of said information pulses and covers the period of receipt at each of the receivers associated with said first and second radio pulse transmitters of reply pulses from aircraft within the predetermined area of the respective associated transmitter.

30. Apparatus in accordance with claim 29 comprising manually-operable means connected to and controlling said aircraft transmitter for transmitting a pulse therefrom at a second shorter predetermined time after the receipt at the aircraft of the information pulse intended for the altitude zone occupied by the aircraft and in reply thereto, whereby when the aircraft is without the predetermined area of the nearest of said first and second adjacent radio pulse transmitters, operation of said manually-operable means electronically projects the aircraft's position within the predetermined area of said nearest transmitter since the reply pulse transmitted at said second shorter predetermined time arrives at the receiver adjacent said nearest transmitter during the predetermined interval that this associated receiver has its output rendered operative.

31. Apparatus in accordance with claim 30 wherein said first and second transmitters are each timed to produce said first-mentioned predetermined time intervals of a duration to permit transmission of the first-mentioned reply pulse from an aircraft within either predetermined area and its receipt by the receiver of the respective predetermined area during each said time interval.

HUGH C. KENDALL.
LIONEL H. ORPIN.

REFERENCES CITED

The following references are of record in the file of this patent:

UNITED STATES PATENTS

| Number | Name | Date |
| --- | --- | --- |
| 2,412,111 | Wilson | Dec. 3, 1946 |
| 2,444,452 | Labin | July 6, 1948 |
| 2,468,045 | Deloraine | Apr. 26, 1949 |
| 2,480,123 | Deloraine | Aug. 30, 1949 |